(12) United States Patent
Mathis et al.

(10) Patent No.: US 10,377,001 B2
(45) Date of Patent: Aug. 13, 2019

(54) METHODS FOR COUPLING THREADED FASTENERS

(71) Applicant: THE BOEING COMPANY, Chicago, IL (US)

(72) Inventors: Dennis R. Mathis, Charleston, SC (US); Jason Kerestes, Summerville, SC (US); Rachel M. Chow, Ladson, SC (US)

(73) Assignee: The Boeing Company, Chicago, IL (US)

( * ) Notice: Subject to any disclaimer, the term of this patent is extended or adjusted under 35 U.S.C. 154(b) by 655 days.

(21) Appl. No.: 15/056,890

(22) Filed: Feb. 29, 2016

(65) Prior Publication Data
US 2017/0246715 A1 Aug. 31, 2017

(51) Int. Cl.
| | |
|---|---|
| *B23P 19/06* | (2006.01) |
| *B25B 13/06* | (2006.01) |
| *B25B 21/00* | (2006.01) |
| *B25B 23/00* | (2006.01) |

(Continued)

(52) U.S. Cl.
CPC .............. *B23P 19/06* (2013.01); *B23P 19/069* (2013.01); *B25B 13/06* (2013.01); *B25B 13/488* (2013.01); *B25B 17/02* (2013.01); *B25B 21/00* (2013.01); *B25B 21/002* (2013.01);
(Continued)

(58) Field of Classification Search
CPC ..... B23P 19/06; B23P 19/069; B23P 2700/01; B25B 13/06; B25B 21/00; B25B 21/002; B25B 23/0035; Y10T 29/49963
See application file for complete search history.

(56) References Cited

U.S. PATENT DOCUMENTS

| 1,507,362 A | 9/1924 | Bartosik | |
|---|---|---|---|
| 2,882,773 A * | 4/1959 | Wing | B25B 21/002 81/475 |

(Continued)

FOREIGN PATENT DOCUMENTS

| WO | 2005021214 | 3/2005 |
|---|---|---|
| WO | 2007061487 | 5/2007 |
| WO | 2010045083 | 4/2010 |

OTHER PUBLICATIONS

European Extended Search Report, European Application No. 17158533.4, dated Aug. 4, 2017.

(Continued)

*Primary Examiner* — Jermie E Cozart
(74) *Attorney, Agent, or Firm* — Perman & Green, LLP

(57) ABSTRACT

A method of threadably coupling a first fastener with a second fastener using a rotary drive including a tool. The method includes rotationally anchoring the second fastener relative to the tool by co-axially urging a fastener-engagement portion of the tool against the second fastener and rotating the tool relative to the second fastener using a socket of the rotary drive until the fastener-engagement portion of the tool mates with a receiving portion of the second fastener, receiving the first fastener within the socket of the rotary drive co-axially with the fastener-engagement portion of the tool, and rotating the first fastener with the socket of the rotary drive relative to a housing of the rotary drive to cause the first fastener to threadably engage the second fastener.

20 Claims, 42 Drawing Sheets

(51) Int. Cl.
*B25B 13/48* (2006.01)
*B25B 17/02* (2006.01)
(52) U.S. Cl.
CPC ...... *B25B 23/0035* (2013.01); *B25B 23/0085* (2013.01); *B23P 2700/01* (2013.01); *Y10T 29/49963* (2015.01)

(56) References Cited

U.S. PATENT DOCUMENTS

| | | | | |
|---|---|---|---|---|
| 5,553,519 | A * | 9/1996 | Pettit, Jr. | B25B 21/002 81/475 |
| 9,120,209 | B1 * | 9/2015 | Schevers | B25B 13/06 |
| 2004/0177724 | A1 * | 9/2004 | Pettit, Jr. | B25B 21/002 81/55 |
| 2005/0044993 | A1 * | 3/2005 | Lantow | B25B 13/06 81/55 |
| 2007/0107557 | A1 * | 5/2007 | Pettit | B25B 21/002 81/56 |
| 2010/0095811 | A1 * | 4/2010 | Gauthreaux | B25B 13/06 81/57 |
| 2015/0224612 | A1 * | 8/2015 | Henderson | B23P 19/06 29/458 |

OTHER PUBLICATIONS

Kuka Aerospace, "Nut Install End Effetctor (NIEE)" pubished May 5, 2015.

* cited by examiner

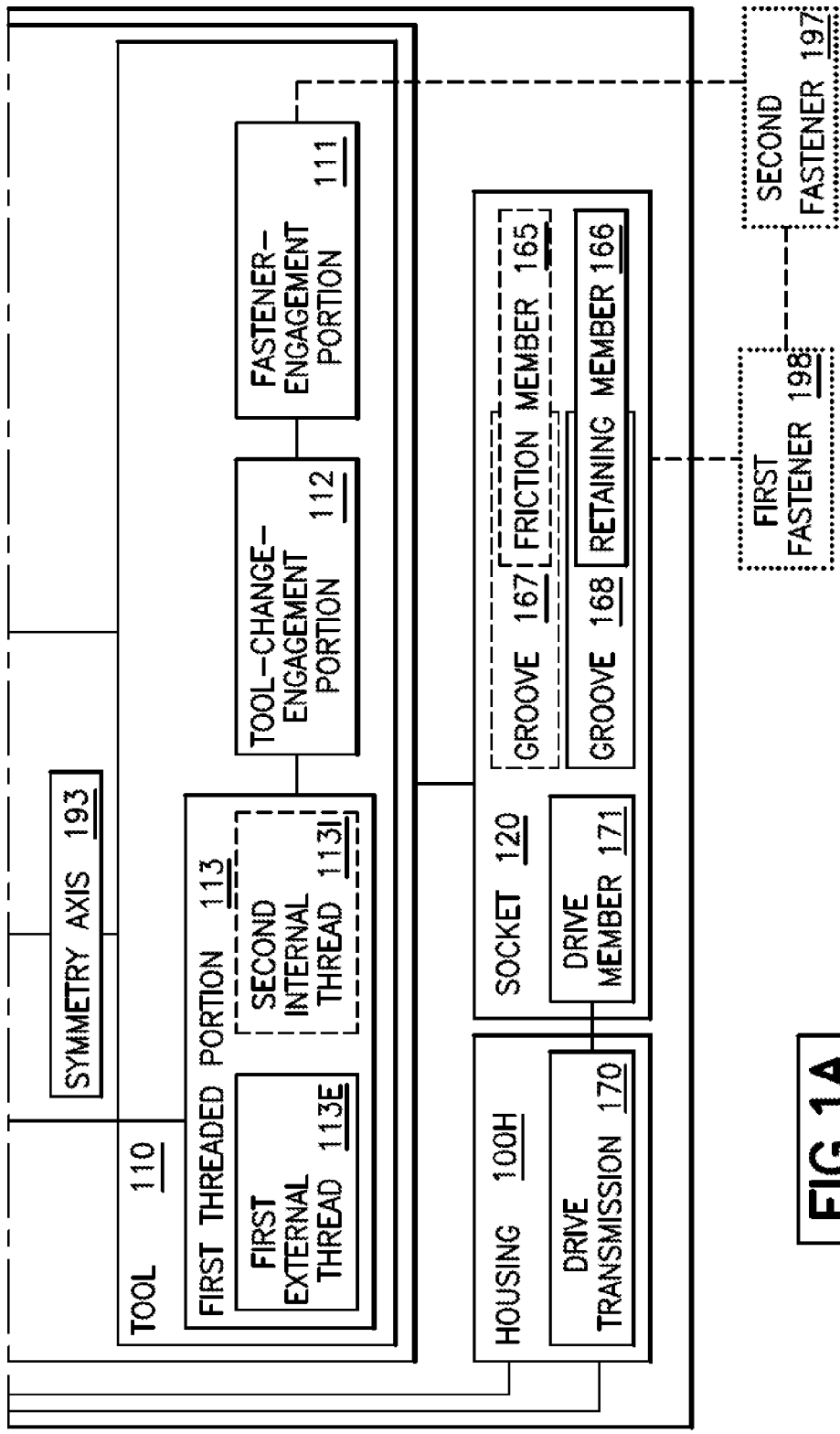

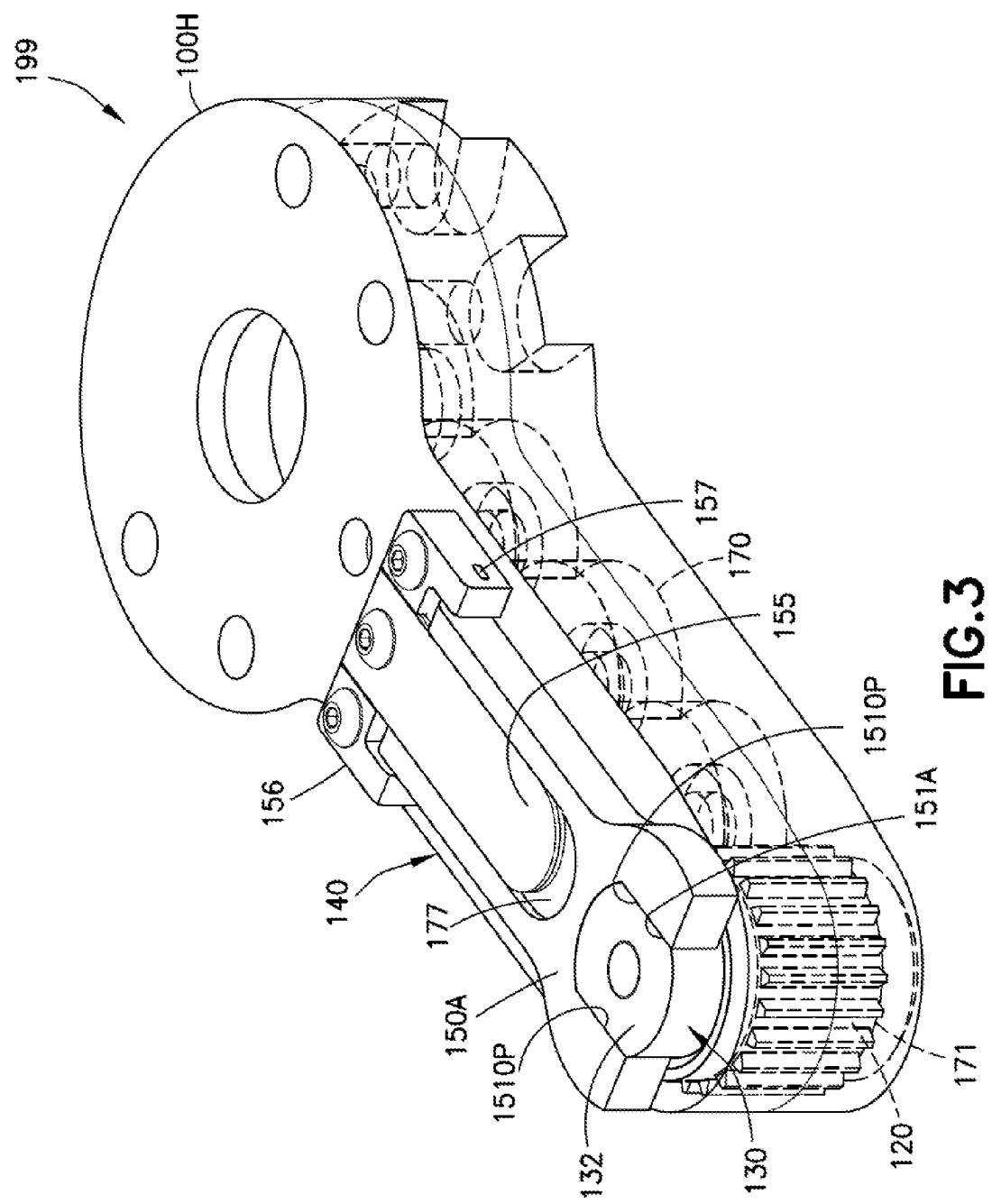

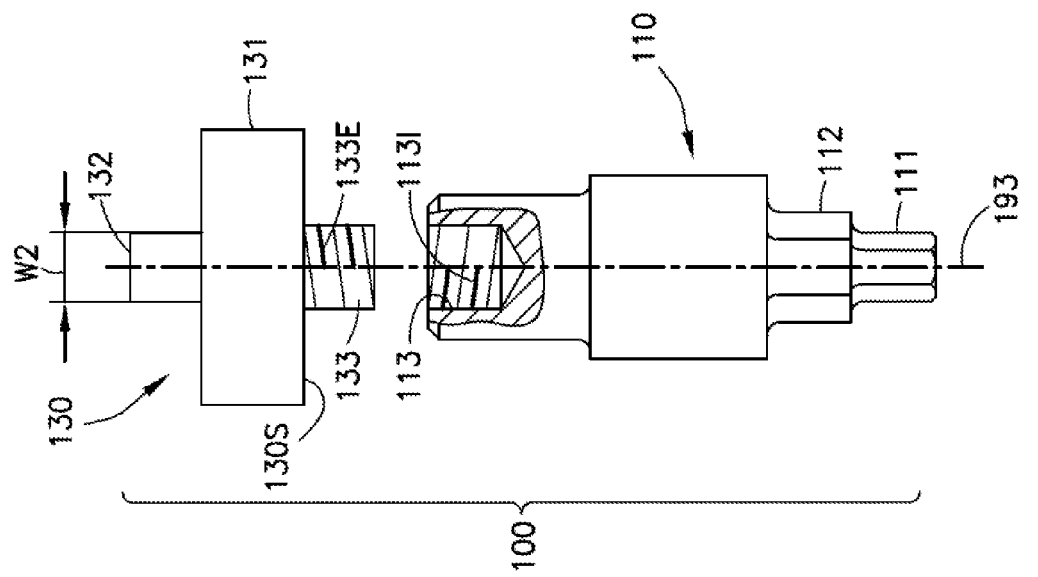
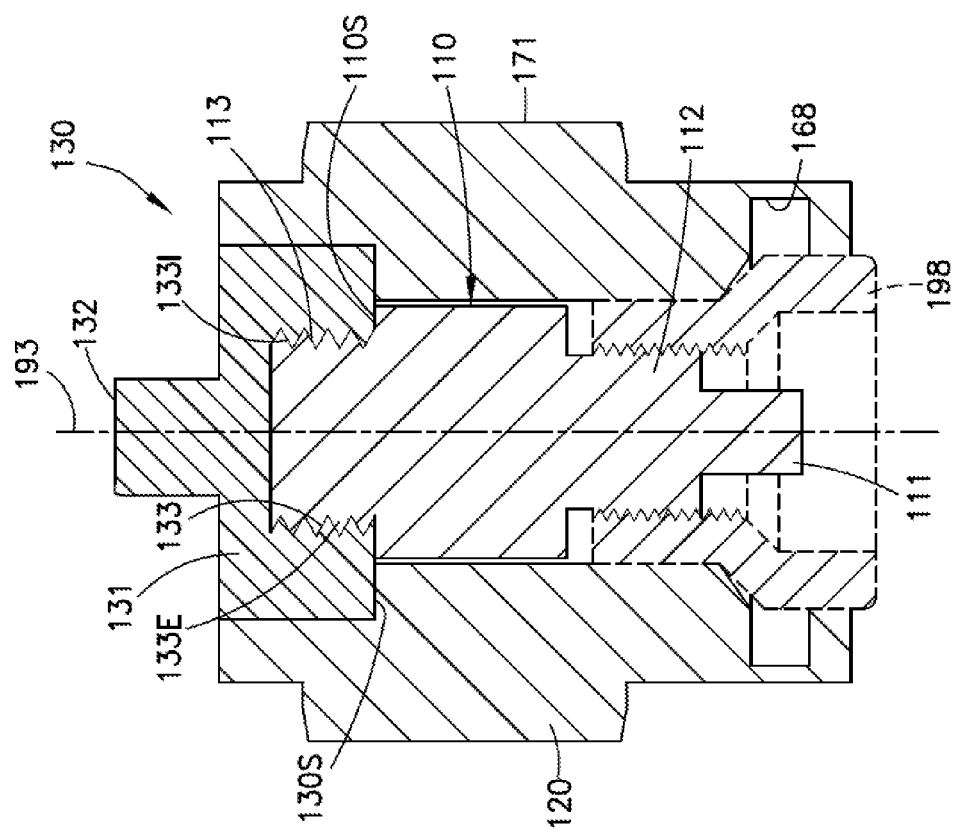

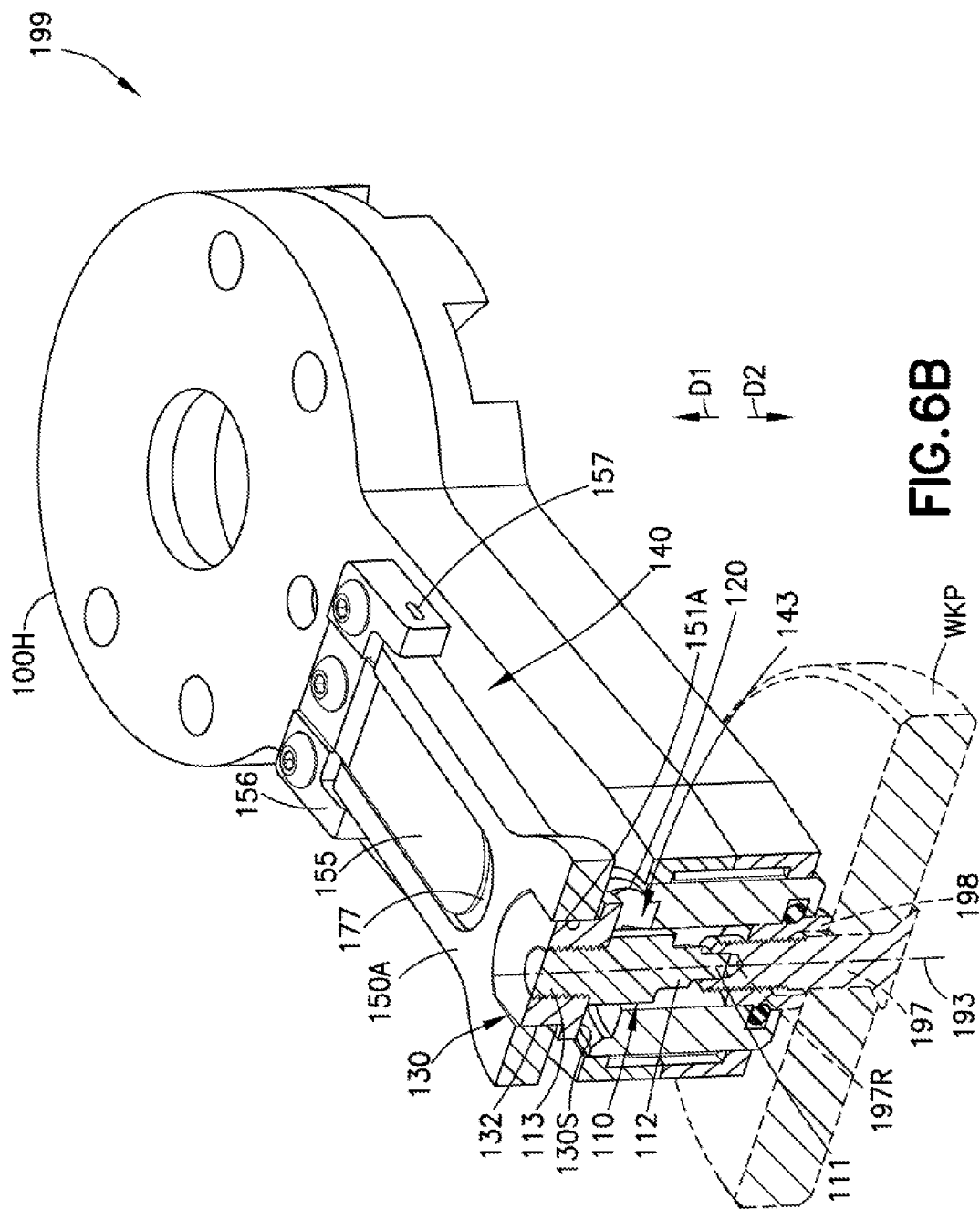

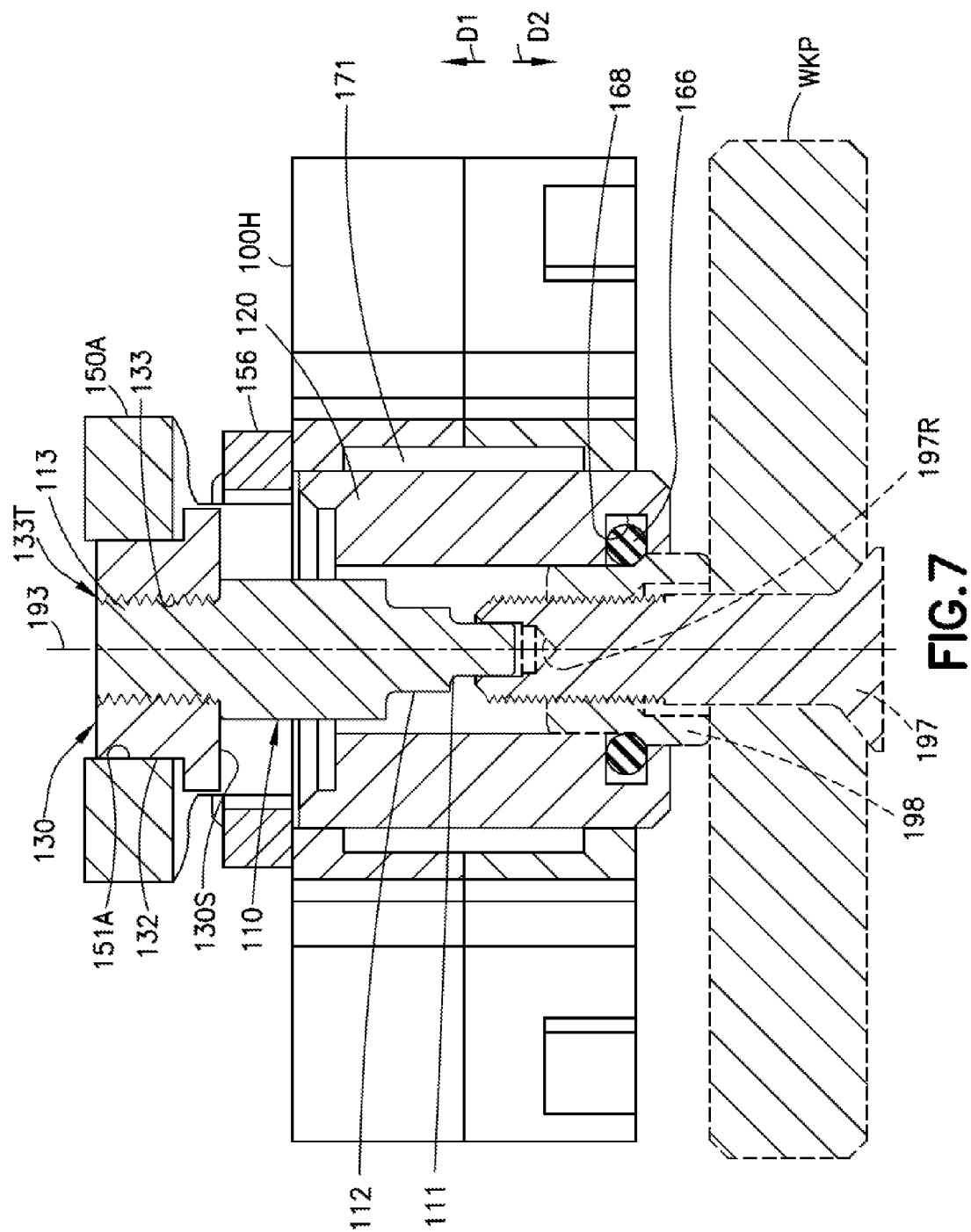

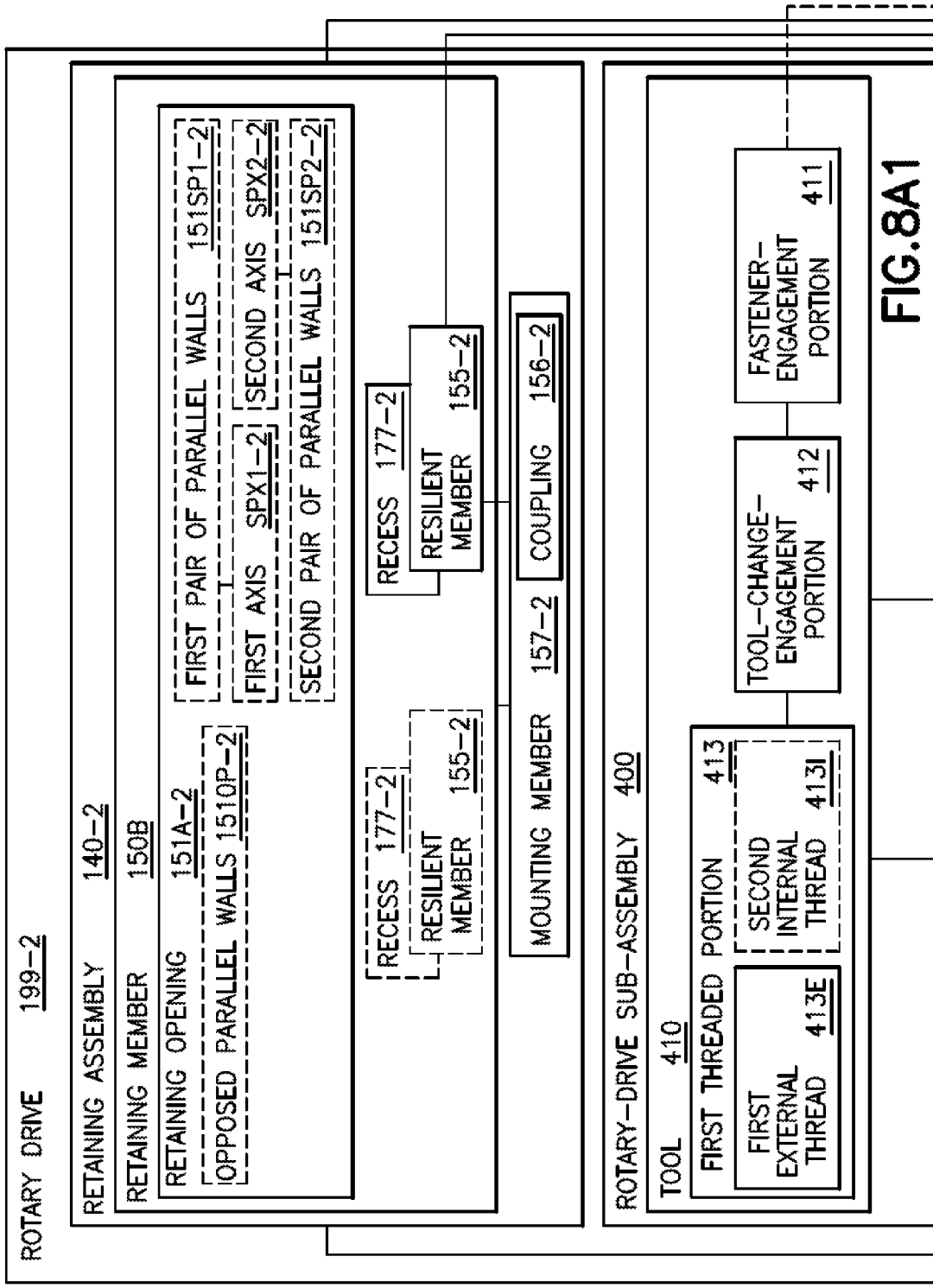
FIG.8A1

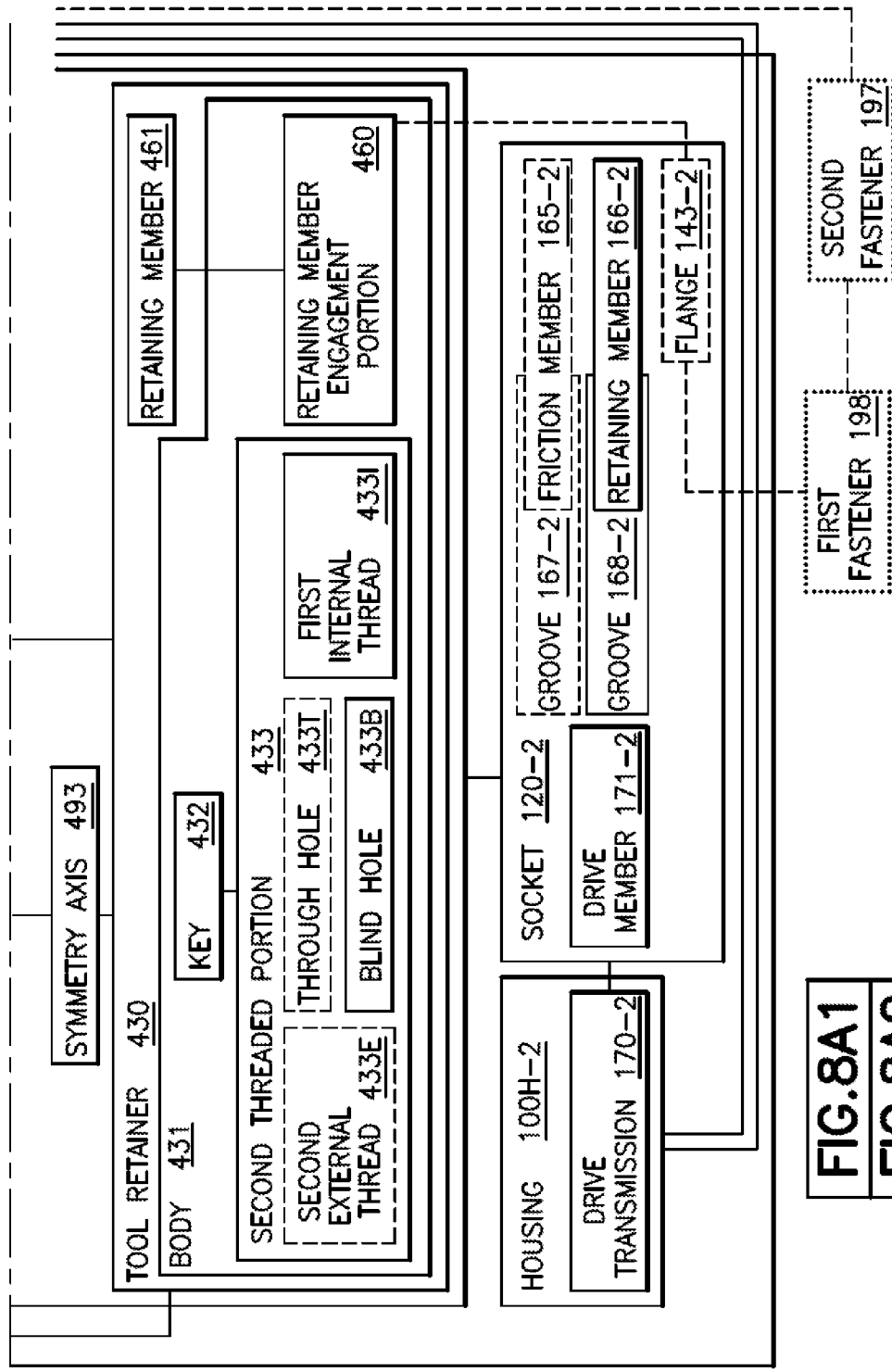

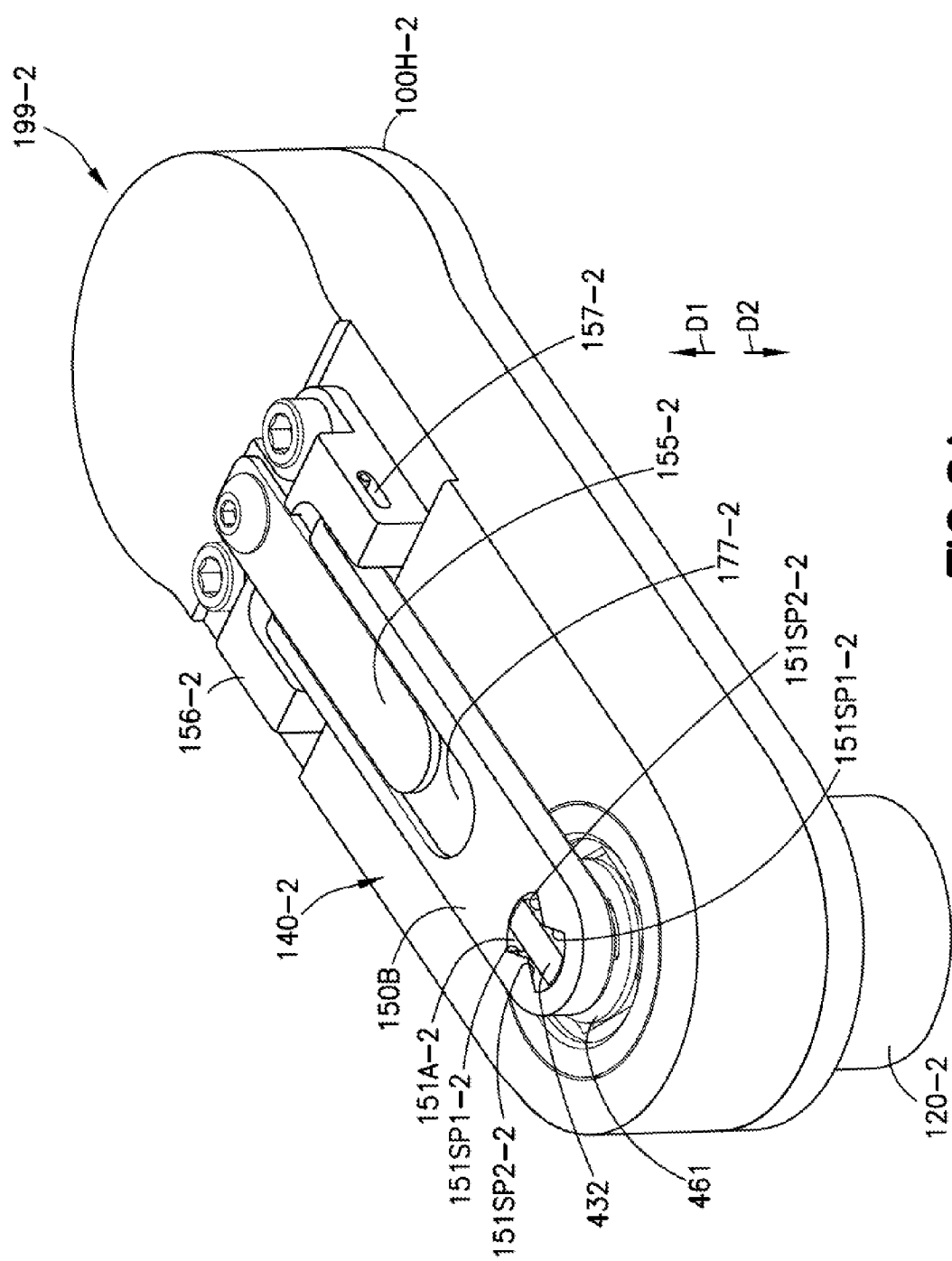

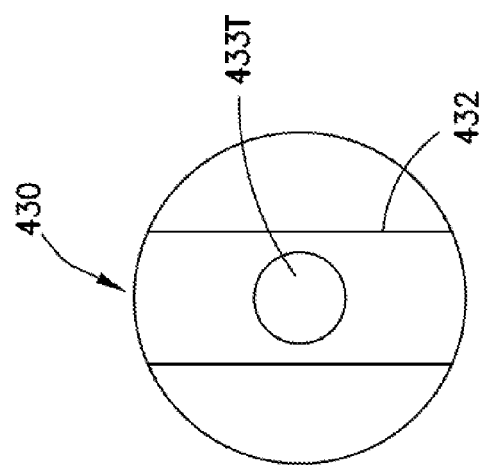
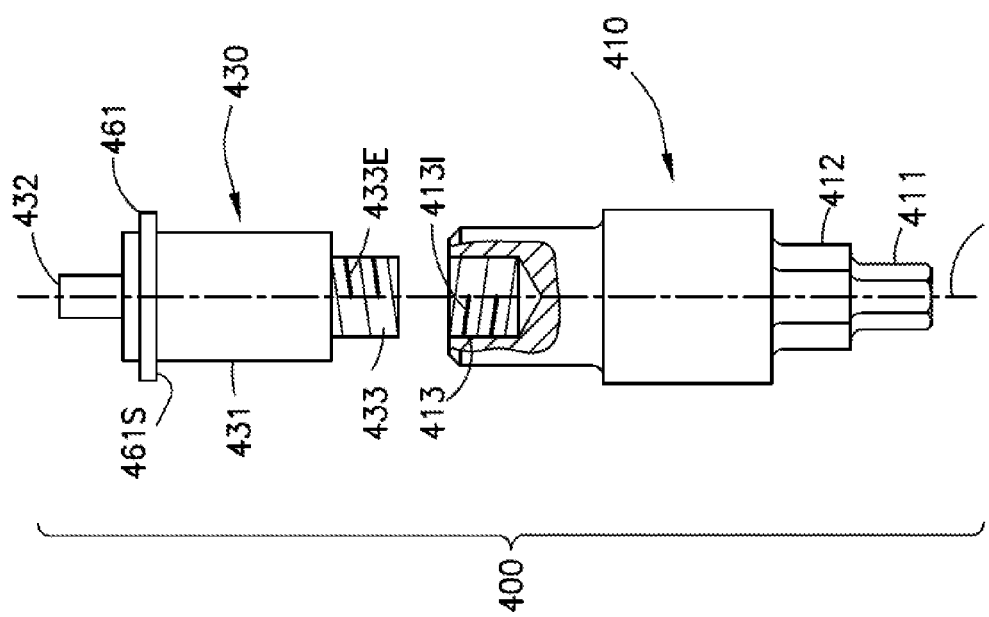

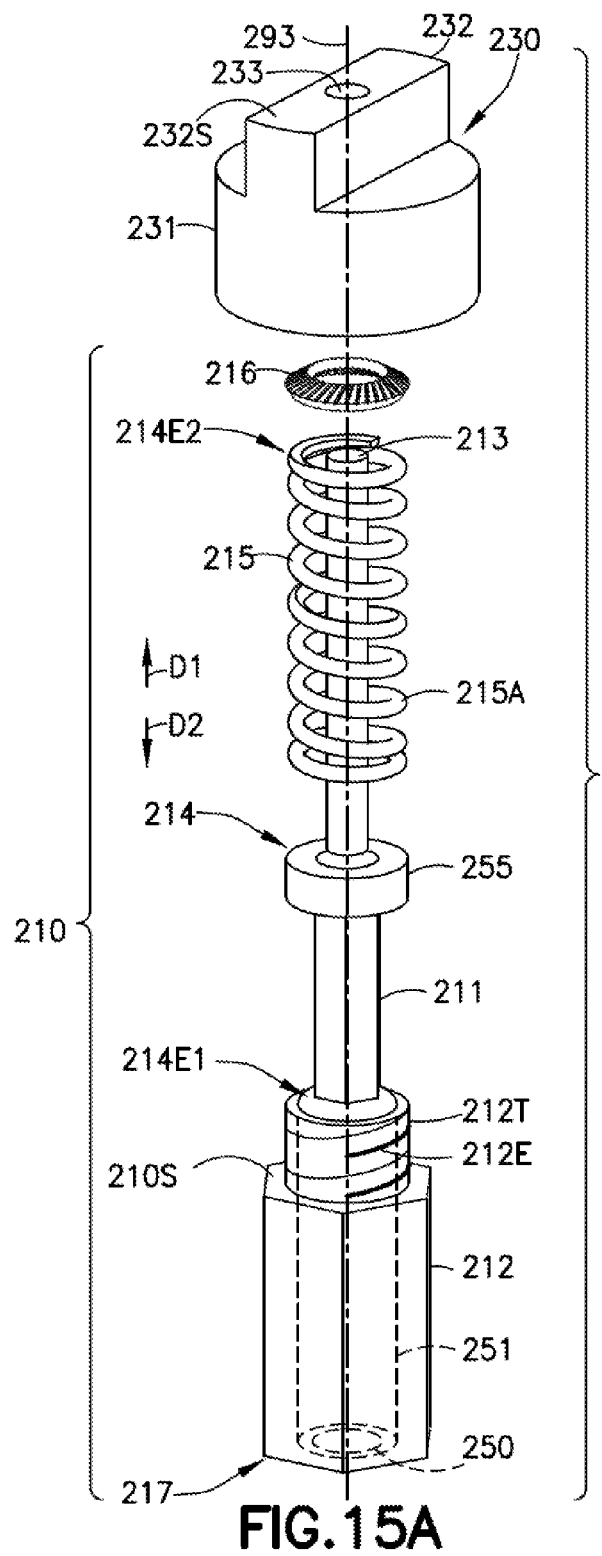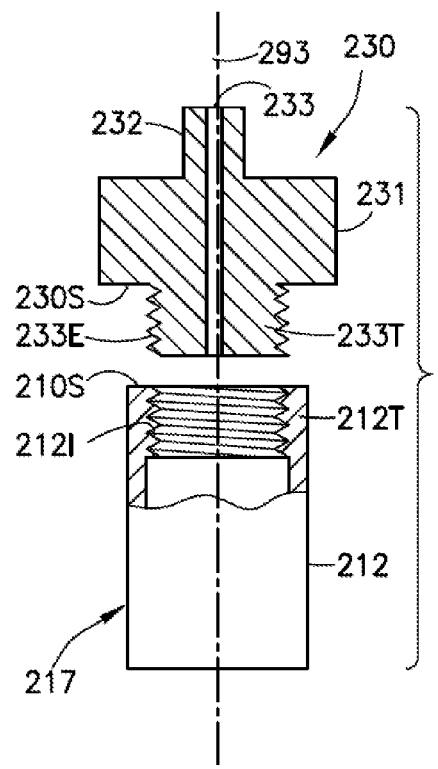
FIG. 15A
FIG. 15B

METHODS FOR COUPLING THREADED FASTENERS

BACKGROUND

"Blind" fasteners, such as threaded studs that are accessible from only one side of a workpiece, generally have a tool-engagement portion, formed at one end of each of the threaded studs. Conventionally, a socket of a rotary-drive or nut-runner is used to thread a nut onto the threaded stud while a retaining tool of the nut-runner is simultaneously used to keep the threaded stud from rotating. The retaining tool of the nut-runner is subjected to high stresses and consequential wear. Generally, replacement of the retaining tool requires significant disassembly of the nut-runner, which leads to manufacturing downtime.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a rotary-drive sub-assembly, comprising a tool and a tool retainer. The tool comprises a fastener-engagement portion, a first threaded portion, and a tool-change-engagement portion between the fastener-engagement portion and the first threaded portion. The tool retainer comprises a symmetry axis and a second threaded portion. The second threaded portion is configured to be threadably fastened with the first threaded portion of the tool so that the tool is rotationally anchored relative to the tool retainer about the symmetry axis and is translationally anchored relative to the tool retainer along the symmetry axis. The tool retainer further comprises a key, which is fixed relative to the second threaded portion, and a retaining surface, which is fixed relative to the key.

Another example of the subject matter according to the present disclosure relates to a rotary drive, comprising a rotary-drive sub-assembly and a tool retainer. The rotary-drive sub-assembly comprises a tool and a tool retainer. The tool comprises a fastener-engagement portion, a first threaded portion, and a tool-change-engagement portion between the fastener-engagement portion and the first threaded portion. The tool retainer comprises a symmetry axis and a second threaded portion, configured to be threadably fastened with the first threaded portion of the tool so that the tool is rotationally anchored relative to the tool retainer about the symmetry axis and is translationally anchored relative to the tool retainer along the symmetry axis. The tool retainer further comprises a key, fixed relative to the second threaded portion, and a retaining surface, fixed relative to the key. The rotary drive also comprises a retaining assembly, configured to engage the key of the tool retainer to limit rotation of the tool retainer about the symmetry axis, and a socket, co-axially rotatable relative to the tool retainer of the rotary-drive sub-assembly when the retaining assembly engages the key of the tool retainer.

A further example of the subject matter according to the present disclosure relates to a tool, comprising a fastener-engagement portion, a first threaded portion, and a tool-change-engagement portion between the fastener-engagement portion and the first threaded portion.

Yet another example of the subject matter according to the present disclosure relates to a rotary-drive sub-assembly, comprising a tool and a tool retainer. The tool comprises a fastener-engagement portion, a first threaded portion, and a tool-change-engagement portion between the fastener-engagement portion and the first threaded portion. The tool retainer comprises a body and a retaining member. The body comprises a symmetry axis, a second threaded portion, configured to be threadably fastened with the first threaded portion of the tool so that the tool is rotationally anchored relative to the body of the tool retainer about the symmetry axis and is translationally anchored relative to the body of the tool retainer along the symmetry axis, and a key, fixed relative to the second threaded portion. The tool retainer further comprises a retaining member that is removably coupled to the body at a fixed location.

Another example of the subject matter according to the present disclosure relates to a rotary drive, comprising a tool and a tool retainer. The tool comprises a fastener-engagement portion, a first threaded portion, and a tool-change-engagement portion between the fastener-engagement portion and the first threaded portion. The tool retainer comprises a body and a retaining member. The body comprises a symmetry axis, a second threaded portion, configured to be threadably fastened with the first threaded portion of the tool so that the tool is rotationally anchored relative to the body of the tool retainer about the symmetry axis and is translationally anchored relative to the body of the tool retainer along the symmetry axis, and a key, fixed relative to the second threaded portion. The tool retainer further comprises a retaining member that is removably coupled to the body at a fixed location. The rotary drive further comprises a retaining assembly, configured to be coupled with the key of the tool retainer to limit rotation of the tool retainer about the symmetry axis, and a socket, co-axially rotatable relative to the tool retainer when the retaining assembly is coupled with the key of the tool retainer.

Still another example of the subject matter according to the present disclosure relates to a method of threadably coupling a first fastener with a second fastener using a rotary drive that comprises a tool. The method comprises rotationally anchoring the second fastener relative to the tool by co-axially urging a fastener-engagement portion of the tool against the second fastener and rotating the tool relative to the second fastener using a socket of the rotary drive until the fastener-engagement portion of the tool mates with a receiving portion of the second fastener. The method further comprises receiving the first fastener within the socket of the rotary drive co-axially with the fastener-engagement portion of the tool. The method additionally comprises rotating the first fastener with the socket of the rotary drive relative to a housing of the rotary drive to cause the first fastener to threadably engage the second fastener.

One example of the subject matter according to the present disclosure relates to a rotary-drive sub-assembly, comprising a tool and a tool retainer. The tool comprises a first body and a second body. The first body comprises a tool-change-engagement portion and a first threaded portion that is fixed relative to the tool-change-engagement portion. The second body comprises a fastener-engagement portion. The second body is translatable relative to the first body, co-axially with the first body, and is co-axially rotationally fixed relative to the first body. The tool further comprises a keeper, fixed within the first body, and a resilient member, captured between the second body and the keeper. The tool also comprises a tool retainer, comprising a second threaded portion, configured to be threadably fastened with the first threaded portion of the first body, and a key, fixed relative to the second threaded portion.

Another example of the subject matter according to the present disclosure relates to a rotary drive, comprising a tool, a tool retainer, a retainer, and a socket. The tool comprises a first body and a second body. The first body comprises a tool-change-engagement portion and a first threaded portion that is fixed relative to the tool-change-engagement portion. The second body comprises a fastener-engagement portion. The second body is translatable relative to the first body, co-axially with the first body, and is co-axially rotationally fixed relative to the first body. The tool further comprising a keeper, fixed within the first body, and a resilient member, captured between the second body and the keeper. The tool retainer comprises a second threaded portion, configured to be threadably engaged with the first threaded portion of the first body, and a key, fixed relative to the second threaded portion. The retainer is configured to be coupled with the key of the tool retainer. The socket is co-axially rotatable relative to the tool retainer when the retainer is coupled with the key of the tool retainer.

Still another example of the subject matter according to the present disclosure relates to a tool, comprising a first body, a second body, a keeper, and a resilient member. The first body comprises a tool-change-engagement portion and a first threaded portion that is fixed relative to the tool-change-engagement portion. The second body comprises a fastener-engagement portion. The second body is translatable relative to the first body, co-axially with the first body, and is co-axially rotationally fixed relative to the first body. The keeper is fixed within the first body and the resilient member is captured between the second body and the keeper.

Yet another example of the subject matter according to the present disclosure relates to a method of threadably coupling a first fastener with a second fastener using a rotary drive comprising a tool. The method comprises rotationally anchoring the second fastener relative to the tool by co-axially urging a fastener-engagement portion of the tool against the second fastener and rotating the tool relative to the second fastener until the fastener-engagement portion of the tool mates with a receiving portion of the second fastener. The method further comprises receiving the first fastener within a socket of the rotary drive co-axially with the fastener-engagement portion of the tool. The method also comprises rotating the first fastener with the socket of the rotary drive relative to a housing of the rotary drive to cause the first fastener to threadably engage the second fastener. When the first fastener is rotated with the socket of the rotary drive relative to the housing in a first direction to cause the first fastener to threadably engage the second fastener while the fastener-engagement portion of the tool is mated with the receiving portion of the second fastener to rotationally anchor the second fastener relative to the tool of the rotary drive, the fastener-engagement portion of the tool is co-axially translated relative to a tool-change-engagement portion of the tool and relative to the socket of the rotary drive.

Another example of the subject matter according to the present disclosure relates to a tool-change station, comprising a base, and a first tool-change member that is rotatably coupled to the base. The first tool-change member comprises a first tool-engagement portion, geometrically complementary with a tool-change-engagement portion of a tool of a rotary drive.

One example of the subject matter according to the present disclosure relates to a method of coupling or decoupling a tool of a rotary-drive sub-assembly and a tool retainer of the rotary-drive sub-assembly. The method comprises rotationally anchoring the tool to a first tool-change member, rotatably coupled to a base, by engaging a tool-change-engagement portion of the tool with a first tool-engagement portion of the first tool-change member. The base has a first side and a second side, opposite the first side. The method also comprises causing relative rotation between the tool and the tool retainer.

BRIEF DESCRIPTION OF THE DRAWINGS

Figure 1A:
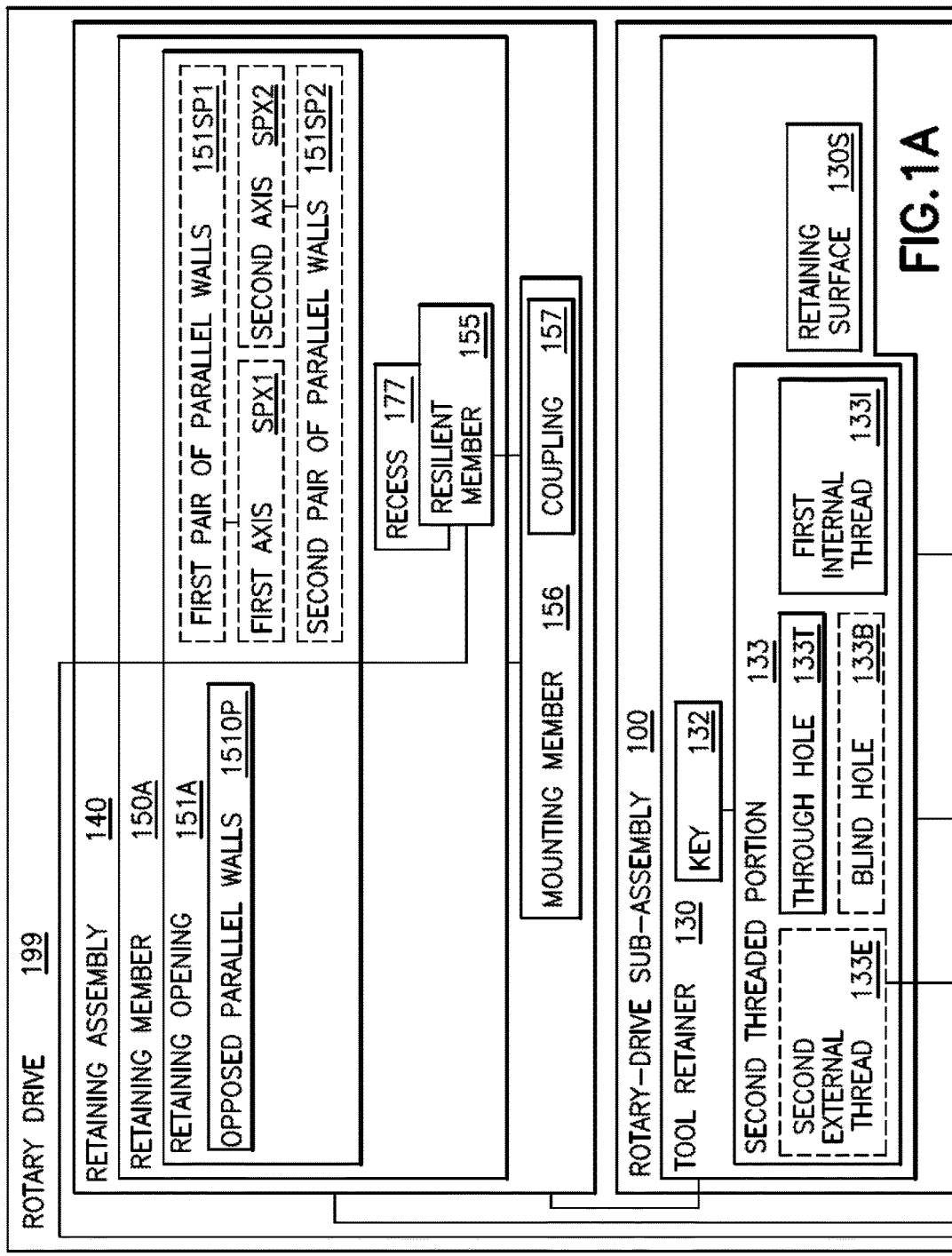
Figure 2:
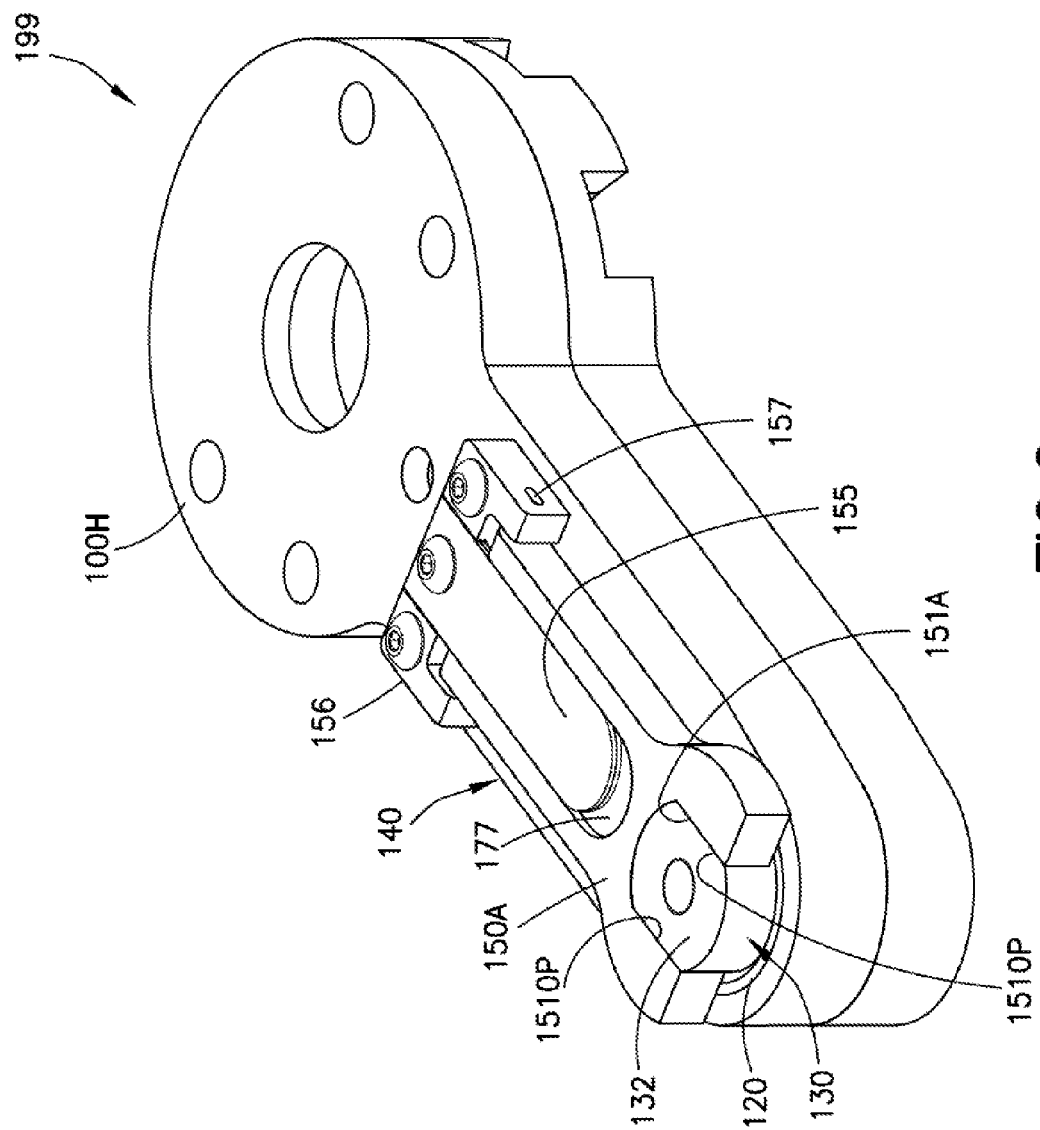
Figure 4A:
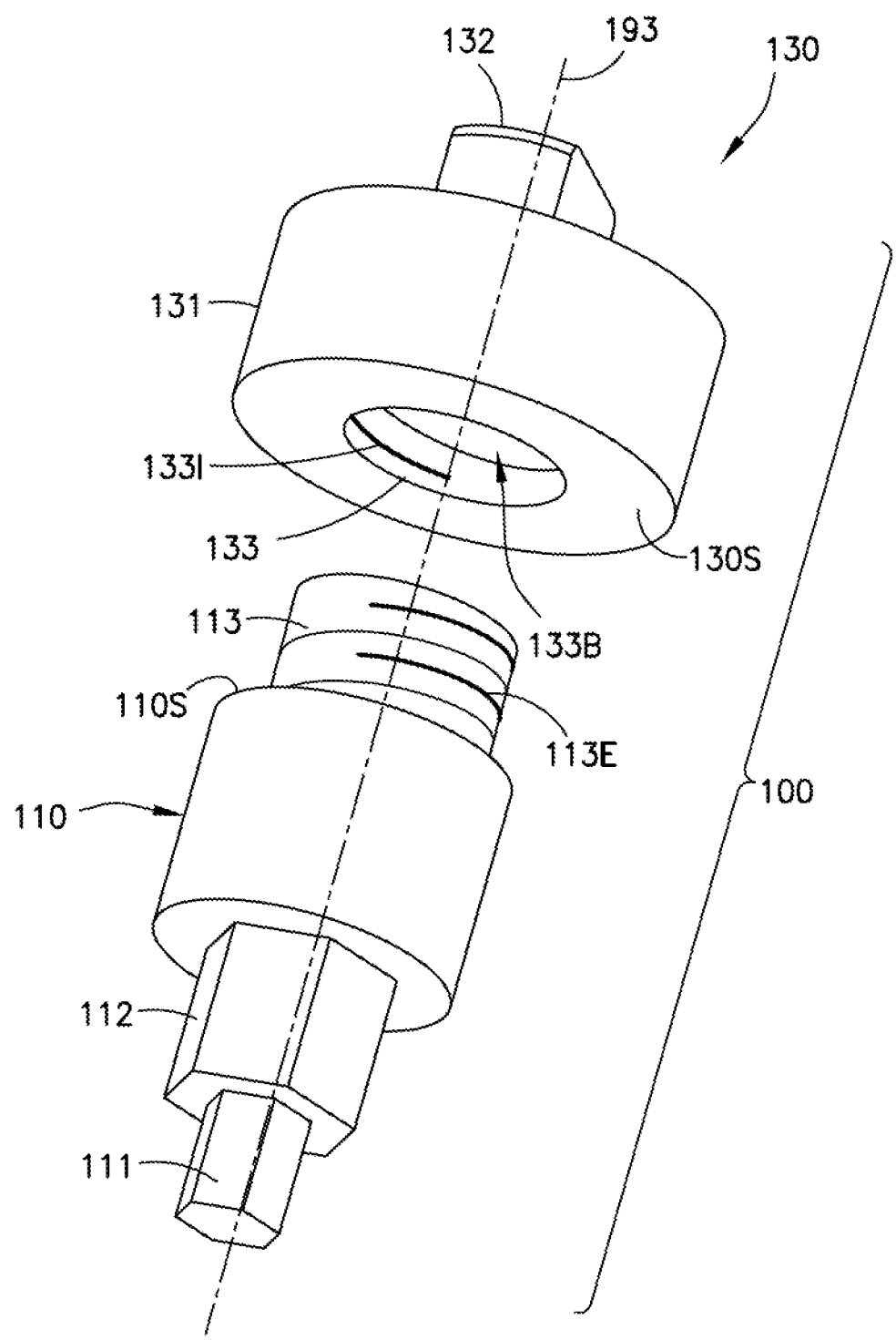
Figure 5:
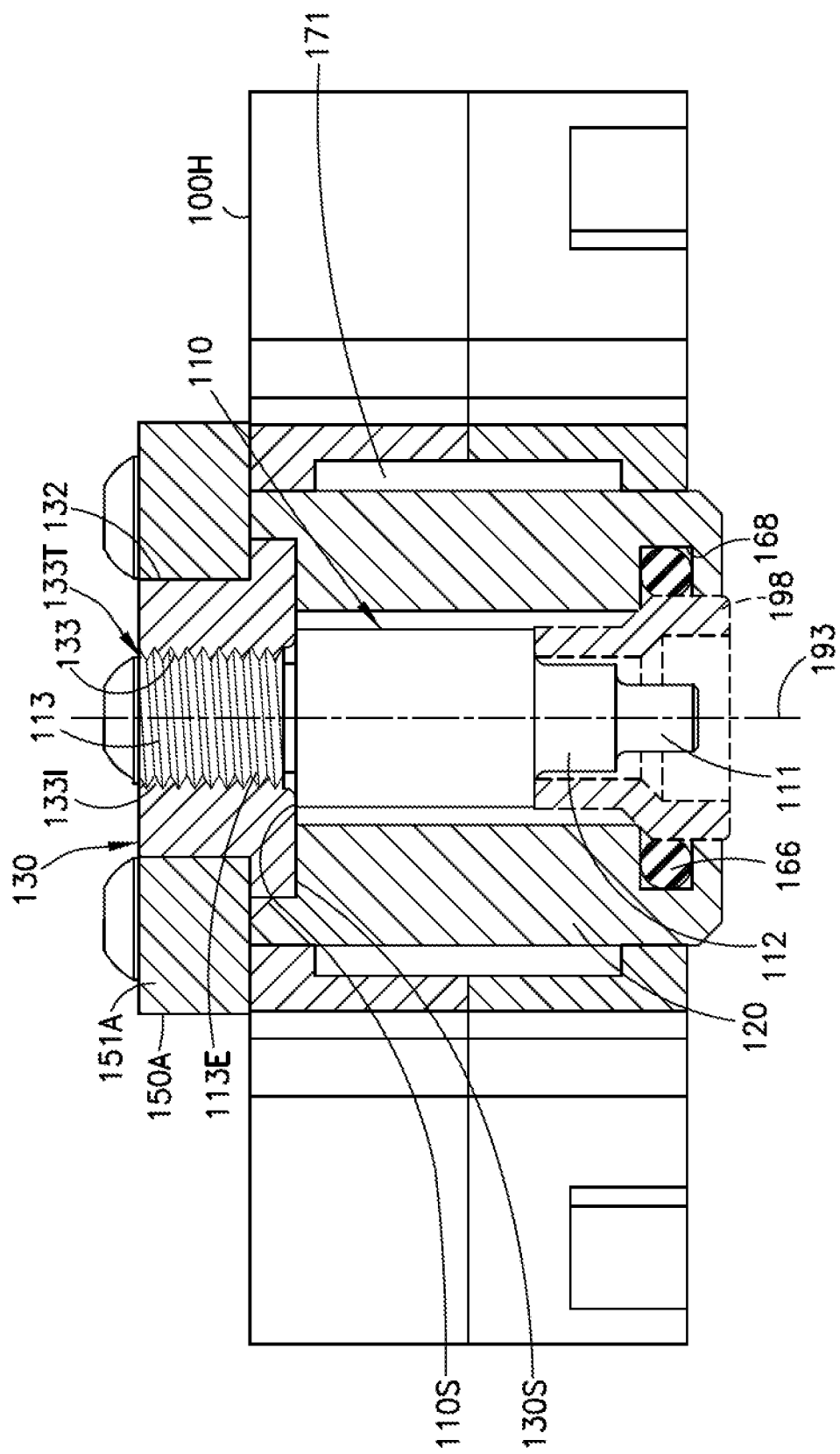
Figure 5A:
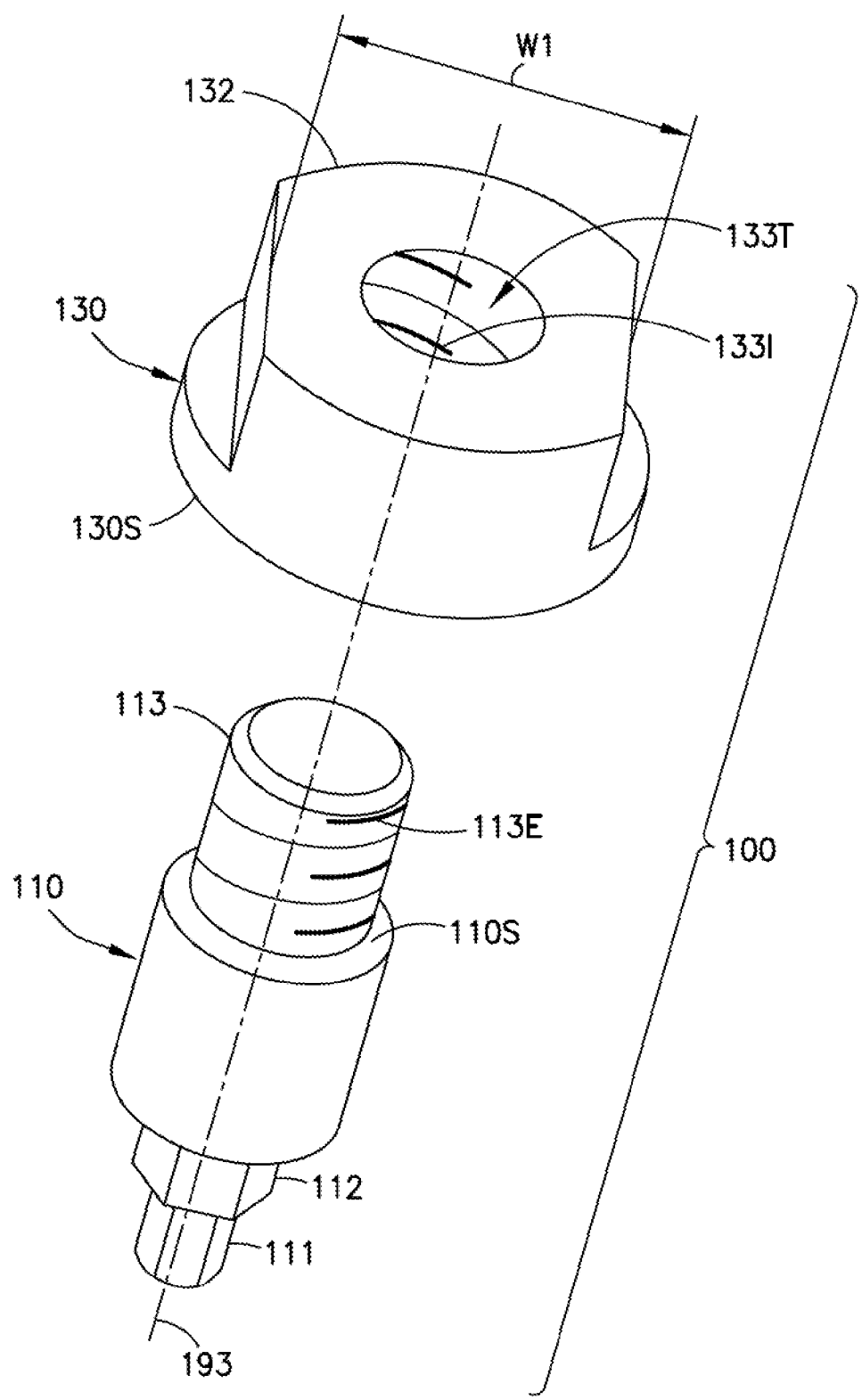
Figure 6A:
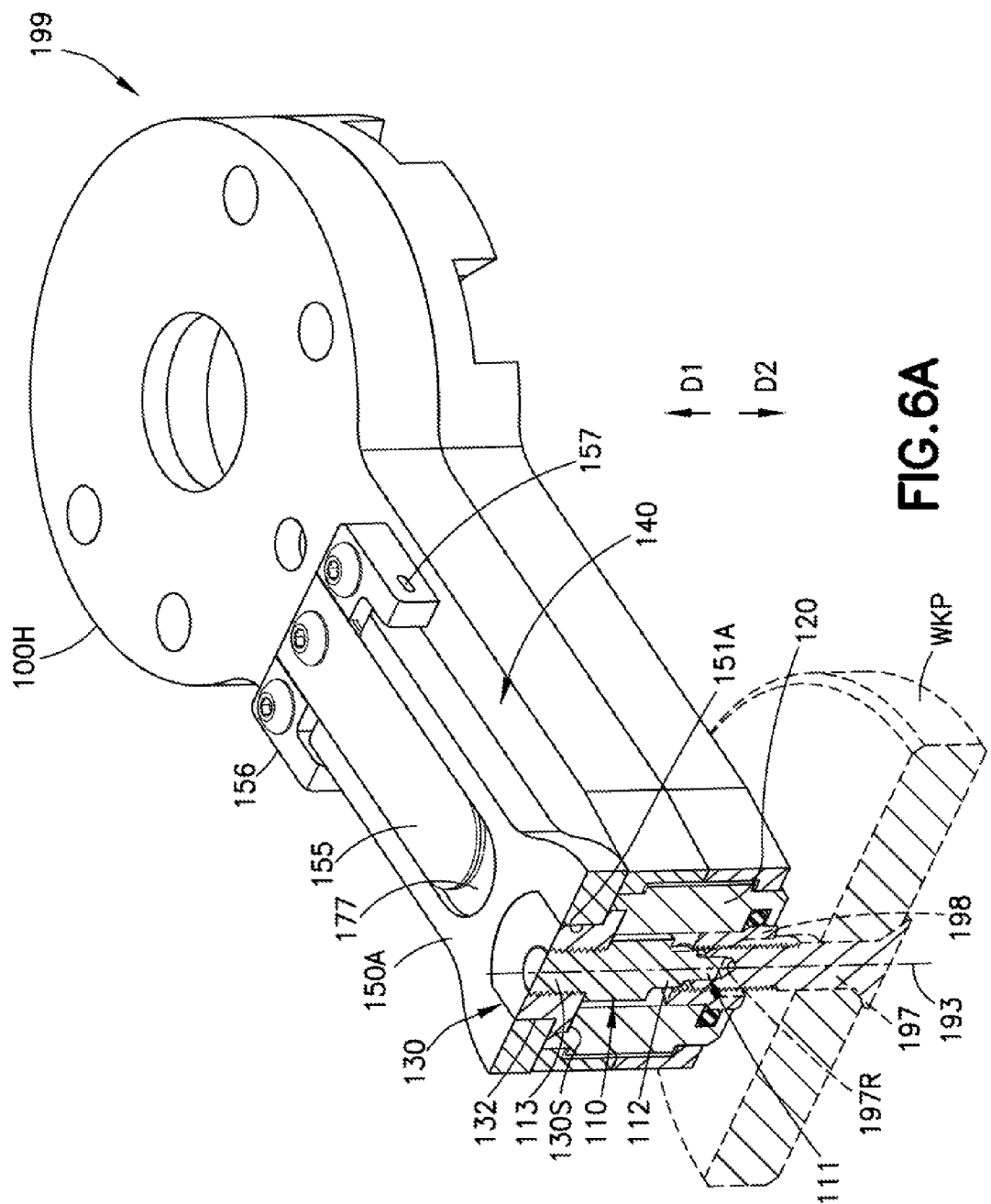
Figure 7A:
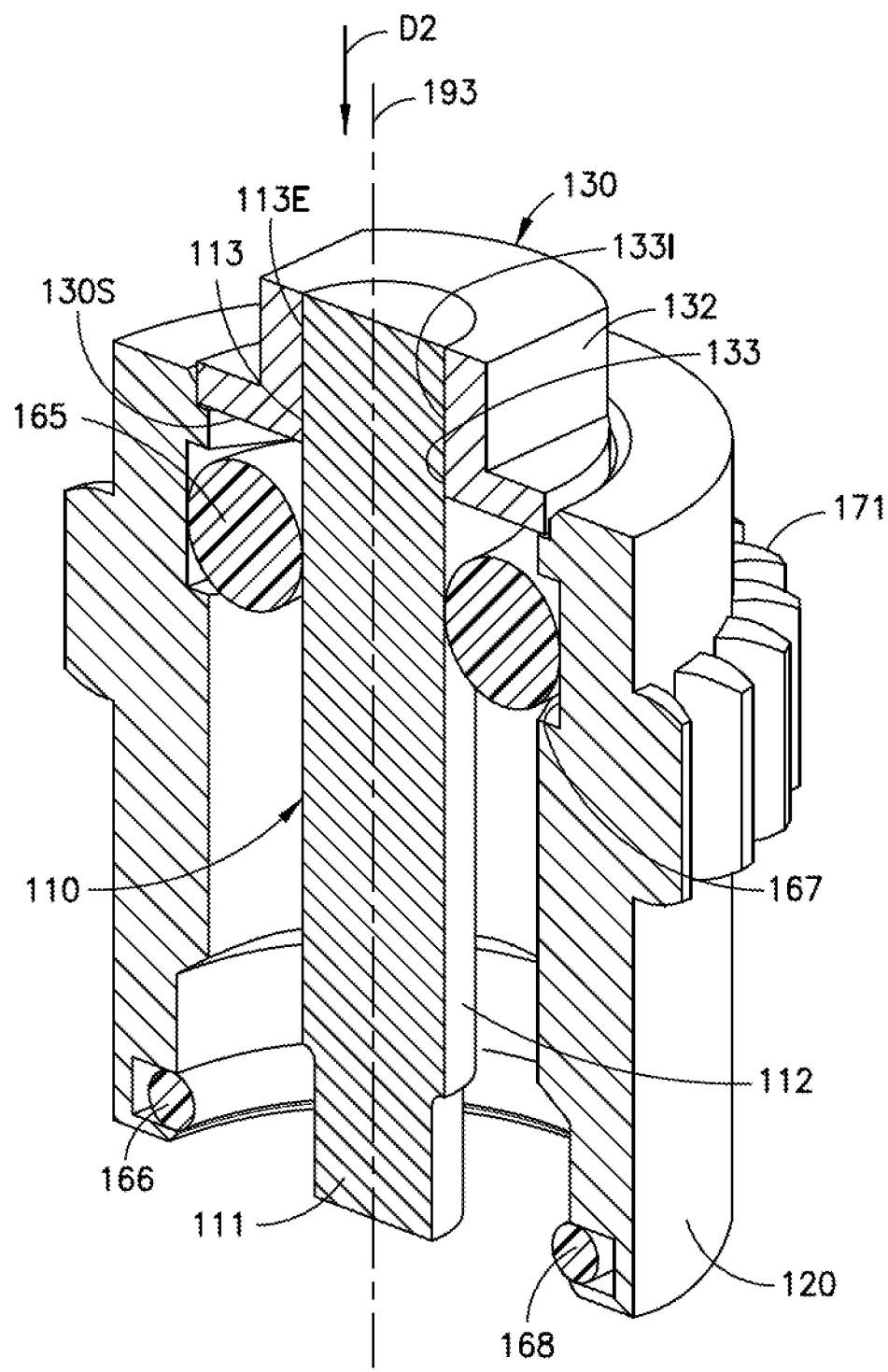
Figure 7B:
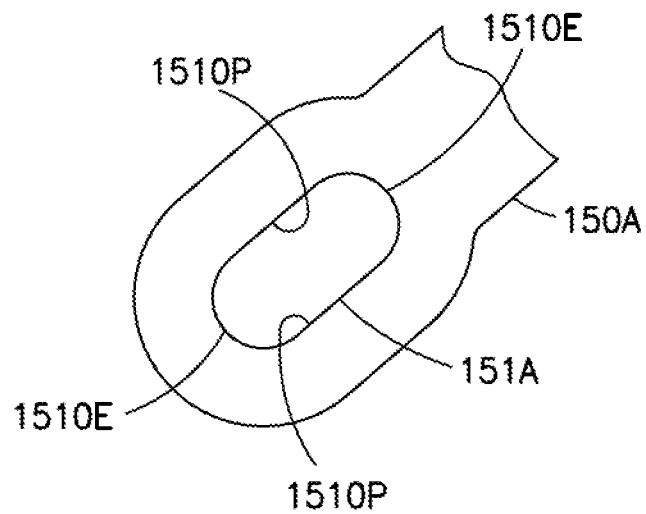
Figure 7C:
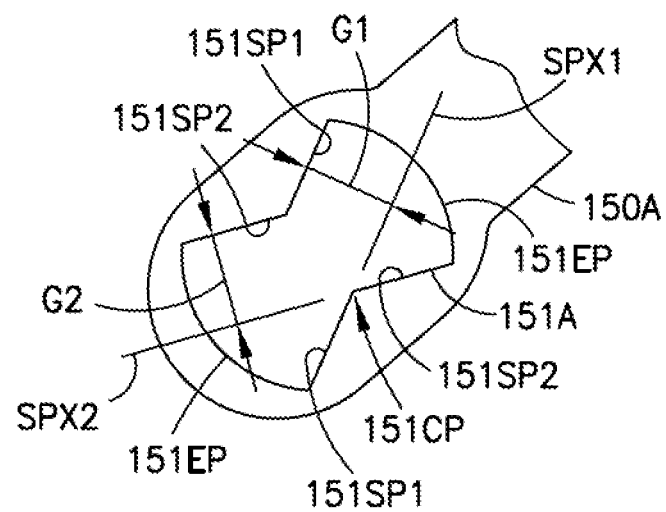
Figure 8B:
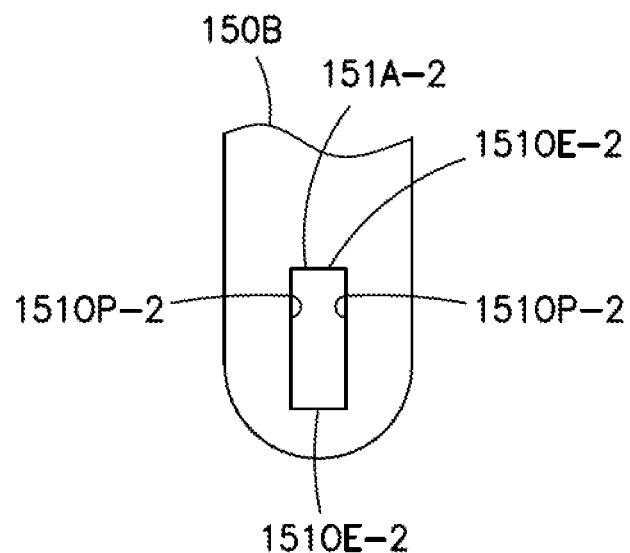
Figure 8C:
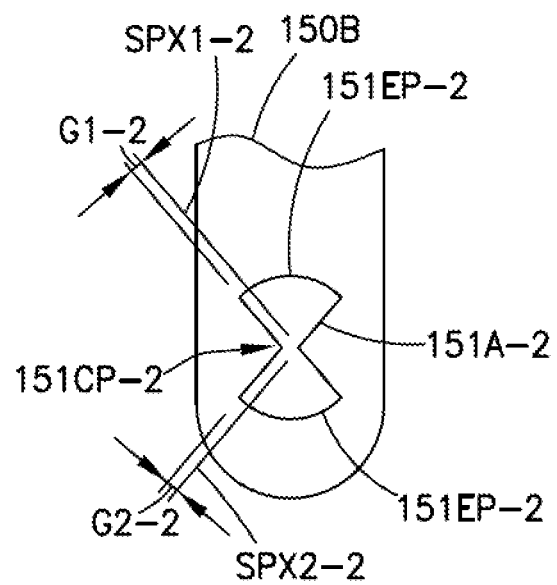
Figure 8D:
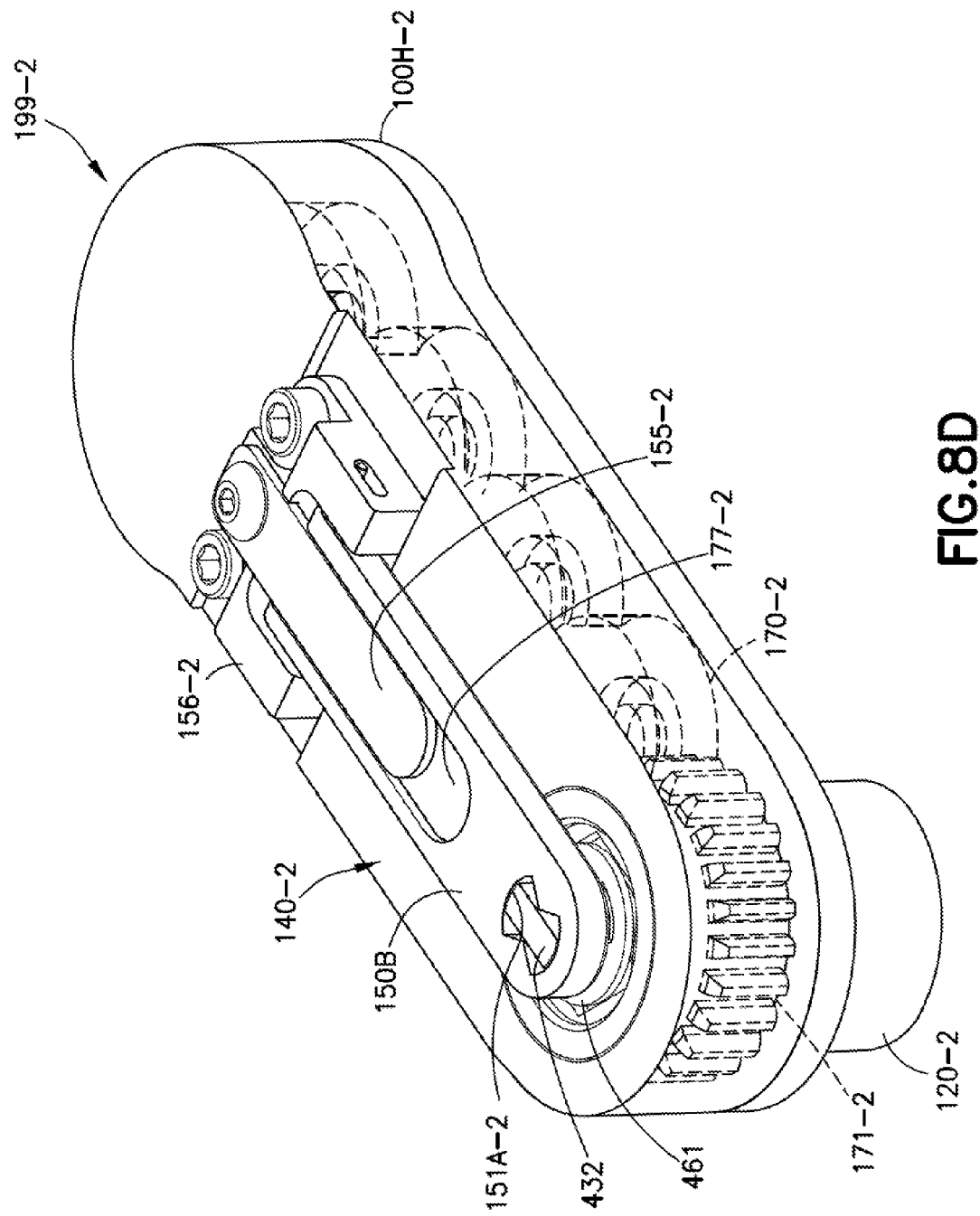
Figure 9A:
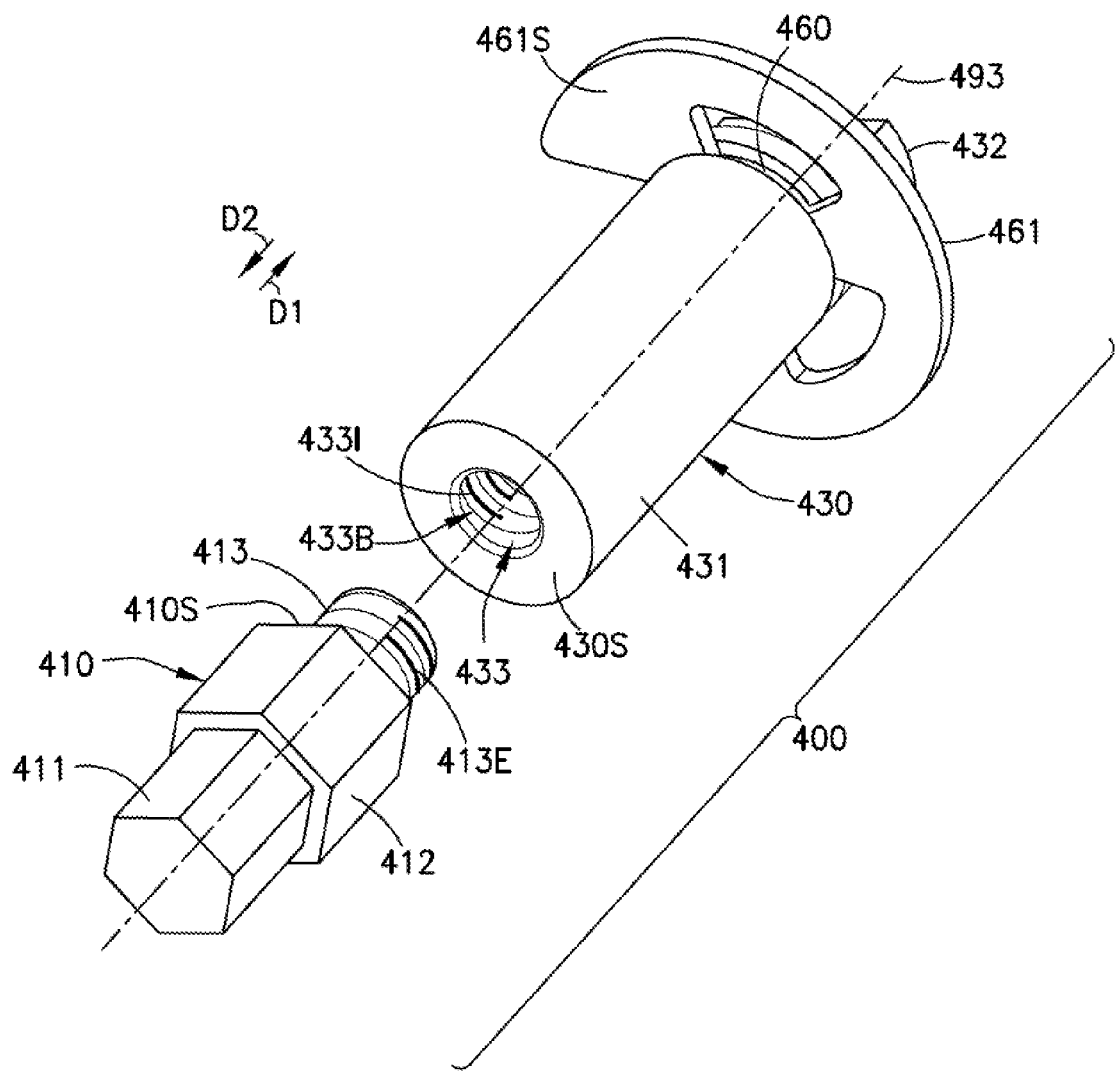
Figure 10:
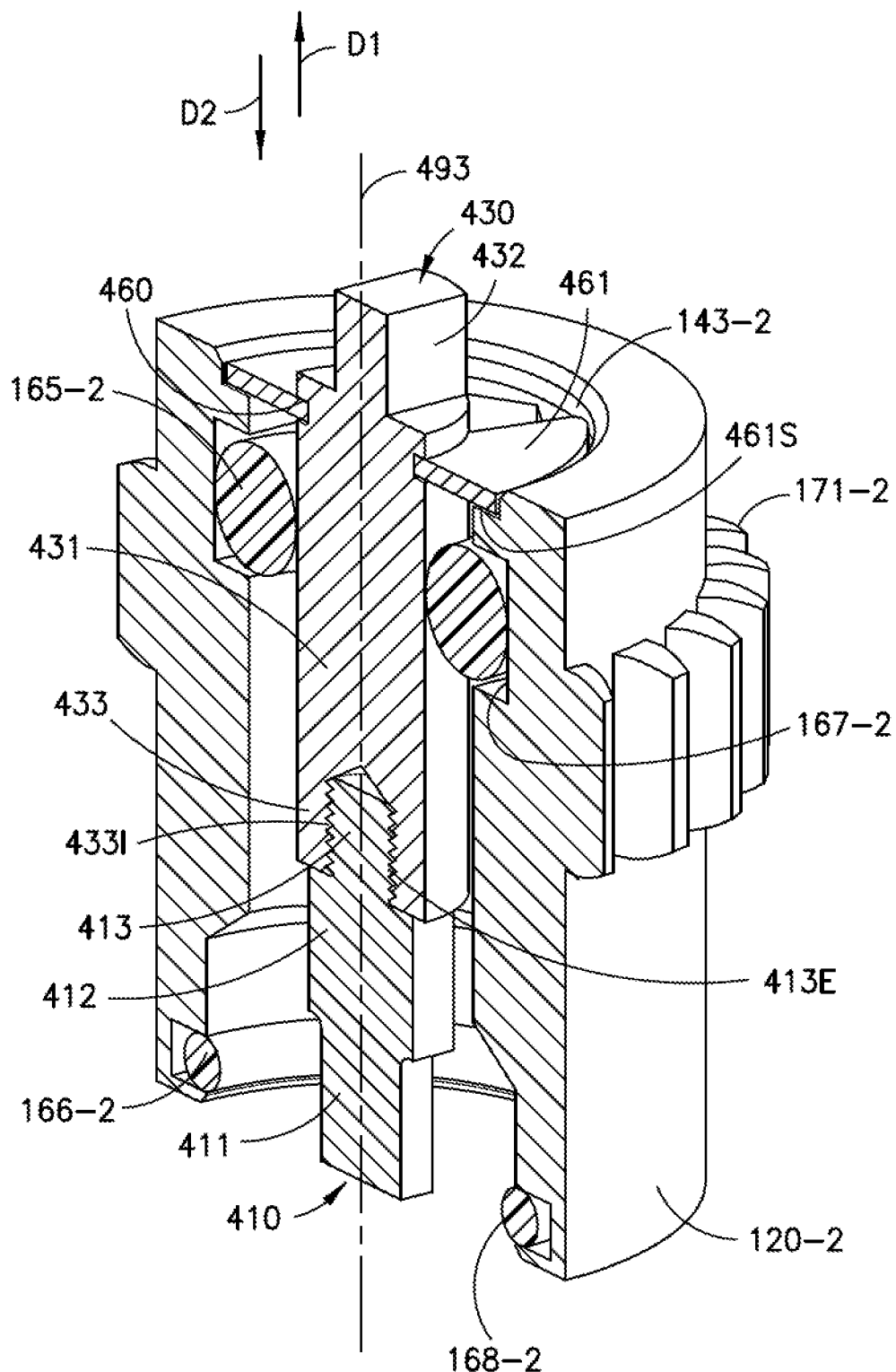
Figure 11:
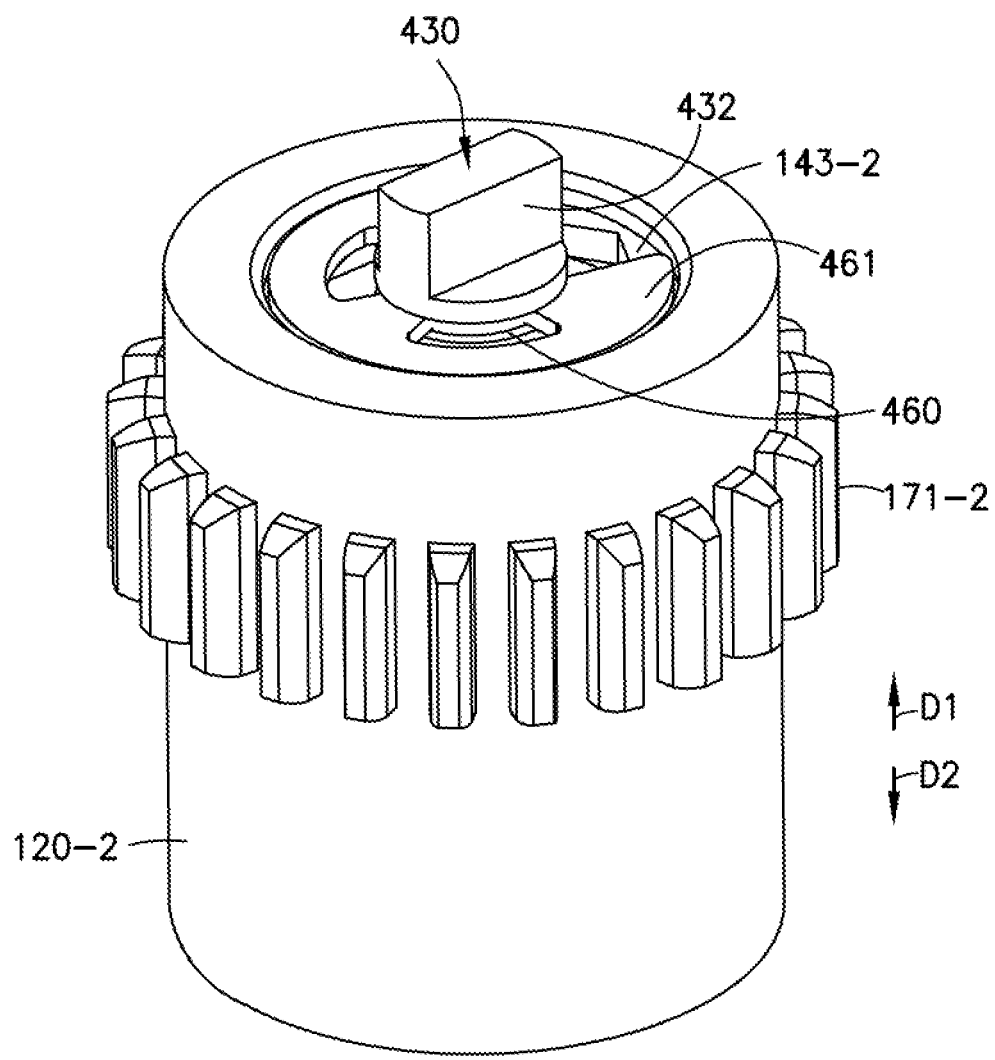
Figure 12:
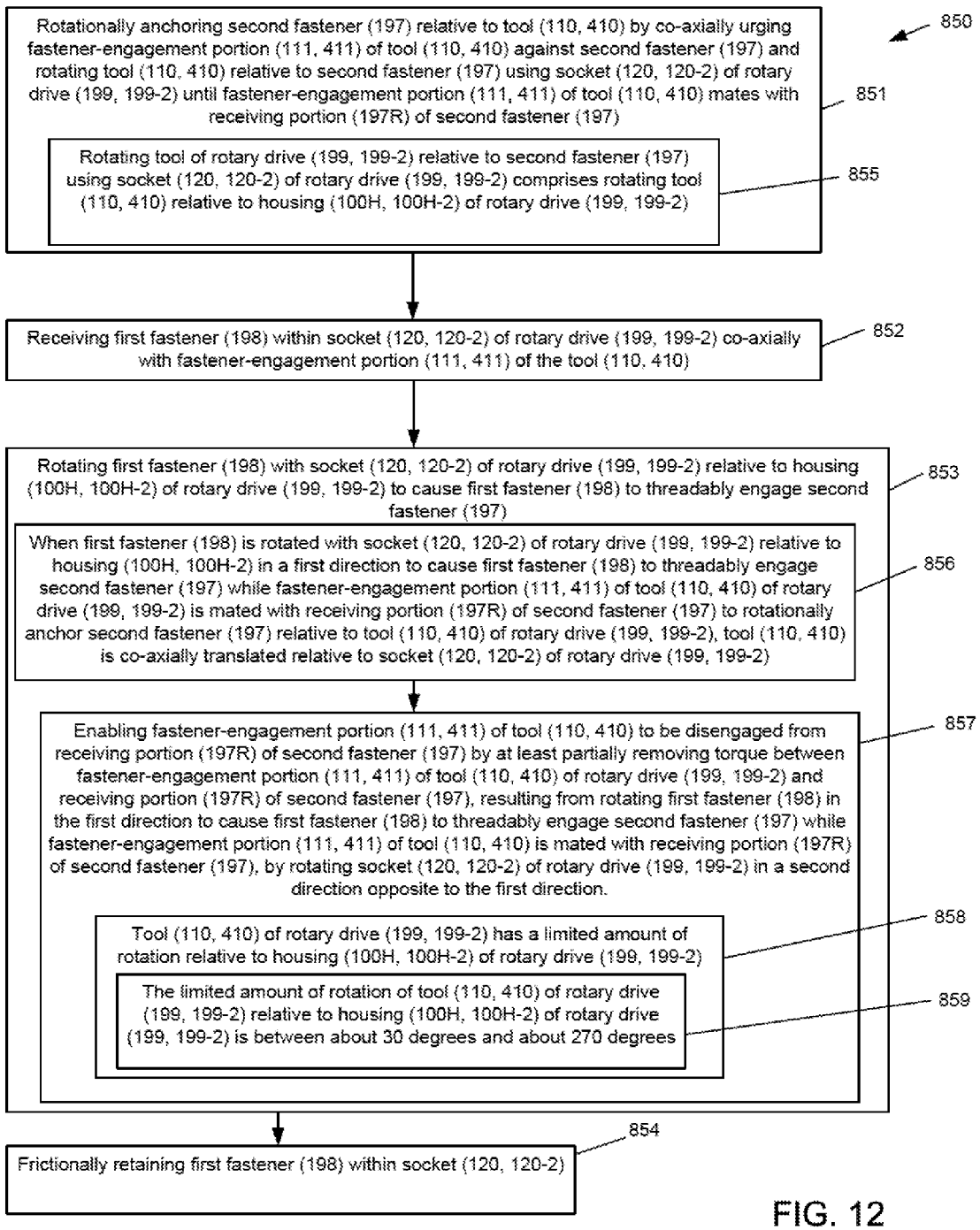
Figure 13A:
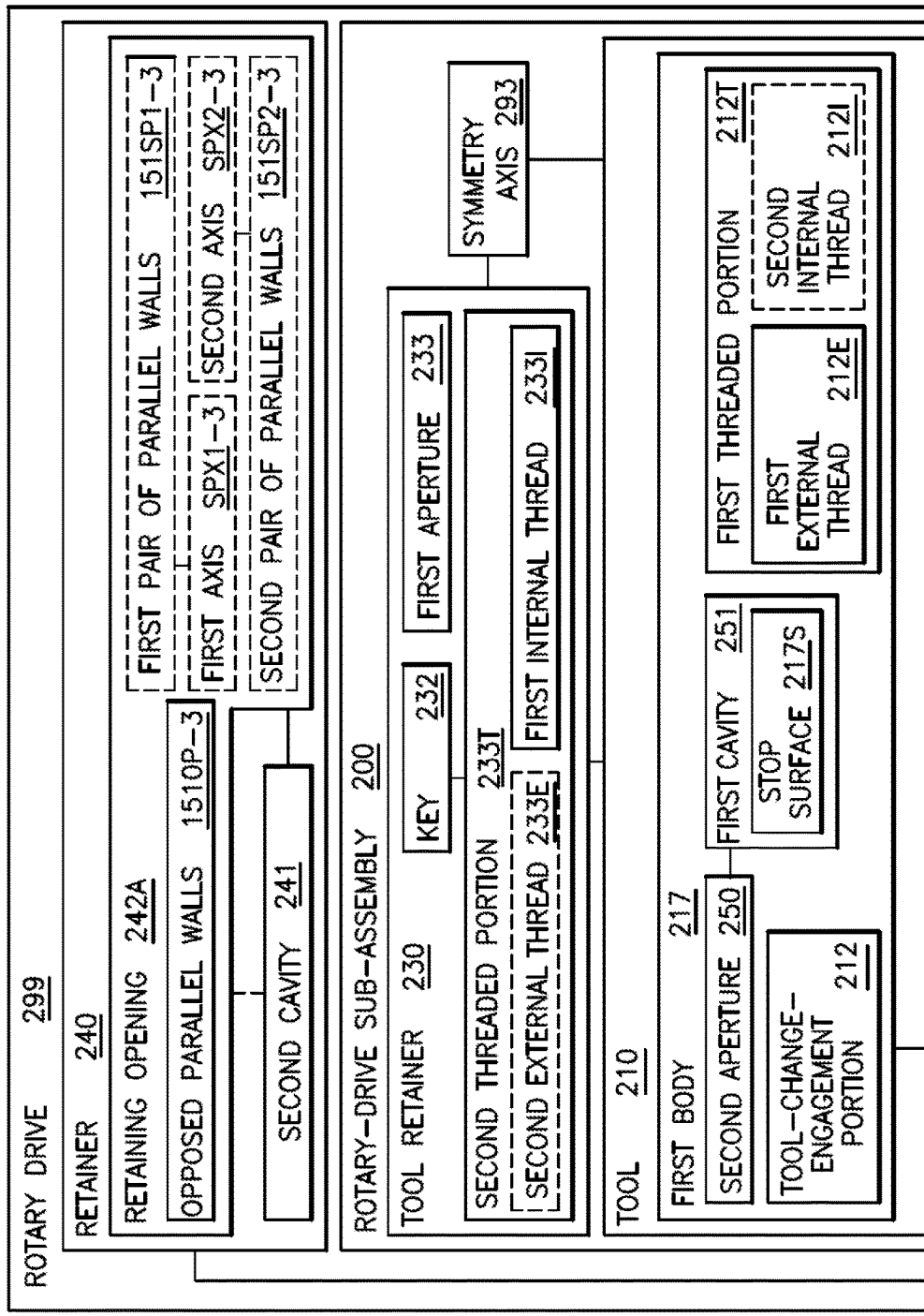
Figures 13, 13A, 13B:
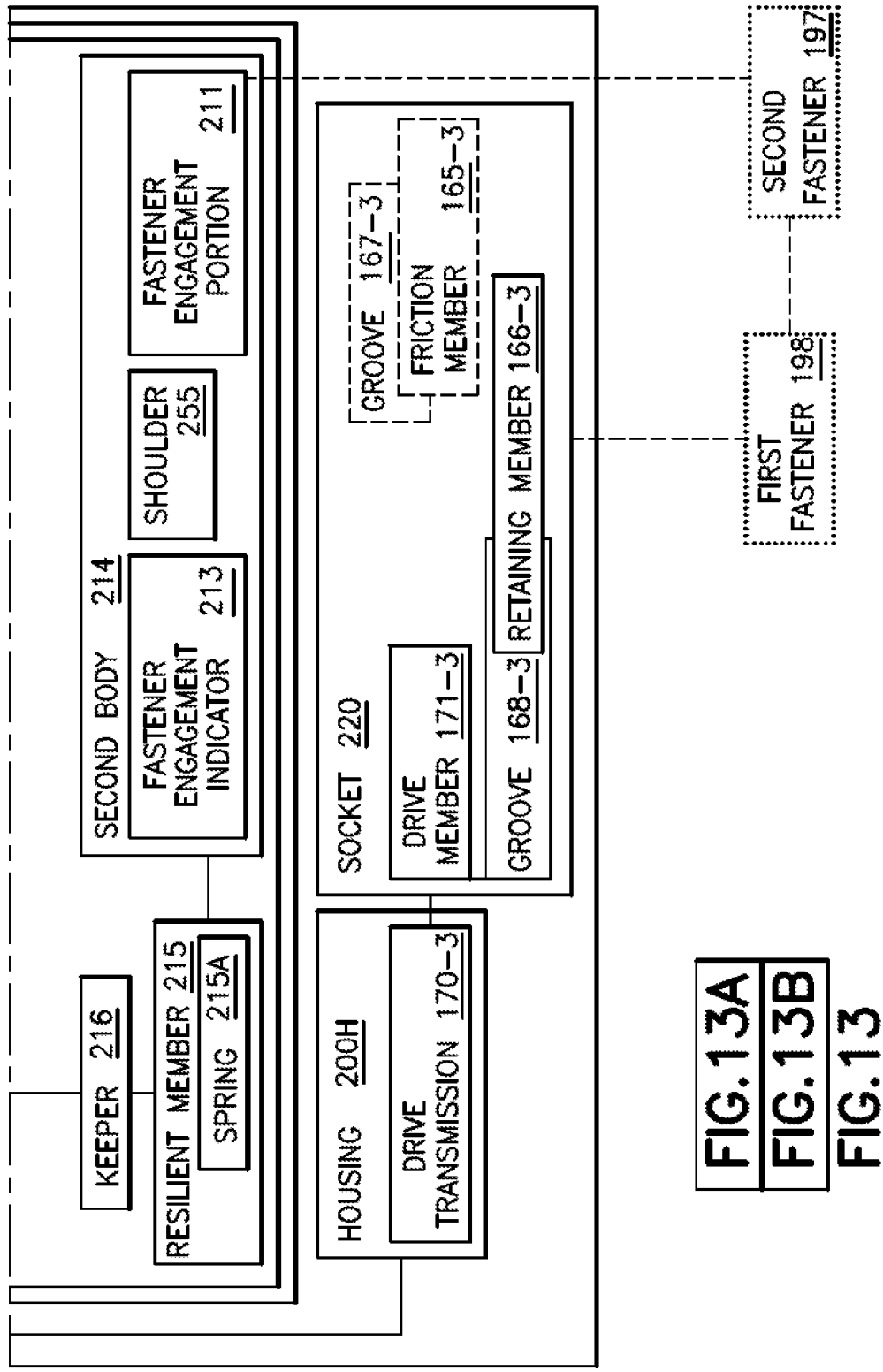
Figure 14A:
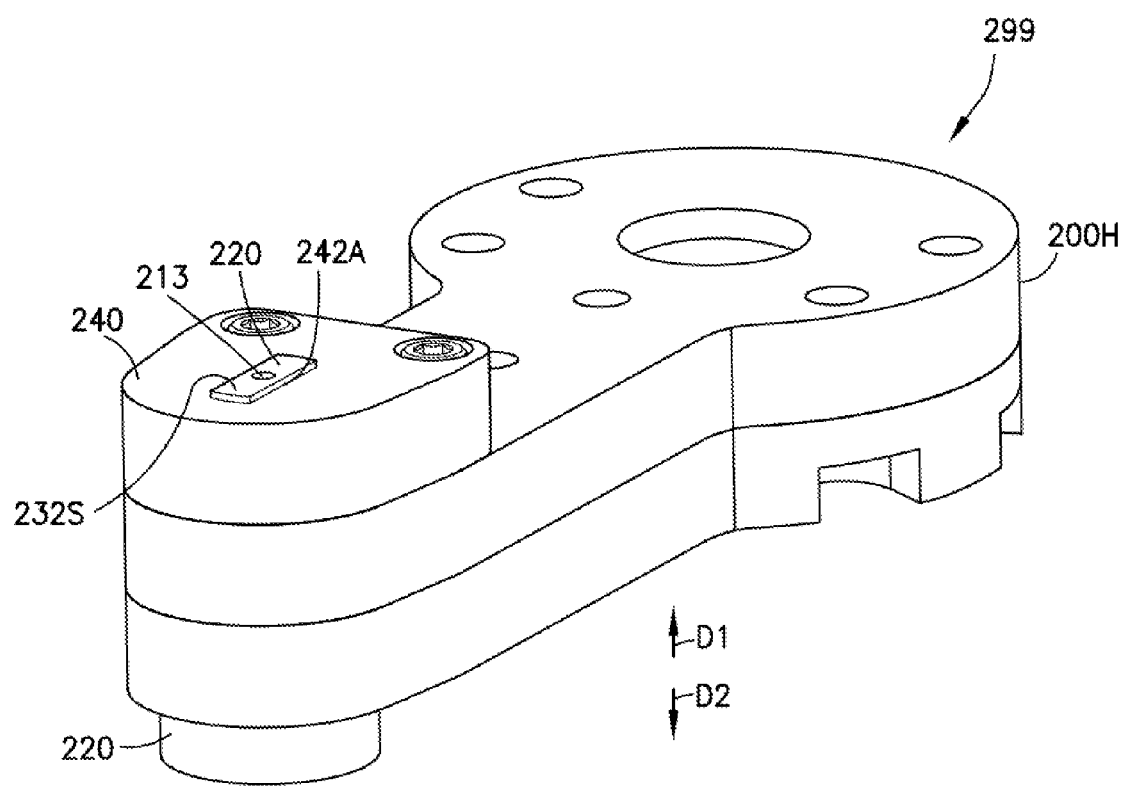
Figure 14B:
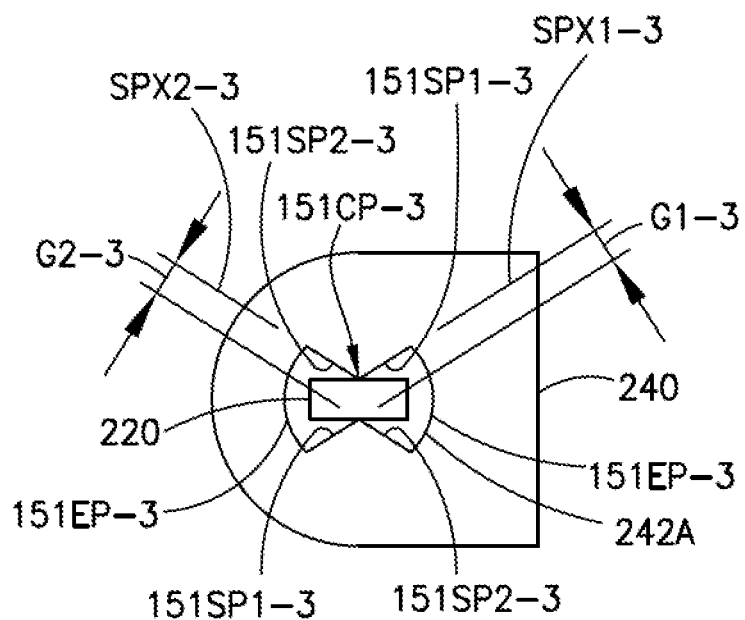
Figure 14C:
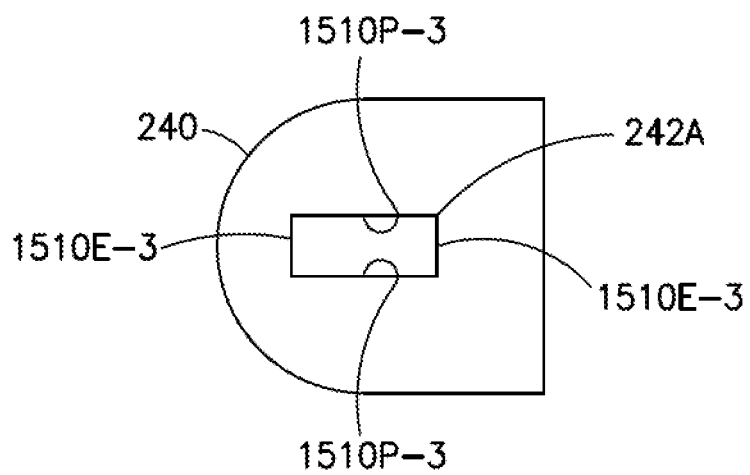
Figure 14D:
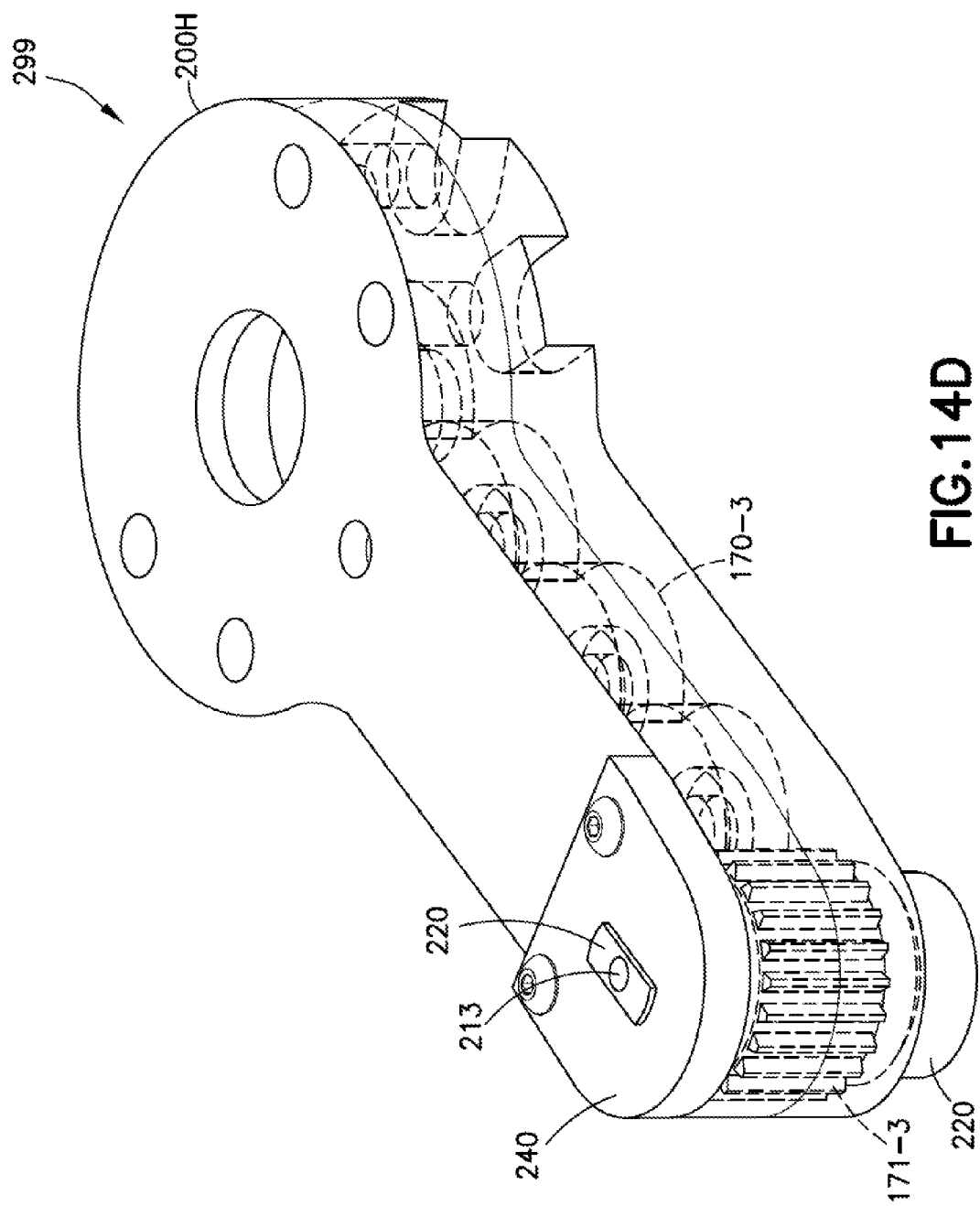
Figure 16:
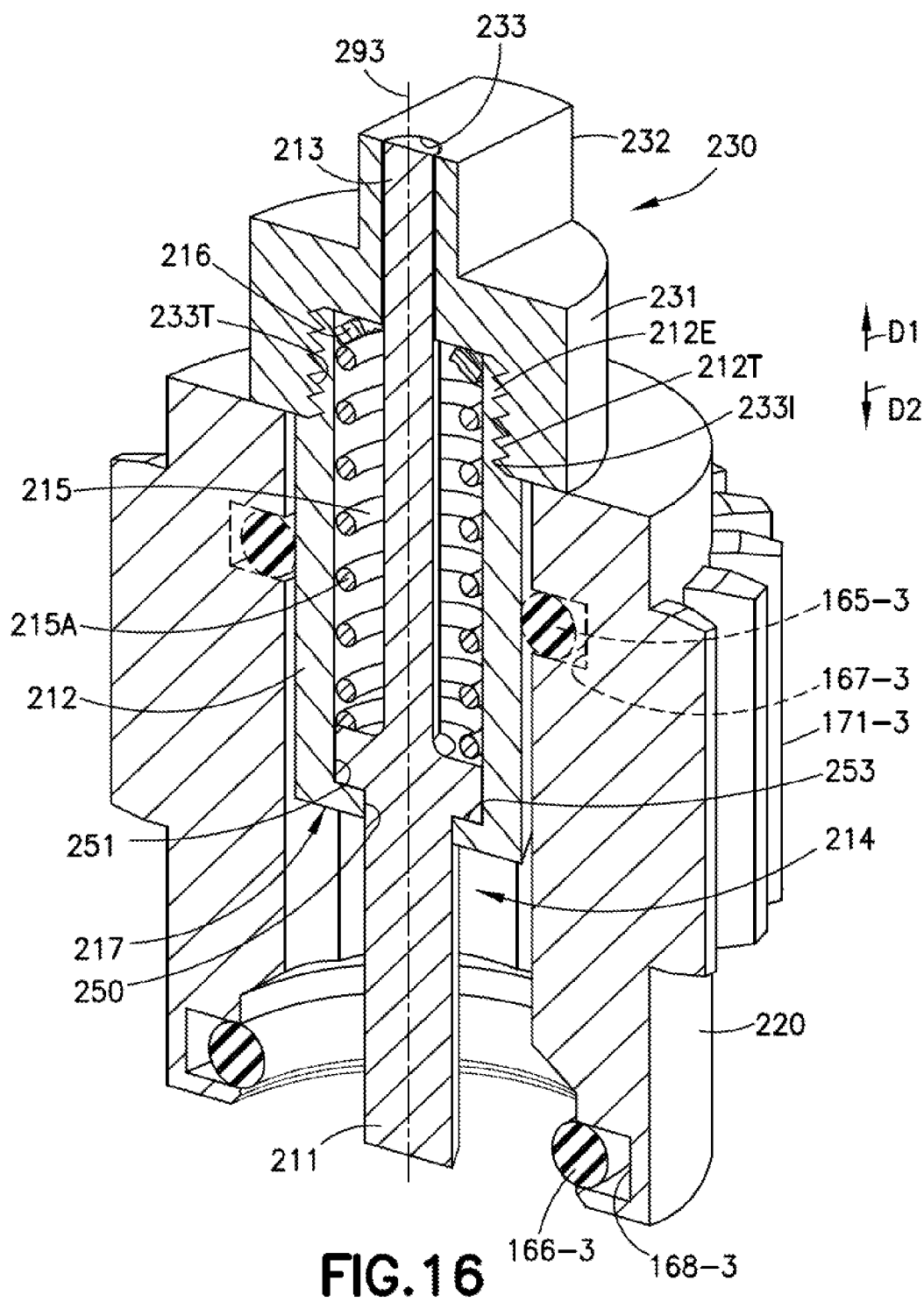
Figure 17:
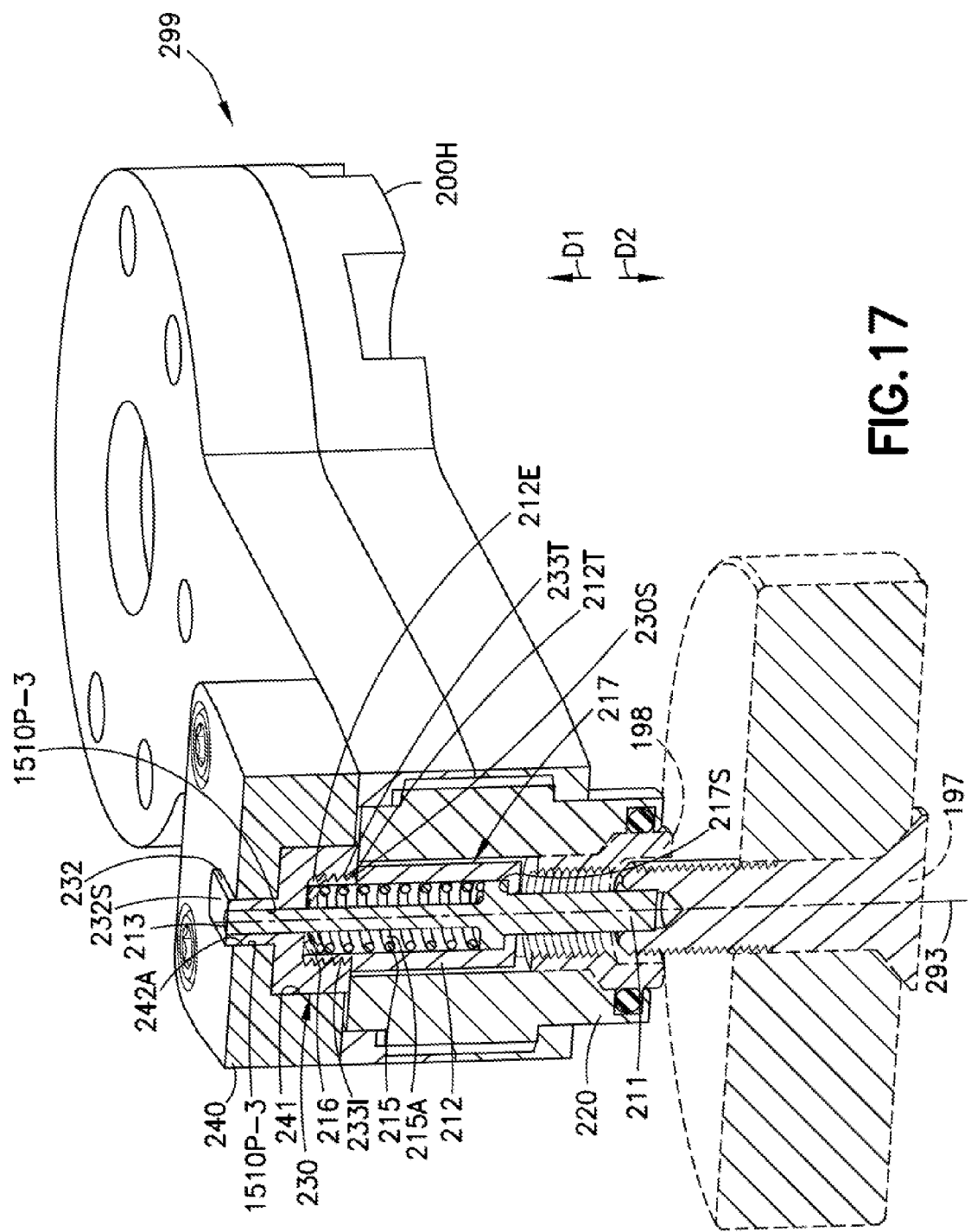
Figure 18:
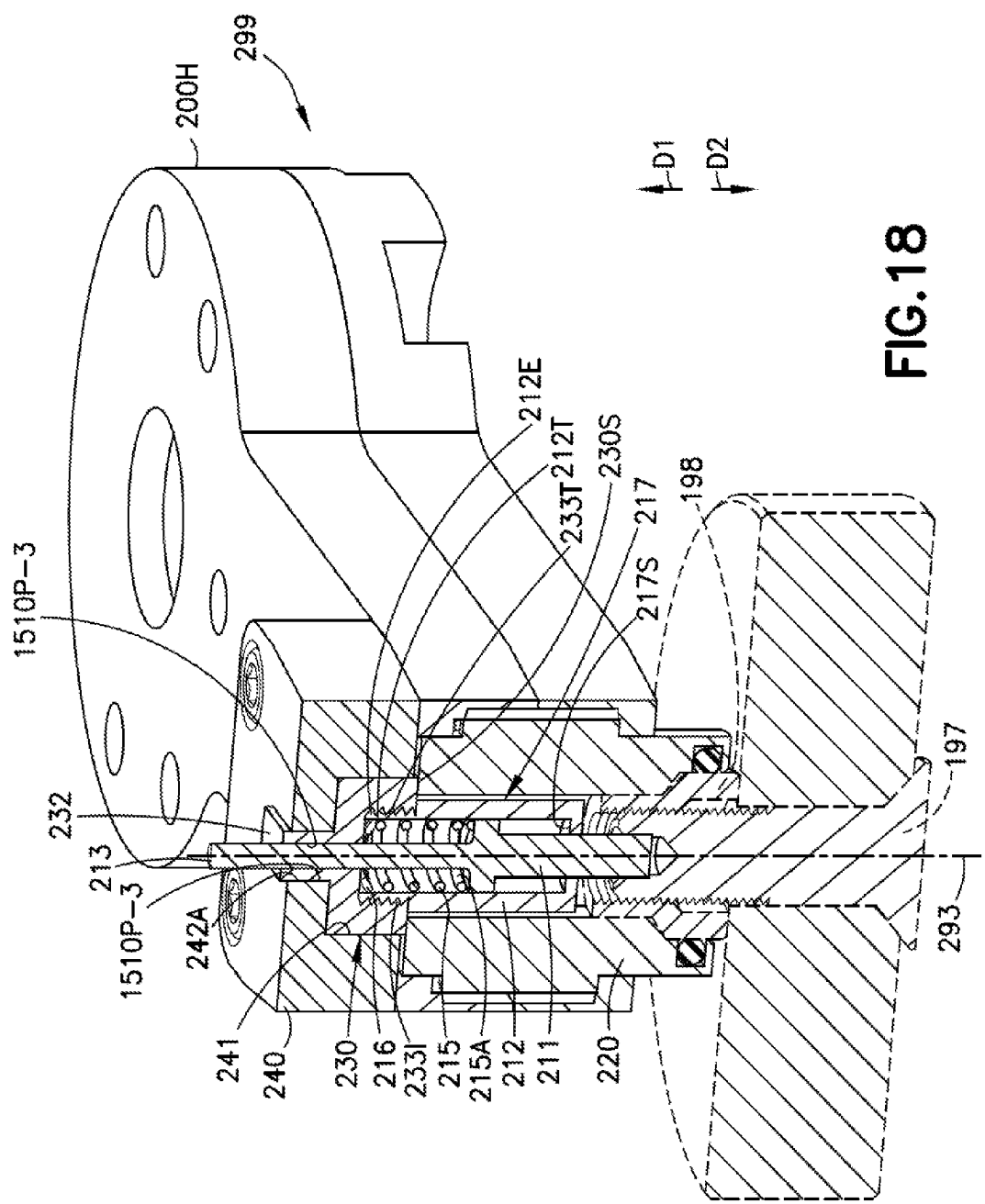
Figure 19A:
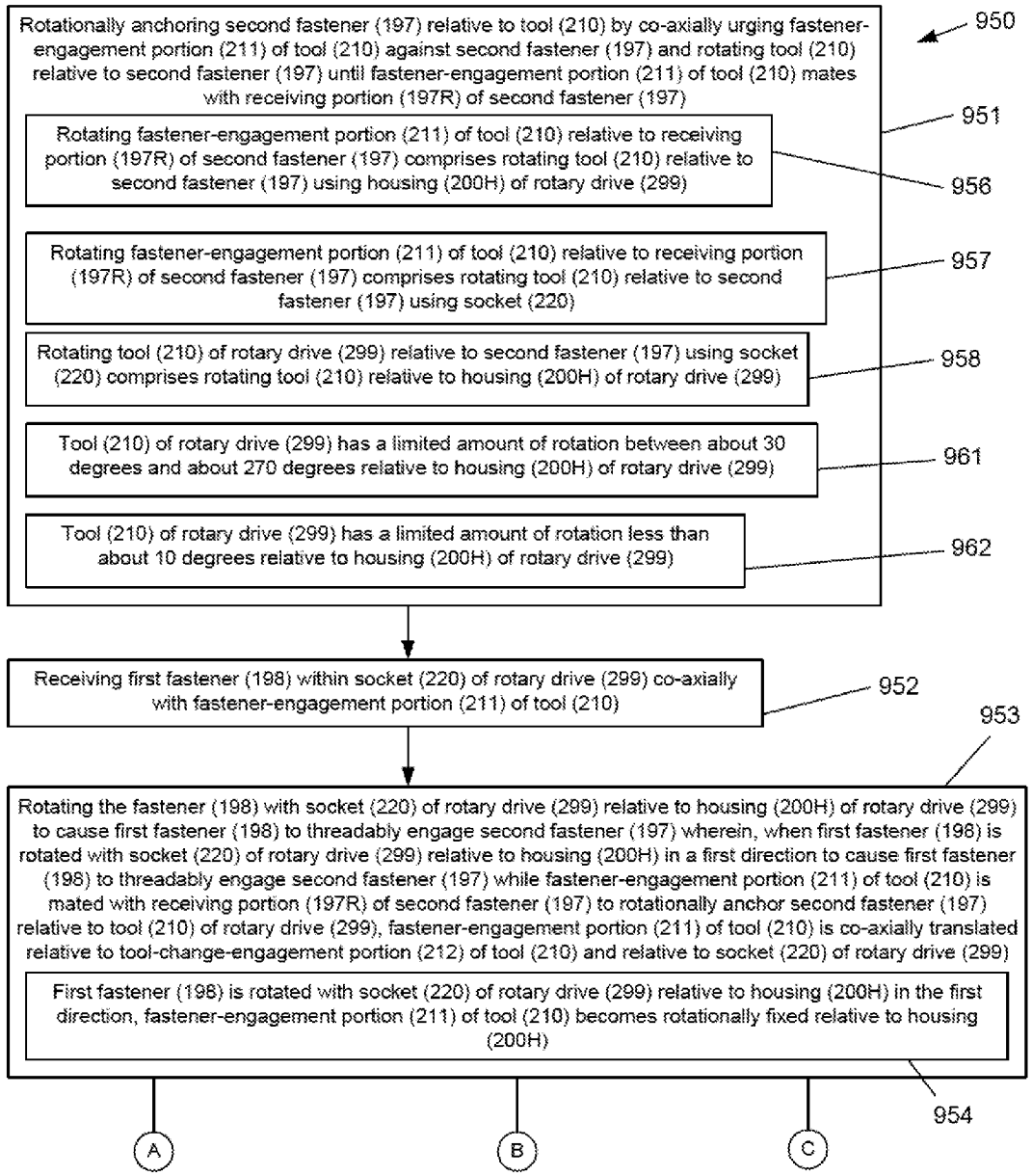
Figure 19B:
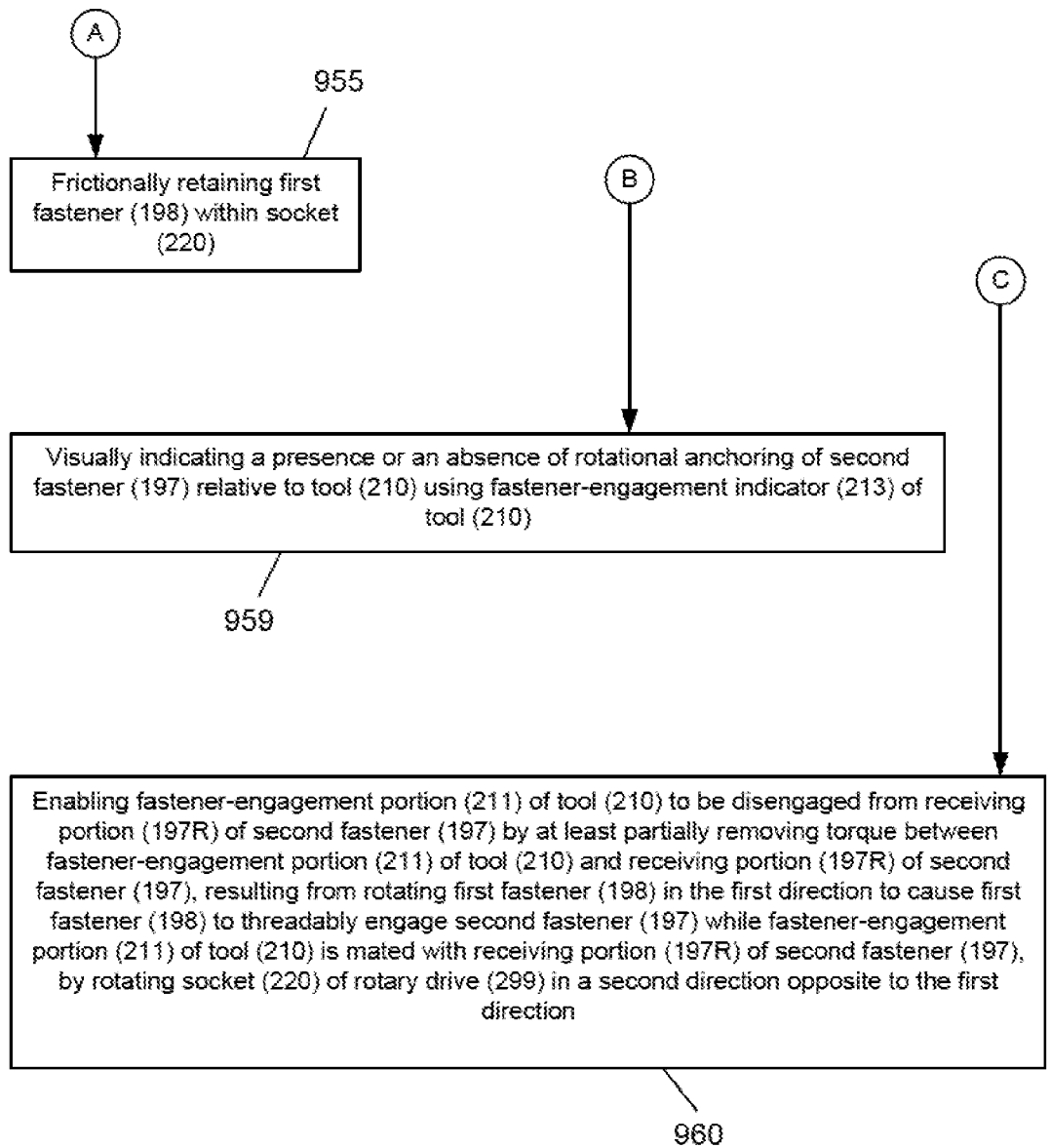
Figure 20:
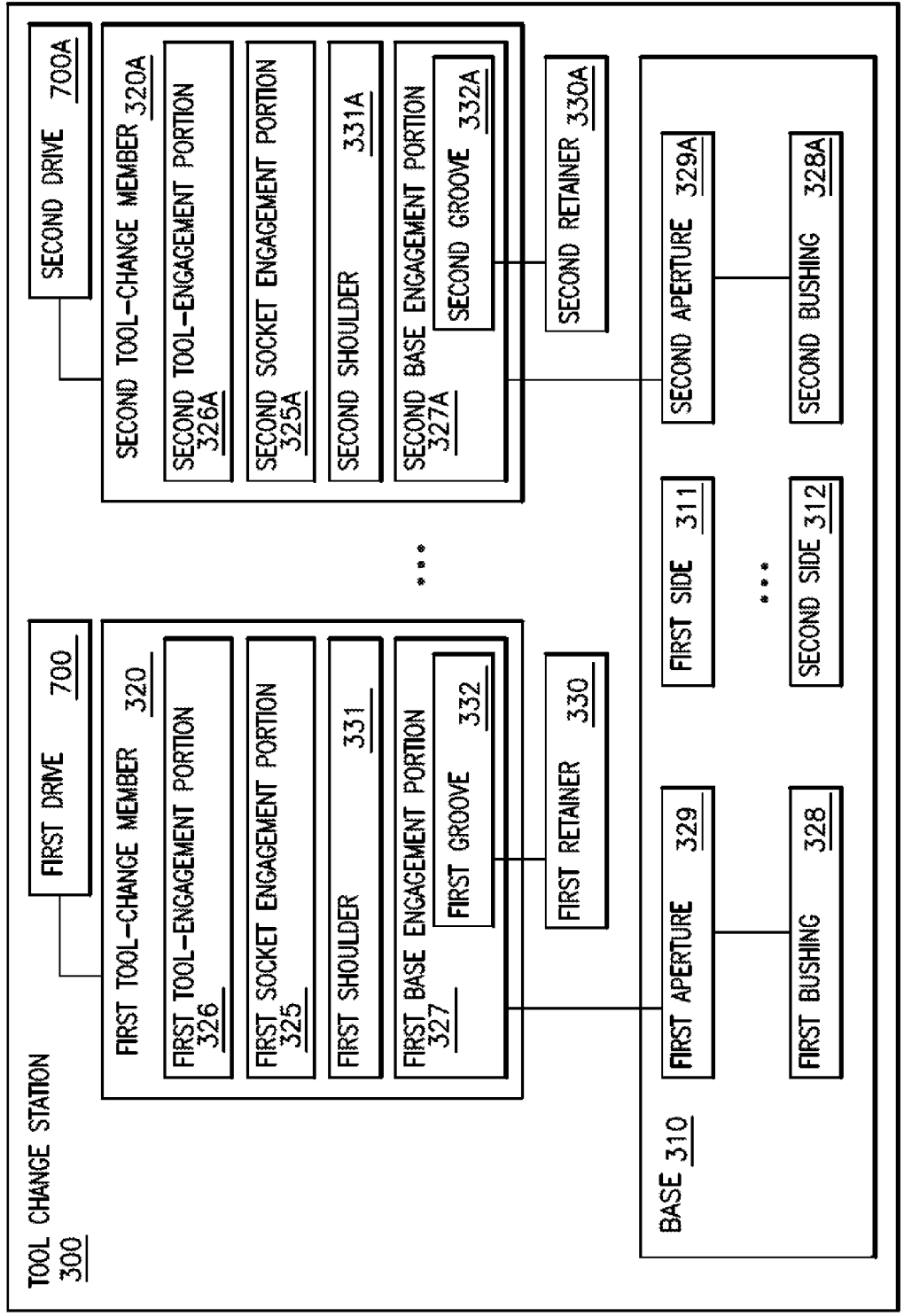
Figure 21:
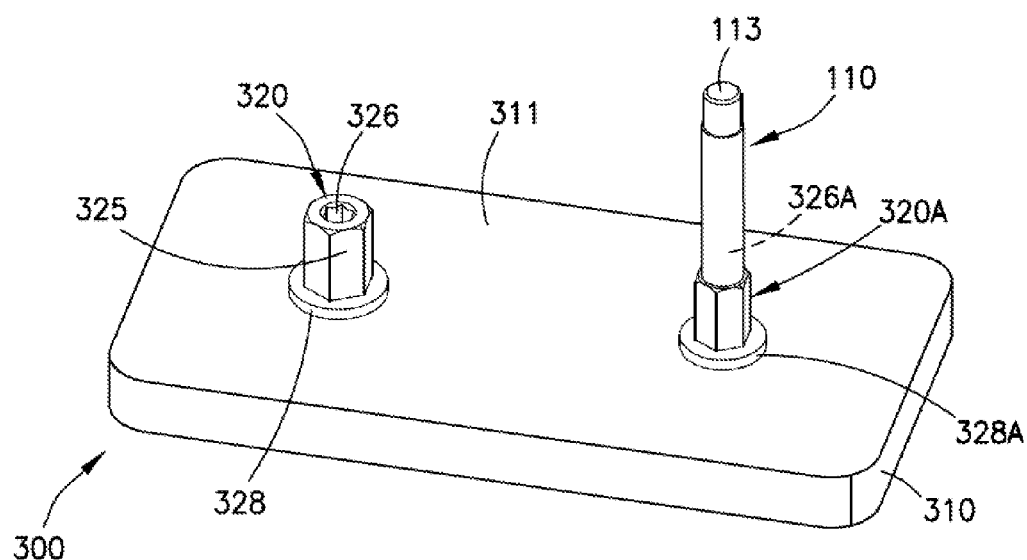
Figure 22:
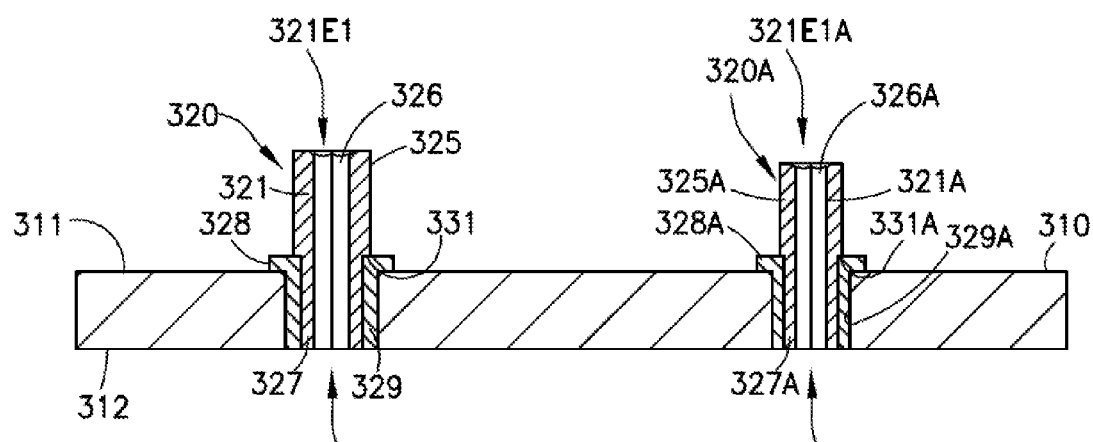
Figure 23:
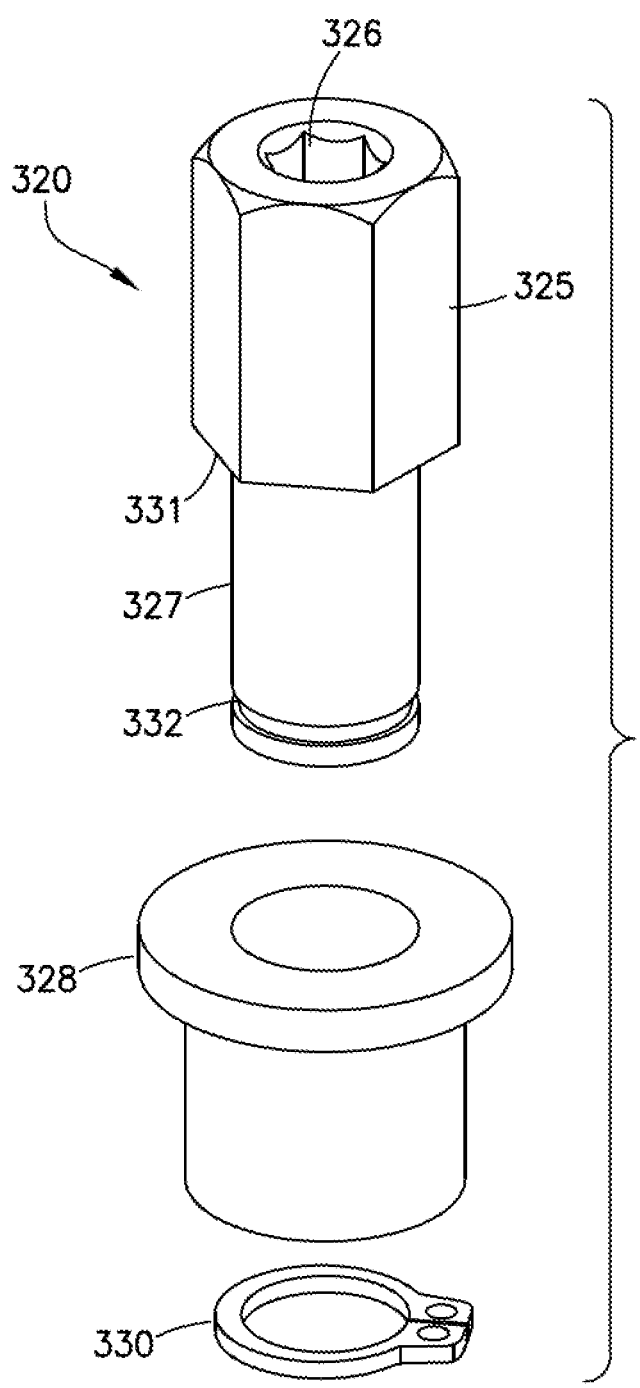
Figure 24:
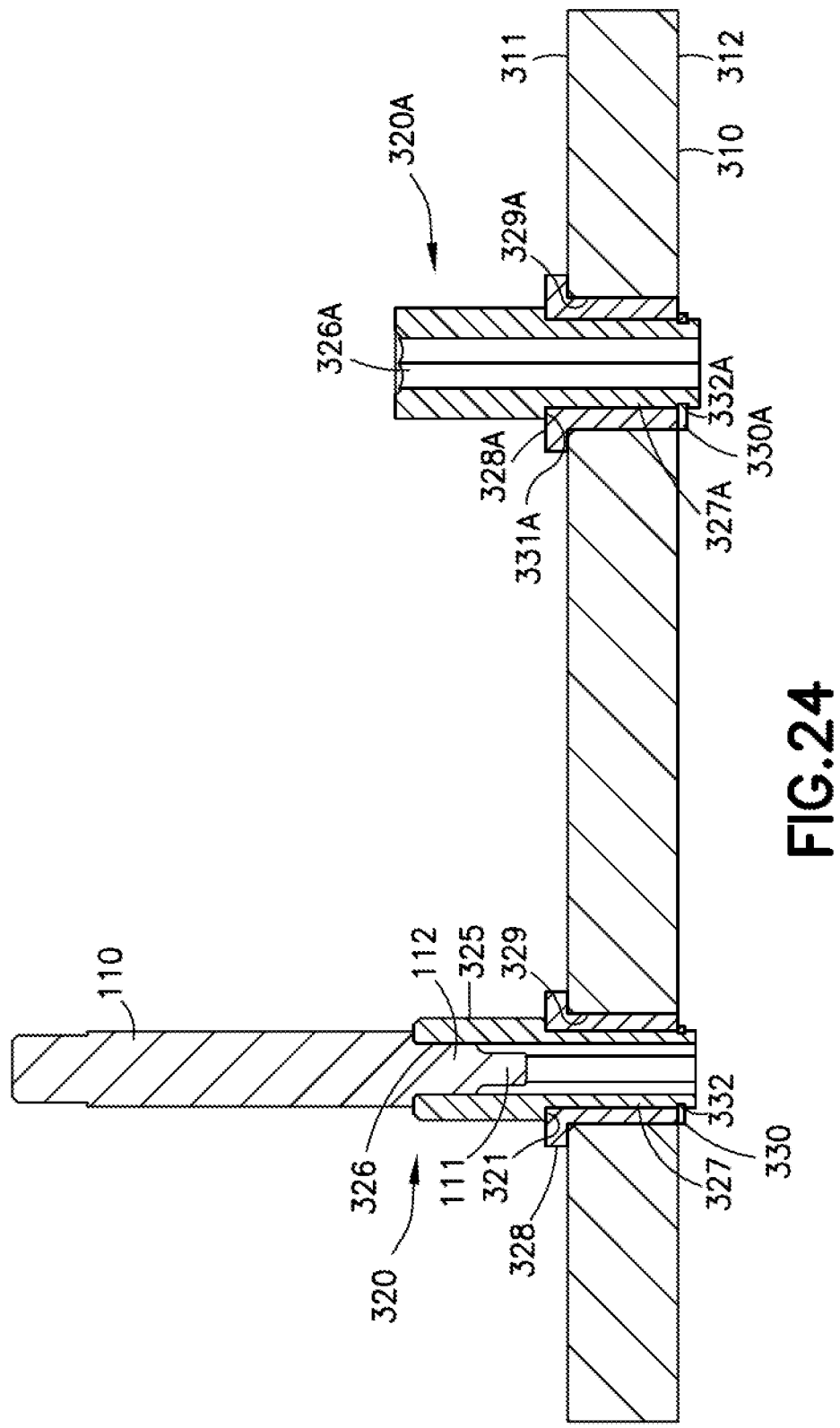
Figure 25:
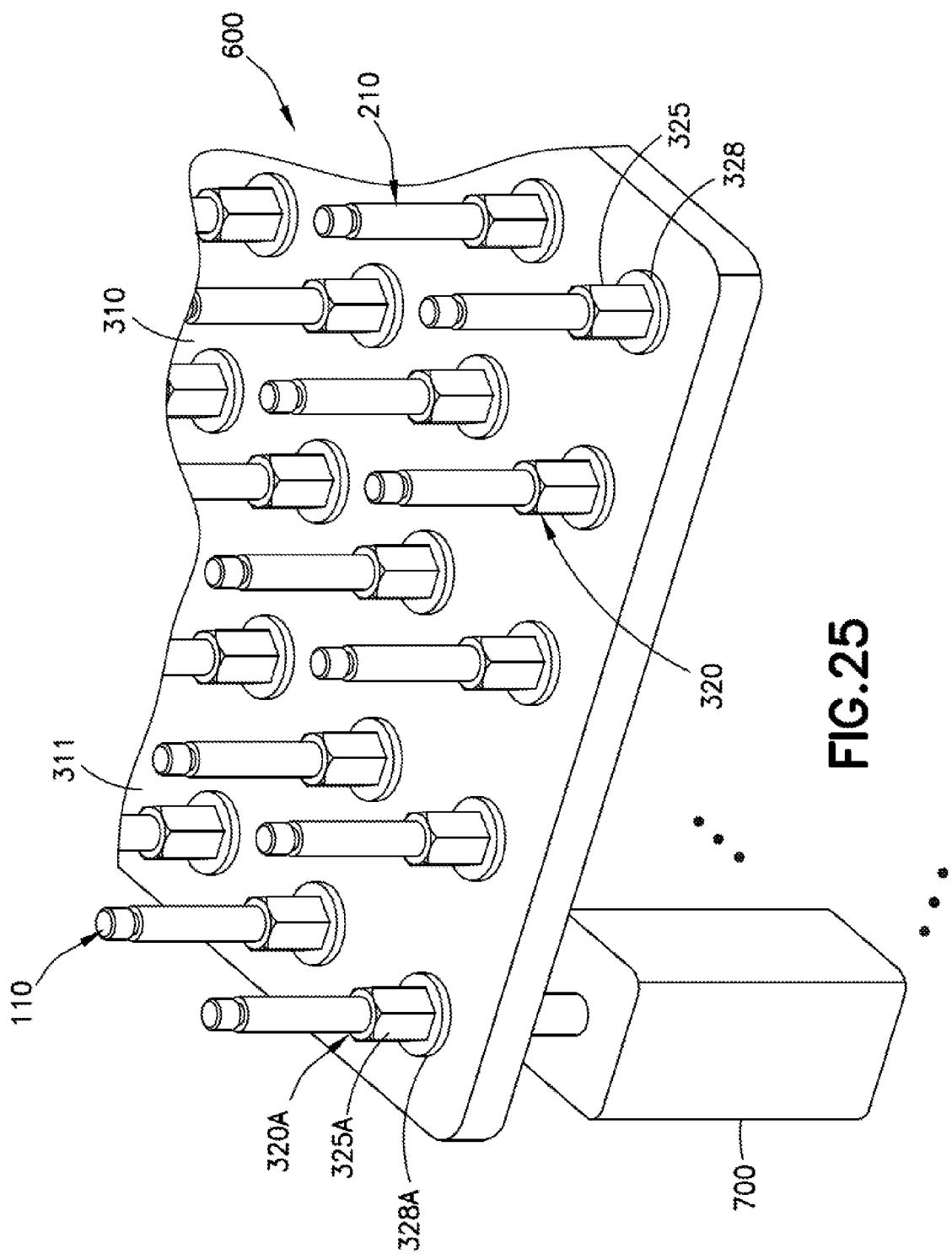
Figure 26:
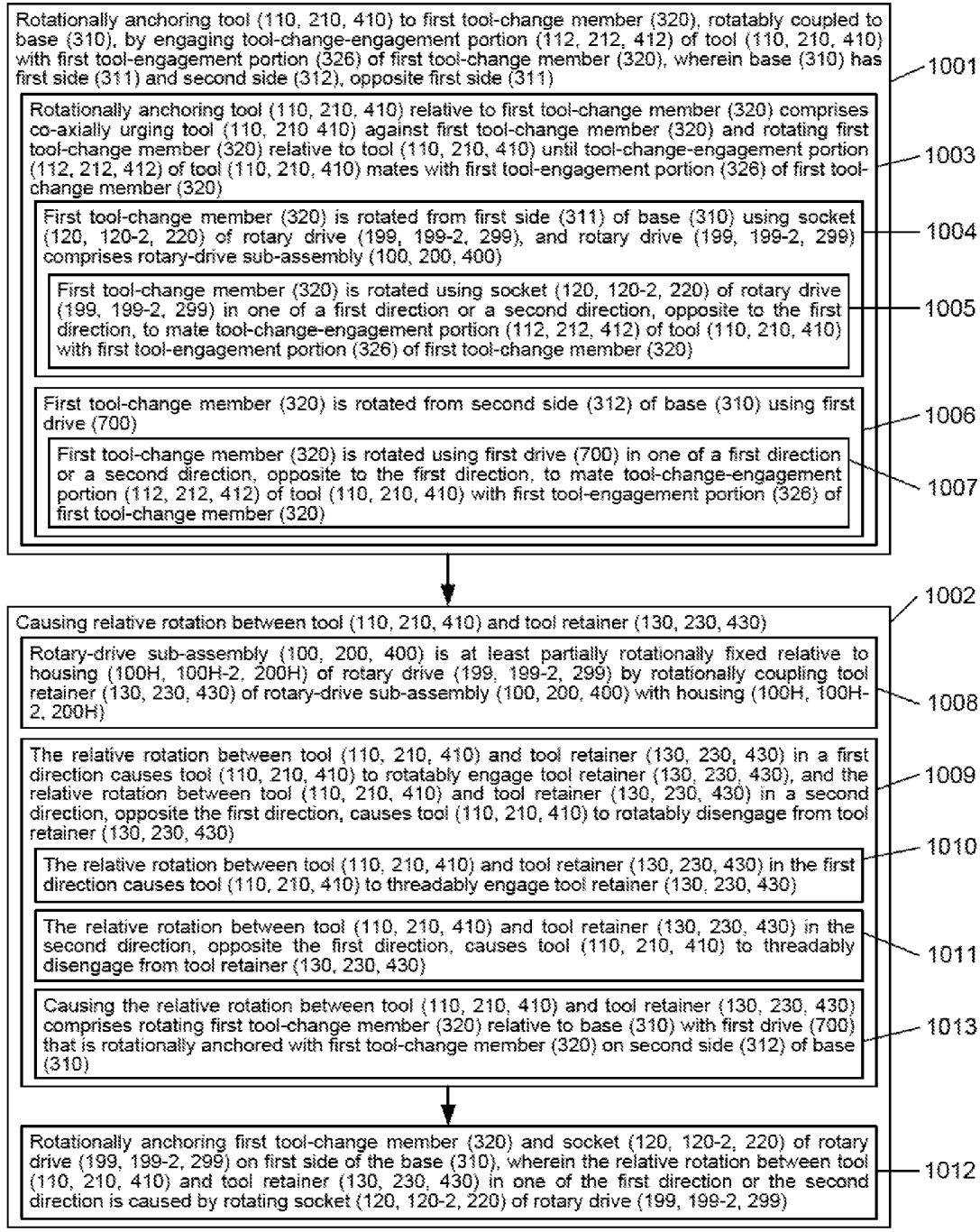
Figure 27:
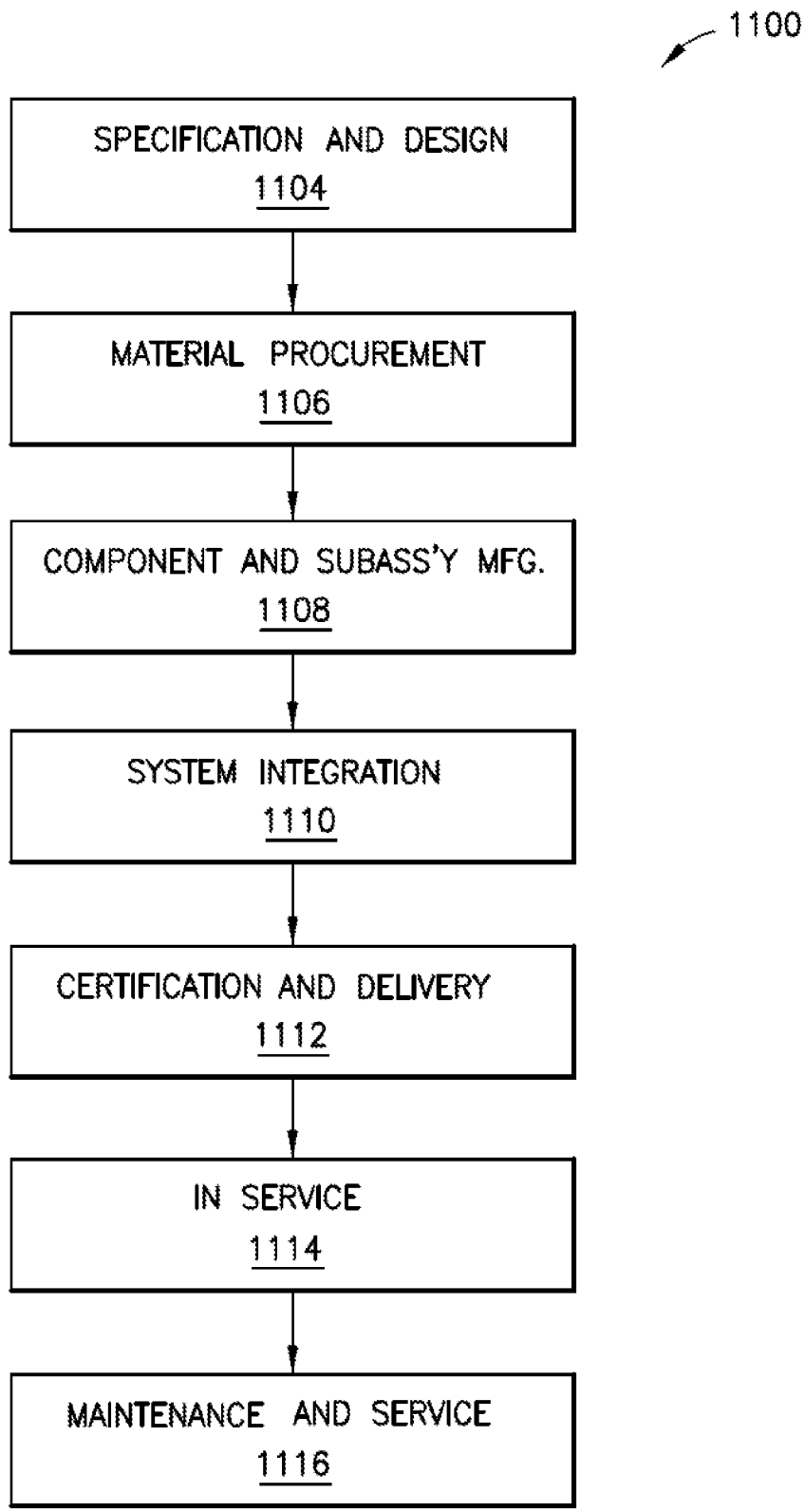

Having thus described examples of the present disclosure in general terms, reference will now be made to the accompanying drawings, which are not necessarily drawn to scale, and wherein like reference characters designate the same or similar parts throughout the several views, and wherein:

FIG. 1A and FIG. 1B (collectively referred hereinafter to as FIG. 1) collectively are a block diagram of a rotary drive, according to one or more examples of the present disclosure;

FIG. 2 is a schematic, perspective view of the rotary drive of FIG. 1, according to one or more examples of the present disclosure;

FIG. 3 is a schematic, transparent perspective view of the rotary drive of FIG. 1, according to one or more examples of the present disclosure;

FIG. 4A is a schematic, exploded perspective view of a rotary-drive sub-assembly of the rotary drive of FIG. 1, according to one or more examples of the present disclosure;

FIG. 4B is a schematic, cross-sectional end view of the rotary drive of FIG. 1, according to one or more examples of the present disclosure;

FIG. 4C is a schematic, side elevation view of the rotary-drive sub-assembly of the rotary drive of FIG. 1, according to one or more examples of the present disclosure;

FIG. 5 is a schematic, cross-sectional end view of the rotary drive of FIG. 1, according to one or more examples of the present disclosure;

FIG. 5A is a schematic, exploded perspective view of a rotary-drive sub-assembly of the rotary drive of FIG. 1, according to one or more examples of the present disclosure;

FIG. 6A is a schematic, cross-sectional perspective view of the rotary drive of FIG. 1, according to one or more examples of the present disclosure;

FIG. 6B is a schematic, cross-sectional perspective view of the rotary drive of FIG. 1, according to one or more examples of the present disclosure;

FIG. 7 is a schematic, cross-sectional end view of the rotary drive of FIG. 1, according to one or more examples of the present disclosure;

FIG. 7A is a schematic, cross-sectional perspective view of the rotary-drive sub-assembly and a socket of the rotary-drive of FIG. 1, according to one or more examples of the present disclosure;

FIG. 7B is a schematic, partial top view of a retaining member of the rotary drive of FIG. 1, according to one or more examples of the present disclosure;

FIG. 7C is a schematic, partial top view of a retaining member of the rotary drive of FIG. 1, according to one or more examples of the present disclosure;

FIG. 8A1 and FIG. 8A2 (collectively referred hereinafter to as FIG. 8) collectively are a block diagram of a rotary drive, according to one or more examples of the present disclosure;

FIG. 8A is a schematic, perspective view of the rotary drive of FIG. 8, according to one or more examples of the present disclosure;

FIG. 8B is a schematic, partial top view of a retaining member of the rotary drive of FIG. 8, according to one or more examples of the present disclosure;

FIG. 8C is a schematic, partial top view of a retaining member of the rotary drive of FIG. 8, according to one or more examples of the present disclosure;

FIG. 8D is a schematic, transparent perspective view of the rotary drive of FIG. 8, according to one or more examples of the present disclosure;

FIG. 9A is a schematic, exploded perspective view of a rotary-drive sub-assembly of the rotary drive of FIG. 8, according to one or more examples of the present disclosure;

FIG. 9B is a schematic, exploded side elevation view of a rotary-drive sub-assembly of the rotary drive of FIG. 8, according to one or more examples of the present disclosure;

FIG. 9C is a schematic, top view of a tool retainer of the rotary drive of FIG. 8, according to one or more examples of the present disclosure;

FIG. 10 is a schematic, cross-sectional perspective view of the rotary-drive sub-assembly and a socket of the rotary drive of FIG. 8, according to one or more examples of the present disclosure;

FIG. 11 is a schematic, perspective view of the rotary-drive sub-assembly and the socket of the rotary drive of FIG. 1, according to one or more examples of the present disclosure;

FIG. 12 is a block diagram of a method of utilizing the rotary drive of FIG. 1 or 8, according to one or more examples of the present disclosure;

FIG. 13A and FIG. 13B (collectively referred hereinafter to as FIG. 13) collectively are a block diagram of a rotary drive, according to one or more examples of the present disclosure;

FIG. 14A is a schematic, perspective view of a rotary drive of FIG. 13, according to one or more examples of the present disclosure;

FIG. 14B is a schematic, top view of a retainer of the rotary drive of FIG. 13, according to one or more examples of the present disclosure;

FIG. 14C is a schematic, top view of a retainer of the rotary drive of FIG. 13, according to one or more examples of the present disclosure;

FIG. 14D is a schematic, transparent perspective view of the rotary drive of FIG. 13, according to one or more examples of the present disclosure;

FIG. 15A is a schematic, exploded perspective view of a rotary-drive sub-assembly of the rotary drive of FIG. 13, according to one or more examples of the present disclosure;

FIG. 15B is a schematic, exploded side elevation view of a portion of a rotary-drive sub-assembly of the rotary drive of FIG. 13, according to one or more examples of the present disclosure;

FIG. 16 is a schematic, cross-sectional perspective view of the rotary-drive sub-assembly and a socket of the rotary drive of FIG. 13, according to one or more examples of the present disclosure;

FIG. 17 is a schematic, cross-sectional perspective view of the rotary drive of FIG. 13, according to one or more examples of the present disclosure;

FIG. 18 is a schematic, cross-sectional perspective view of the rotary drive of FIG. 13, according to one or more examples of the present disclosure;

FIGS. 19A and 19B collectively are a block diagram of a method of utilizing the rotary drive of FIG. 13, according to one or more examples of the present disclosure;

FIG. 20 is a block diagram of a tool change station, according to one or more examples of the present disclosure;

FIG. 21 is a schematic, perspective view of the tool change station of FIG. 20, according to one or more examples of the present disclosure;

FIG. 22 is a schematic, cross-sectional side elevation view of the tool change station of FIG. 20, according to one or more examples of the present disclosure;

FIG. 23 is a schematic, exploded perspective view of a portion of the tool change station of FIG. 20, according to one or more examples of the present disclosure;

FIG. 24 is a schematic, partial cross-sectional side elevation view of the tool change station of FIG. 20, according to one or more examples of the present disclosure;

FIG. 25 is a schematic, partial perspective view of the tool change station of FIG. 20, according to one or more examples of the present disclosure;

FIG. 26 is a block diagram of a method of utilizing the tool change station of FIG. 20, according to one or more examples of the present disclosure;

FIG. 27 is a block diagram of aircraft production and service methodology; and

Figure 28:
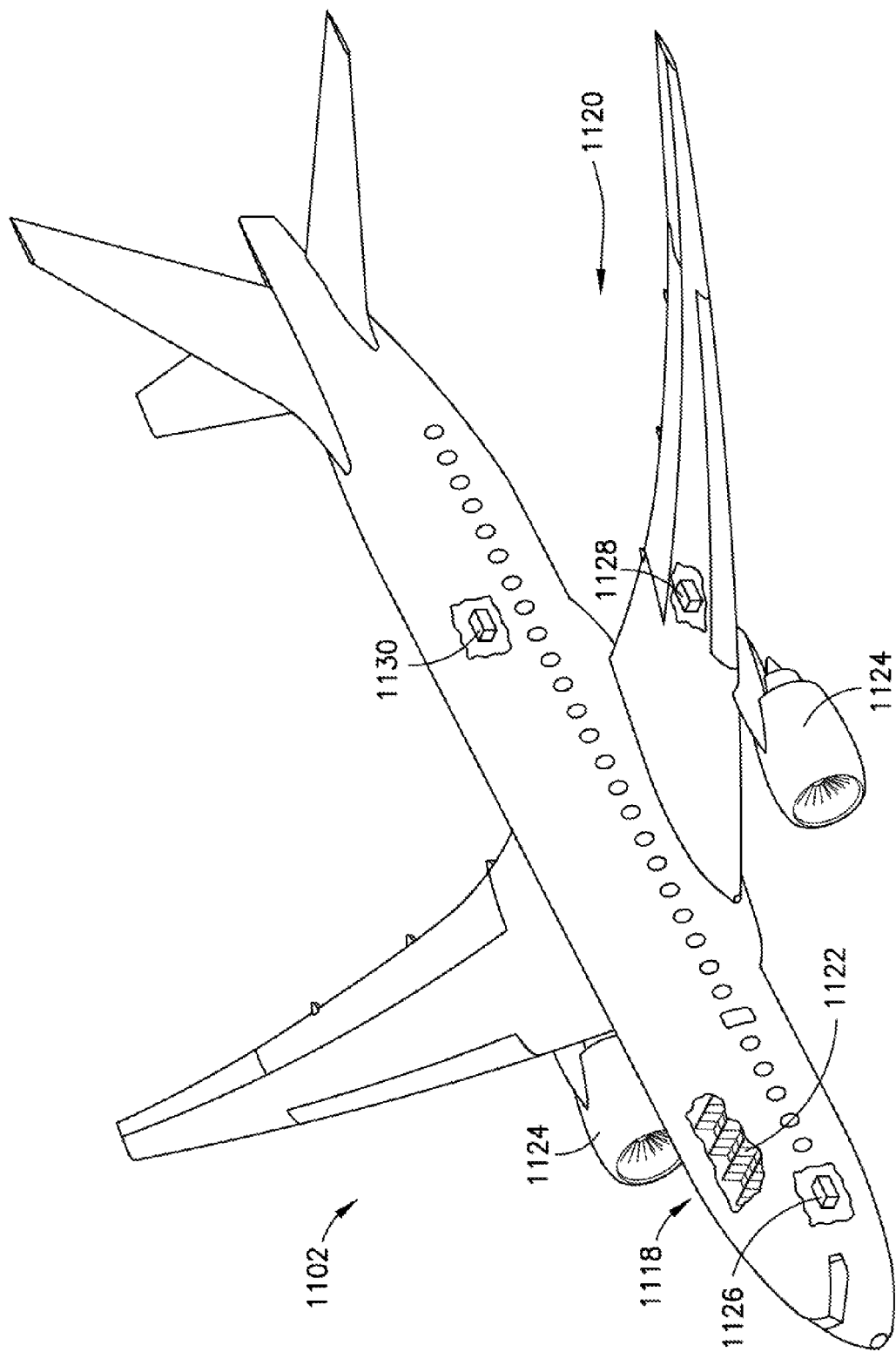

FIG. 28 is a schematic illustration of an aircraft.

DETAILED DESCRIPTION

In FIGS. 1, 8, 13 and 20, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1, 8, 13 and 20, may be combined in various ways without the need to include other features described in FIGS. 1, 8, 13 and 20, other drawing figures, and/or the accompanying disclosure, even though such combination or combinations are not explicitly illustrated herein. Similarly, additional features not limited to the examples presented, may be combined with some or all of the features shown and described herein.

In FIGS. 12, 19, 26 and 27, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 12, 19, 26 and 27 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2 through 4B, 5, 5A, 6A, 6B and 7, rotary-drive sub-assembly 100 comprises tool 110 and tool retainer 130. Tool 110 comprises fastener-engagement portion 111, first threaded portion 113, and tool-change-engagement portion 112 between fastener-engagement portion 111 and first threaded portion 113. Tool retainer 130 comprises symmetry axis 193, second threaded portion 133, configured to be threadably fastened with first threaded portion 113 of tool 110 so that tool 110 is rotationally anchored relative to tool retainer 130 about symmetry axis 193 and is translationally anchored relative to tool retainer 130 along symmetry axis 193. The tool retainer 130 also comprises key 132, fixed relative to second threaded portion 133 and retaining surface 130S, fixed relative to key 132. The preceding subject matter of this paragraph characterizes example 1 of the present disclosure.

Use of rotary-drive sub-assembly 100 as set forth above allows for the installation and removal of a worn or broken tool 110 without disassembling rotary drive 199 in which rotary-drive sub-assembly 100 is installed. For example, the rotational anchoring of tool 110 relative to tool retainer 130 allows separation of tool 110 from tool retainer 130 while tool retainer 130 remains within rotary drive 199 enabling fast swapping of a worn or broken tool 110 with a new tool 110, where fast swapping indicates a rapid or quick succession tool change that facilitates the replacement of one tool 110 with another tool 110. Use of the rotary-drive sub-assembly decreases an amount of time needed to change a worn or broken tool 110 which also decreases an amount of production downtime associated with the change of the worn or broken tool 110. Further, key 132 prevents rotation of rotary-drive sub-assembly 100 relative to rotary drive 199, within predetermined rotational limits as described herein, to allow first fastener 198 to be threadably engaged to second fastener 197.

For example, rotary drive 199 includes housing 100H to which retaining assembly 140 is coupled. Socket 120 is disposed at least partially within housing 100H for engaging first fastener 198 (such as a nut) that is threadably fastened to second fastener 197 (such as a threaded stud or other "blind" fastener which is a fastener accessible only from one side of workpiece WKP). Rotary-drive sub-assembly 100 is disposed substantially concentrically with socket 120 about axis of symmetry 193 where tool retainer 130 is captured within rotary drive 199, between socket 120 and retaining assembly 140. For example, tool retainer 130 includes body 131 having at least one retaining surface 130S that may engage one or more of socket 120 and retaining assembly 140 where engagement of retaining surface 130S with one or more of socket 120 and retaining assembly 140 prevents translation of tool retainer 130 in first direction D2 through socket 120 and in second direction D1 past retaining assembly 140. In one aspect, socket 120 includes flange 143 into which tool retainer 130 is at least partially inserted and retaining surface 130S interfaces with flange 143. Body 131 includes key 132, formed monolithically with body 131 (while in other aspects, key 132 may be coupled to body 131 in any suitable manner) where key 132 engages retaining assembly 140 to limit rotation of tool retainer 130 within a predetermined rotational compliance, as described in greater detail below. First threaded portion 113 of tool 110 engages second threaded portion 133 (which is formed in body 131) so that engagement between first threaded portion 113 and second threaded portion 133 will be reversed when tool 110 is to be decoupled from tool retainer 130 to allow changing one tool 110 for another tool 110.

Fastener-engagement portion 111, first threaded portion 113 and tool-change-engagement portion 112 of tool 110 may be monolithically formed as a one piece member. In one aspect, fastener-engagement portion 111 is located at a first end of tool 110, first threaded portion 113 is located at a second opposite end of tool 110 and tool-change-engagement portion 112 is located between fastener-engagement portion 111 and first threaded portion 113. Fastener-engagement portion 111 of tool 110 may be configured to engage a geometrically complementary receiving portion 197R within second fastener 197 so that tool 110 prevents rotation of second fastener 197 while first fastener 198 is threaded onto second fastener 197 as described herein. Fastener-engagement portion 111 may have any suitable configuration or geometry such as, for example, hex drive, clutch drive, Torx® drive, spline drive or any other drive configuration corresponding to receiving portion 197R of second fastener 197. Tool-change-engagement portion 112 is disposed between fastener-engagement portion 111 and second threaded portion 133 and includes any suitable configuration or geometry such as for example, hex drive, clutch drive, Torx® drive, spline drive or any other drive configuration suitable for causing rotation of tool 110 relative to tool retainer 130 for engaging or disengaging first threaded portion 413 of tool 410 and second threaded portion 433 of tool retainer 430. Tool-change-engagement portion 112 may have the same or different configuration or geometry than fastener-engagement portion 111. For example, in one aspect, tool-change-engagement portion 112 may have a Torx® configuration while fastener-engagement portion 111 has a hex configuration, and in other aspects, for example, both tool-change-engagement portion 112 and fastener-engagement portion 111 have hex configurations.

In one aspect, engagement between tool 110 and tool retainer 130 rotationally anchors tool 110 to tool retainer 130 so that tool 110 is not rotationally movable (in the direction of engagement) about axis of symmetry 193. For example, as tool 110 is threaded into tool retainer 130 (e.g. through engagement between first threaded portion 113 and second threaded portion 133 where tool 110 is rotated in a first direction relative to tool retainer 130) stop surface 110S of tool 110 contacts, e.g., retaining surface 130S of tool retainer 130 to arrest rotation of tool 110 relative to tool retainer 130 so that stop surface 110S of tool 110 is seated against (e.g. in contact with) retaining surface 130S of tool retainer 130. However, rotationally anchoring tool 110 to tool retainer 130 does not prevent a reverse rotation in a second direction (e.g. that is opposite the first direction) of tool 110 relative to tool retainer 130 to disengage first threaded portion 113 from second threaded portion 133 to allow removal of tool 110 from tool retainer 130. Likewise, tool 110 is translationally anchored relative to tool retainer 130 in that the contact between stop surface 110S and retaining surface 130S (in addition to engagement of first threaded portion 113 and second threaded portion 133) prevents translation of tool 110 relative to tool retainer 130 along symmetry axis 193.

Fastener-engagement portion 111 is limited in size so that fastener-engagement portion 111 fits within a minor diameter of the threads of second fastener 197. However, a size of tool-change-engagement portion 112 is not limited by second fastener 197 and as such may be larger than fastener-engagement portion 111. For example, tool-change-engagement portion 112 may be sized so as to be larger than the minor diameter of second fastener 197 but smaller than a minor diameter of first fastener 198. The larger diameter of tool-change-engagement portion 112 may isolate wearing or damage to fastener-engagement portion 111 to an area of tool 110 delimited by fastener-engagement portion 111 while tool-change-engagement portion 112 remains intact and provides increased torque application to tool 110 to allow threadable fastening of tool 110 and tool retainer 130.

Referring generally to FIG. 1 and particularly to, e.g., FIGS. 4A, 4B, 5 and 5A, first threaded portion 113 of tool 110 comprises first external thread 113E and second threaded portion 133 of tool retainer 130 comprises first internal thread 133I. The preceding subject matter of this paragraph characterizes example 2 of the present disclosure, wherein example 2 also includes the subject matter according to example 1, above.

Referring generally to FIG. 1 and particularly to, e.g., FIG. 4C, first threaded portion 113 of tool 110 comprises second internal thread 113I and second threaded portion 133 of tool retainer 130 comprises second external thread 133E. The preceding subject matter of this paragraph characterizes example 3 of the present disclosure, wherein example 3 also includes the subject matter according to example 1, above.

Providing variability in thread configurations, such as in examples 2 and 3 above, allows for ease of manufacturing first threaded portion 113 and second threaded portion 133.

Referring generally to FIG. 1 and particularly to, e.g., FIGS. 4A, 4B, 4C, 5, and 5A, first threaded portion 113 of tool 110 and second threaded portion 133 of tool retainer 130 comprise left-hand threads. The preceding subject matter of this paragraph characterizes example 4 of the present disclosure, wherein example 4 also includes the subject matter according to any one of examples 1-3, above.

The left-hand thread configuration of tool 110 as described in example 4 above allows for use of rotary-drive sub-assembly 100 in right-hand fastener (e.g. fasteners with right-hand threads) applications.

Referring generally to FIG. 1 and particularly to, e.g., FIGS. 4A, 4B, 4C, 5, and 5A, first threaded portion 113 of tool 110 and second threaded portion 133 of tool retainer 130 comprise right-hand threads. The preceding subject matter of this paragraph characterizes example 5 of the present disclosure, wherein example 5 also includes the subject matter according to any one of examples 1-3, above.

The right-hand thread configuration of tool 110 as described in example 5 above allows for use of rotary-drive sub-assembly 100 in left-hand fastener (e.g. fasteners with left-hand threads) applications.

Referring generally to FIG. 1 and particularly to, e.g., FIGS. 4A, 4B, 4C, 5, 5A, 6A, and 6B, fastener-engagement portion 111 of tool 110 is co-axial with tool-change-engagement portion 112 of tool 110, first threaded portion 113 of tool 110, and second threaded portion 133 of tool retainer 130. The preceding subject matter of this paragraph characterizes example 6 of the present disclosure, wherein example 6 also includes the subject matter according to any one of examples 1-5, above.

The coaxial alignment of fastener-engagement portion 111 with tool-change-engagement portion 112, first threaded portion 113 and second threaded portion 133 provides for limited runout and positions fastener-engagement portion 111, when tool 110 is installed within rotary drive 199 (e.g. threadably fastened with tool retainer 130) so that fastener-engagement portion 111 is aligned with receiving portion 197R of second fastener 197. Alignment of fastener-engagement portion 111 with receiving portion 197R facilitates alignment of first fastener 198 with second fastener 197 when first fastener 198 is located within socket 120, as described herein.

For example, when first fastener 198 is held within socket 120, the co-axial arrangement of fastener-engagement portion 111 of tool 110, tool-change-engagement portion 112, first threaded portion 113 of tool 110, and second threaded portion 133 of tool retainer 130 positions fastener-engagement portion 111 substantially concentric with the minor diameter of first fastener 198. As such, fastener-engagement portion 111 engagement or mating with receiving portion 197R of second fastener 197 aligns the threads of first fastener 198 with threads of second fastener 197 to allow threadably fastening first fastener 198 with second fastener 197.

Referring generally to FIG. 1 and particularly to, e.g., FIGS. 2, 3, 5, 5A, 6A, 6B, 7, and 7A, second threaded portion 133 of tool retainer 130 defines through hole 133T in tool retainer 130. The preceding subject matter of this paragraph characterizes example 7 of the present disclosure, wherein example 7 also includes the subject matter according to any one of examples 1-6, above.

Through hole 133T defined by second threaded portion 133 provides ease of manufacture of tool retainer 130 and provides key 132 with width W1 greater than a diameter of through hole 133T.

Referring generally to FIG. 1 and particularly to, e.g., FIGS. 4A, 4B, and 4C, second threaded portion 133 of tool retainer 130 defines blind hole 133B in tool retainer 130. The preceding subject matter of this paragraph characterizes example 8 of the present disclosure, wherein example 8 also includes the subject matter according to any one of examples 1-6, above.

Blind hole 133B defined by second threaded portion 133 provides key 132, having width W2 that may be smaller, substantially equal to or greater than a diameter of blind hole 133B.

Referring generally to FIG. 1 and particularly to, e.g., FIGS. 2, 3, 4B, 5, 6A, 6B, and 7, rotary drive 199 comprises rotary-drive sub-assembly 100, retaining assembly 140, and socket 120. Rotary-drive sub-assembly 100 comprises tool 110 and tool retainer 130. Tool 110 comprises fastener-engagement portion 111, first threaded portion 113, and tool-change-engagement portion 112 between fastener-engagement portion 111 and first threaded portion 113. Tool retainer 130 comprises symmetry axis 193, second threaded portion 133, key 132, and retaining surface 130S. Second threaded portion 133 is configured to be threadably fastened with first threaded portion 113 of tool 110 so that tool 110 is rotationally anchored relative to tool retainer 130 about symmetry axis 193 and is translationally anchored relative to tool retainer 130 along symmetry axis 193. Key 132 is fixed relative to second threaded portion 133. Retaining surface 130S is fixed relative to key 132. Retaining assembly 140 is configured to engage key 132 of tool retainer 130 to limit rotation of tool retainer 130 about symmetry axis 193. Socket 120 is co-axially rotatable relative to tool retainer 130 of rotary-drive sub-assembly 100 when retaining assembly 140 engages key 132 of tool retainer 130. The preceding subject matter of this paragraph characterizes example 9 of the present disclosure.

Use of rotary drive 199 including rotary-drive sub-assembly 100 allows for operator (e.g. without the need for a specialized mechanic or repair person) changing of worn or broken tools 110. For example, use of rotary-drive sub-assembly 100 as described herein allows for the installation and removal of a worn or broken tool 110 without disassembling rotary drive 199 in which rotary-drive sub-assembly 100 is installed. For example, the rotational anchoring of tool 110 relative to tool retainer 130 allows separation of tool 110 while tool retainer remains within rotary drive 199 enabling fast swapping of a worn or broken tool 110 with a new tool 110, where fast swapping indicates a rapid or quick succession tool change that facilitates the replacement of one tool 110 with another tool 110. Rotary drive 199 including rotary-drive sub-assembly 100 decreases the amount of time needed to change a worn or broken tool 110 which also decreases an amount of production downtime associated with the change of the worn or broken tool 110.

Further, key 132 prevents rotation of rotary-drive sub-assembly 100 relative to rotary drive 199, within predetermined rotational limits as described herein, to allow first fastener 198 to be threadably engaged to second fastener 197, while retaining surface 130S retains rotary-drive sub-assembly 100 within rotary drive 199 as described herein.

As described above, retaining assembly 140 is coupled to housing 100H of rotary drive 199. Socket 120 is disposed at least partially within housing 100H for engaging first fastener 198 that is threadably fastened to second fastener 197. Rotary-drive sub-assembly is disposed substantially concentrically with socket about axis of symmetry 193 where retaining surface 130S of tool retainer 130 is captured within rotary drive 199, between socket 120 and retaining assembly 140 as described above. First threaded portion 113 of tool 110 engages second threaded portion 133 so that first threaded portion 113 and second threaded portion 133 are threadably fastened as described above to provide for the decoupling of tool 110 from tool retainer 130 to allow changing one tool 110 for another tool 110. First threaded portion 113 and second threaded portion 133 may include complementary internal and external threads as well as right or left handed threads as described above.

As also described above, fastener-engagement portion 111 of tool 110 may be configured to engage a geometrically complementary receiving portion 197R within second fastener 197 so that tool 110 prevents rotation of second fastener 197 while first fastener 198 is threaded onto second fastener 197. Again, fastener-engagement portion 111 may have any suitable configuration or geometry such as, for example, hex drive, clutch drive, Torx® drive, spline drive or any other drive configuration corresponding to receiving portion 197R of second fastener 197. Tool-change-engagement portion 112 is disposed between fastener-engagement portion 111 and second threaded portion 133 and includes any suitable configuration or geometry such as for example, hex drive, clutch drive, Torx® drive, spline drive or any other drive configuration suitable for causing rotation of tool 110 relative to tool retainer 130 for causing tool 110 to be threadably fastened with tool retainer 130. As also described above, tool-change-engagement portion 112 may have the same or different configuration or geometry than fastener-engagement portion 111.

Fastener-engagement portion 111 is limited in size so that fastener-engagement portion 111 fits within a minor diameter of the threads of second fastener 197. However, a size of tool-change-engagement portion 112 is not limited by second fastener 197 and as such may be larger than fastener-engagement portion 111. For example, tool-change-engagement portion 112 may be sized so as to be larger than the minor diameter of second fastener 197 but smaller than a minor diameter of first fastener 198. The larger diameter of tool-change-engagement portion 112 may isolate wearing or damage to fastener-engagement portion 111 to an area of tool 110 delimited by fastener-engagement portion 111 while tool-change-engagement portion 112 remains intact and provides increased torque application to tool 110 to allow reversible fastening of tool 110 and tool retainer 130.

Referring generally to FIG. 1 and particularly to, e.g., FIGS. 6A, 6B, and 7, rotary-drive sub-assembly 100 is co-axially translatable relative to socket 120. The preceding subject matter of this paragraph characterizes example 10 of the present disclosure, wherein example 10 also includes the subject matter according to example 9, above.

Translation of rotary-drive sub-assembly 100 relative to socket 120 allows for socket 120 and first fastener 198 to move substantially along an axis of second fastener 197 in direction D2 so that first fastener 198 is tightened against workpiece WKP (e.g. where securing second fastener 197 and first fastener 198 secure workpiece WKP) while fastener-engagement portion 111 of tool 110 remains engaged with receiving portion 197R of second fastener 197 and prevents rotation of second fastener 197.

For example, as first fastener 198 is threaded onto second fastener 197, as described herein, rotary-drive sub-assembly 100 translates in direction D1 relative to socket 120 and housing 100H.

Referring generally to FIG. 1 and particularly to, e.g., FIGS. 6A, 6B, and 7, rotary drive 199 further comprises housing 100H. Retaining assembly 140 comprises retaining member 150A and resilient member 155. Retaining member 150A is coupled to housing 100H and comprises retaining opening 151A, which is configured to engage key 132 so as to rotationally constrain tool retainer 130 relative to housing 100H. Resilient member 155 is coupled to housing 100H and biases retaining member 150A toward housing 100H. Retaining member 150 is movable relative to resilient member 155. The preceding subject matter of this paragraph characterizes example 11 of the present disclosure, wherein example 11 also includes the subject matter according to examples 9 or 10, above.

Retaining member 150A and resilient member 155 provide for the translation of rotary-drive sub-assembly 100 relative to socket 120. Retaining member 150A also provides for non-rotatably holding rotary-drive sub-assembly 100 to allow for the threadable engagement between second fastener 197 and first fastener 198.

Referring generally to FIG. 1 and particularly to, e.g., FIGS. 2, 3, 6A, 6B, and 7, retaining member 150A is configured to pivot relative to housing 100H and to translate relative to housing 100H. The preceding subject matter of this paragraph characterizes example 12 of the present disclosure, wherein example 12 also includes the subject matter according to example 11, above.

The pivoting and translating movement of retaining member 150A relative to housing 100H provides retaining member 150A with a sufficient number of degrees of freedom to allow for the translation of rotary-drive sub-assembly 100 relative to socket 120 without binding or restriction of movement between, e.g., tool retainer 130 and retaining member 150A during translation of rotary-drive sub-assembly 100.

Referring generally to FIG. 1 and particularly to, e.g., FIGS. 2, 3, 6A, 6B, and 7, retaining member 150A includes recess 177. At least a portion of resilient member 155 is received within recess 177. Recess 177 is sized to accommodate relative translational movement between retaining member 150A and resilient member 155. The preceding subject matter of this paragraph characterizes example 13 of the present disclosure, wherein example 13 also includes the subject matter according to example 12, above.

Resilient member 155 in combination with recess 177 may provide guided movement of retaining member 150A as retaining member 150A pivots and translates relative to housing 100H during translation of rotary-drive sub-assembly 100 relative to socket 120. The guided movement of retaining member 150A may facilitate non-binding movement of retaining member 150A relative to rotary-drive sub-assembly 100 during translation of rotary-drive sub-assembly 100 relative to socket 120.

For example, retaining member 150A is mounted to housing 100H by mounting member 156. Mounting member 156 is fastened to housing 100H and retaining member 150A of retaining assembly 140 is pivotally and translationally coupled to mounting member 156 by coupling 157. In one aspect, coupling 157 may be a slot and pin coupling, where the pin is movable within the slot, or any other coupling that provides both pivotal and translational movement of retaining member 150A relative to mounting member 156 and housing 100H. Resilient member 155 is mounted to mounting member 156 so as to engage with and bias retaining member 150A toward housing 100H (e.g. in direction D2). For example, resilient member 155 may be a leaf spring or other suitably configured spring or resilient member that extends along any suitable length of retaining member 150A for providing a biasing force on retaining member 150A. In one aspect, resilient member 155 biases retaining surface 130S of tool retainer 130 against socket 120 so that fastener-engagement portion 111 extends past threads of first fastener 198 in direction D2 to allow mating of fastener-engagement portion 111 with receiving portion 197R of second fastener 197 prior to threadable engagement of first fastener 198 and second fastener 197.

As described above, key 132 of tool retainer 130 engages retaining assembly 140 to prevent or otherwise limit rotation of tool retainer 130 and hence, rotary-drive sub-assembly 100. For example, retaining member 150A of retaining assembly 140 comprises retaining opening 151A in which key 132 is positioned. Retaining opening 151A may be any suitable opening such as an open or closed slot or a circumferentially enclosed opening having any suitable shape, as described in greater detail herein.

Referring generally to FIG. 1 and particularly to, e.g., FIGS. 2, 3, 6A, 6B, and 7B, retaining opening 151A of retaining member 150A is configured to engage key 132 of tool retainer 130 with an intrinsic rotational backlash. The preceding subject matter of this paragraph characterizes example 14 of the present disclosure, wherein example 14 also includes the subject matter according to any one of examples 11-13, above.

Referring generally to FIG. 1 and particularly to, e.g., FIGS. 2, 3, 6A, 6B, and 7B, the intrinsic rotational backlash between retaining opening 151A of retaining member 150A and key 132 of tool retainer 130 is less than about 10 degrees. The preceding subject matter of this paragraph characterizes example 15 of the present disclosure, wherein example 15 also includes the subject matter according to example 14, above.

The intrinsic rotational backlash may be provided between key 132 and retaining opening 151A to allow the pivotal and translational movement of retaining member 150A relative to mounting member 156 and housing 100H. The intrinsic rotational backlash between key 132 and retaining opening 151A maintains a substantially fixed (non-rotating) relationship between tool 110 (rotationally anchored to tool retainer 130) of rotary-drive sub-assembly 100 and housing 100H.

For example, while less than 10 degrees of rotation may be provided between key 132 and retaining opening 151A, this intrinsic rotational backlash may be defined as a result of manufacturing tolerances that provide a slip or clearance fit between key 132 and retaining opening 151A, where the amount of rotation provided by the intrinsic rotational backlash is a total rotation in both clockwise and counter-clockwise directions. The slip or clearance fit between key 132 and retaining opening 151A allows for relative movement of retaining member 150A and tool retainer 130. The slip or clearance fit between key 132 and retaining opening 151A may also allow pivoting and translational movement of retaining member 150A relative to housing 100H.

Referring generally to FIG. 1 and particularly to, e.g., FIGS. 2, 3, 6A, 6B, and 7B, retaining opening 151A of retaining member 150A comprises pair of opposed parallel walls 151OP. The preceding subject matter of this paragraph characterizes example 16 of the present disclosure, wherein example 16 also includes the subject matter according to any one of examples 11-15, above.

Opposed parallel walls 151OP engage key 132 to substantially prevent rotation of key 132.

For example, retaining opening 151A may have an open slot or forked configuration which may be open on one end (as shown in e.g. FIGS. 2 and 3) while in other aspects retaining opening 151A may have a circumferentially enclosed opening or slot configuration (as shown in, e.g., FIG. 7B) so that walls of retaining opening 151A circumscribe key 132 when key 132 is disposed within retaining opening 151A. In either the open slot or circumferentially enclosed slot configurations, at least opposed parallel walls 151OP of retaining opening 151A engage and rotationally constrain key 132. End walls 151OE of retaining opening 151A may also rotationally constrain key 132.

Referring generally to FIG. 1 and particularly to, e.g., FIG. 7C, retaining opening 151A of retaining member 150A is configured to engage key 132 with an engineered rotational compliance. The preceding subject matter of this paragraph characterizes example 17 of the present disclosure, wherein example 17 also includes the subject matter according to any one of examples 11-13, above.

The engineered rotational compliance provides for a predetermined range of key 132 rotation relative to, e.g., housing 100H that is greater than rotation resulting from manufacturing tolerances or slip/clearance fits.

Referring generally to FIG. 1 and particularly to, e.g., FIG. 7C, engineered rotational compliance between retaining opening 151A of retaining member 150A and key 132 of tool retainer 130 is between about 30 degrees and about 270 degrees. The preceding subject matter of this paragraph characterizes example 18 of the present disclosure, wherein example 18 also includes the subject matter according to example 17, above.

The engineered rotational compliance between retaining opening 151A and key 132 provides for rotation of tool 110 relative to receiving portion 197R of second fastener 197 so that fastener-engagement portion 111 of tool 110 can be geometrically rotationally aligned with receiving portion 197R, substantially without rotation of housing 100H.

For example, an initial rotational orientation of fastener-engagement portion 111 relative to receiving portion 197R of second fastener 197 may be such that the geometry of fastener-engagement portion 111 is not aligned with the geometry of receiving portion 197R. The engineered rotational compliance allows for predetermined limited rotation (e.g. rotational compliance which is a total amount of rotation in both clockwise and counterclockwise directions) of fastener-engagement portion 111 of tool 110 relative to receiving portion 197R to align their respective geometries to allow engagement between fastener-engagement portion 111 and receiving portion 197R. To provide the predetermined limited rotation of fastener-engagement portion 111 of tool 110, retaining opening 151A may be in the form of a circumferentially enclosed butterfly slot.

Referring generally to FIG. 1 and particularly to, e.g., FIG. 7C, retaining opening 151A of retaining member 150A comprises first pair of parallel walls 151SP1 and second pair of parallel walls 151SP2. Walls of first pair of parallel walls 151SP1 are staggered relative to each other along first axis SPX1, parallel to first pair of parallel walls 151SP1. Walls of second pair of parallel walls 151SP2 are staggered relative to each other along second axis SPX2, parallel to second pair of parallel walls 151SP2. The preceding subject matter of this paragraph characterizes example 19 of the present disclosure, wherein example 19 also includes the subject matter according to any one of examples 11-13, 17, or 18, above.

First pair of parallel walls 151SP1 and second pair of parallel walls 151SP2 and the structural arrangement therebetween (as described above) provides for the predetermined limited rotation of fastener-engagement portion 111 of tool 110.

For example, the staggered configuration of first pair of parallel walls 151SP1 and second pair of parallel walls 151SP2 forms the circumferentially enclosed butterfly shape of retaining opening 151A, where central portion 151CP of retaining opening 151A is narrower than ends 151EP of retaining opening 151A. First pair of parallel walls 151SP1 are staggered in that each wall in first pair of parallel walls 151SP1 are separated by distance G1. Similarly Second pair of parallel walls 151SP2 are staggered in that each wall in second pair of parallel walls 151SP2 are separated by distance G2. Distances G1, G2 may provide clearance for key 132 within central portion 151CP of retaining opening 151A. In one aspect, retaining opening 151A provides tool 110 with about 30 degrees and about 270 degrees of rotation but in other aspects retaining opening 151A may provide tool 110 with more than about 270 degrees and less than about 30 degrees of rotation.

Referring generally to FIG. 1 and particularly to, e.g., FIG. 3, rotary drive 199 also comprises drive transmission 170 inside housing 100H. Socket 120 comprises drive member 171, coupled to drive transmission 170. The preceding subject matter of this paragraph characterizes example 20 of the present disclosure, wherein example 20 also includes the subject matter according to any one of examples 11-19, above.

Drive transmission 170 causes rotation of at least socket 120 relative to housing 100H.

Drive transmission 170 may be any suitable drive including one or more of gears, sprockets, chains, belts, pulleys or any other suitable drive mechanism that drivingly engage or mate drive member 171 of socket 120 for causing rotation of at least socket 120 relative to housing 100H. Drive transmission 170 may couple socket 120 to a drive motor so that motive force from the drive motor is transferred through drive transmission 170 to socket 120.

Referring generally to FIG. 1 and particularly to, e.g., FIGS. 3, 6A, 7A, and 7C, rotary drive 199 also comprises friction member 165, interposed between socket 120 and tool 110. Friction member 165 is configured to transfer rotation of socket 120, engaging first fastener 198, to tool 110 when fastener-engagement portion 111 of tool 110 is disengaged from second fastener 197, that is threadably couplable with first fastener 198, and is also configured to discontinue transferring rotation of socket 120 to tool 110 when fastener-engagement portion 111 of tool 110 becomes engaged with second fastener 197. The preceding subject matter of this paragraph characterizes example 21 of the present disclosure, wherein example 21 also includes the subject matter according to any one of examples 9-13 or 17-20, above.

The rotation of tool 110 through the use of friction member 165 provides for the rotational alignment of fastener-engagement portion 111 of tool 110 with receiving portion 197R of second fastener 197 substantially without rotation of housing 100H relative to second fastener 197.

For example, socket 120 may include groove 167, which may be an annular groove. Friction member 165, such as an O-ring or other suitable friction member, is disposed at least partially within groove 167 such that at least a portion of friction member 165 protrudes towards a centerline (which may be coincident with symmetry axis 193) of socket 120 to frictionally engage tool 110. As noted above, initial rotational orientation of fastener-engagement portion 111 relative to receiving portion 197R of second fastener may 197 may be such that the geometry of fastener-engagement portion 111 is not aligned with the geometry of receiving portion 197R. Socket 120 may be driven (e.g. rotated clockwise or counterclockwise) such that friction member 165 transfers the rotational movement of socket 120 to tool 110 so that tool 110 rotates within and is rotationally constrained by retaining opening 151A. The rotational movement of tool 110 (induced by friction member 165) causes rotational alignment of fastener-engagement portion 111 of tool 110 with receiving portion 197R of second fastener 197. For example, as fastener-engagement portion 111 of tool 110 rotates, fastener-engagement portion 111 of tool 110 may fall, or otherwise move in direction D2, into receiving portion 197R of second fastener 197 when the geometries of receiving portion 197R and fastener-engagement portion 111 are aligned.

Rotation of fastener-engagement portion 111 induced by friction member 165 may also provide for seating fastener-engagement portion 111 within receiving portion 197R of second fastener 197. For example, when fastener-engagement portion 111 is at least partially mated with receiving portion 197R of second fastener 197, tool 110 may be alternately rotated in clockwise and counterclockwise directions until movement of fastener-engagement portion 111 in direction D2 within receiving portion 197R ceases so that fastener-engagement portion 111 is completely or fully seated within receiving portion 197R of second fastener 197.

Referring generally to FIG. 1 and particularly to, e.g., FIGS. 4A, 4C, and 5A, tool 110 comprises fastener-engagement portion 111, first threaded portion 113, and tool-change-engagement portion 112 between fastener-engagement portion 111 and first threaded portion 113. The preceding subject matter of this paragraph characterizes example 22 of the present disclosure.

Tool 110 has distinct portions, e.g. fastener-engagement portion 111 and tool-change-engagement portion 112, that allow for removal of tool 110 from rotary drive 199 even when fastener-engagement portion 111 is damaged or otherwise unusable.

For example, as described above, fastener-engagement portion 111 is limited in size so that fastener-engagement portion 111 fits within a minor diameter of the threads of second fastener 197. However, a size of tool-change-engagement portion 112 is not limited by second fastener 197 and as such may be larger than fastener-engagement portion 111. For example, tool-change-engagement portion 112 may be sized so as to be larger than the minor diameter of second fastener 197 but smaller than a minor diameter of first fastener 198. The larger diameter of tool-change-engagement portion 112 may isolate wearing or damage to fastener-engagement portion 111 to an area of tool 110 delimited by fastener-engagement portion 111 while tool-change-engagement portion 112 remains intact and provides increased torque application to tool 110 and tool retainer 130. First threaded portion 113 provides for the removal of tool 110 from, for example, tool retainer 130 while tool retainer 130 is held captive or otherwise remains within rotary drive 199.

Referring generally to FIG. 8 and particularly to, e.g., FIGS. 9A, 10 and 11, rotary-drive sub-assembly 400 comprises tool 410 and tool retainer 430. Tool 410 comprises fastener-engagement portion 411, first threaded portion 413, and tool-change-engagement portion 412 between fastener-engagement portion 411 and first threaded portion 413. Tool retainer 430 comprises body 431 and retaining member 461. Body 431 comprises symmetry axis 493 and second threaded portion 433 that is configured to be threadably fastened with first threaded portion 413 of tool 410 so that tool 410 is rotationally anchored relative to body 431 of tool retainer 430 about symmetry axis 493 and is translationally anchored relative to body 431 of tool retainer 430 along symmetry axis 493. Body 431 further comprises key 432 that is fixed relative to second threaded portion 433. Retaining member 461 is removably coupled to body 431 at a fixed location. The preceding subject matter of this paragraph characterizes example 23 of the present disclosure.

Use of rotary-drive sub-assembly 400 as set forth above allows for the installation and removal of a worn or broken tool 410 without disassembling rotary drive 199-2 in which rotary-drive sub-assembly 400 is installed. For example, the rotational anchoring of tool 410 relative to tool retainer 430 allows separation of tool 410 from tool retainer 430 while tool retainer 430 remains within rotary drive 199-2 enabling fast swapping of a worn or broken tool 410 with a new tool 410, where fast swapping indicates a rapid or quick succession tool change that facilitates the replacement of one tool 410 with another tool 410. Use of rotary-drive sub-assembly 400 decreases an amount of time needed to change a worn or broken tool 410 which also decreases an amount of production downtime associated with the change of the worn or broken tool 410. Further, key 432 prevents rotation of rotary-drive sub-assembly 400 relative to rotary drive 199-2, within predetermined rotational limits as described herein, to allow first fastener 198 to be threadably engaged to second fastener 197.

For example, rotary drive 199-2 includes housing 100H-2 to which retaining assembly 140-2 is coupled. Socket 120-2 is disposed at least partially within housing 100H-2 for engaging first fastener 198 (such as a nut) that is threadably fastened to second fastener 197 (such as a threaded stud or other "blind" fastener which is a fastener accessible only from one side of workpiece WKP). Rotary-drive sub-assembly 400 is disposed substantially concentrically with socket 120-2 about axis of symmetry 493 where tool retainer 430 is captured within rotary drive 199-2, between socket 120-2 and retaining assembly 140-2. For example, tool retainer 430 includes body 431 having retaining member engagement portion 460 in which retaining member 461 is partially disposed. Retaining member engagement portion 460 holds retaining member 461 at a fixed location relative to body 431 so as to not allow translation of retaining member 461 along symmetry axis 493 in direction D1 or direction D2. Retaining member 461 is disposed between socket 120-2 and retaining assembly 140-2 so as to prevent translation of tool retainer 430 in a first direction D2 through socket 120-2 and in a second direction D1 past retaining assembly 140-2. In one aspect, socket 120-2 includes flange 143-2 into which retaining member 461 is at least partially inserted where retaining member 461 includes at least one retaining surface 461S that interfaces with flange 143-2 to prevent translation of tool rotary-drive sub-assembly 400 past flange 132-2 in direction D2. Body 431 includes key 432, formed monolithically with body 431 (while in other aspects, key 432 may be coupled to body 431 in any suitable manner) where key 432 engages retaining assembly 140-2 to limit rotation of tool retainer 430 within a predetermined rotational compliance, as described in greater detail below. First threaded portion 413 of tool 410 engages second threaded portion 433 (which is formed in body 431) so that engagement between first threaded portion 413 and second threaded portion 433 will be reversed when tool 410 is to be decoupled from tool retainer 430 to allow changing one tool 410 for another tool 410.

Fastener-engagement portion 411, first threaded portion 413 and tool-change-engagement portion 412 of tool 410 may be monolithically formed as a one piece member. In one aspect, fastener-engagement portion 411 is located at a first end of tool 410, first threaded portion 413 is located at a second opposite end of tool 410 and tool-change-engagement portion 412 is located between fastener-engagement portion 411 and first threaded portion 413. Fastener-engagement portion 411 of tool 410 may be configured to engage a geometrically complementary receiving portion 197R within second fastener 197 so that tool 410 prevents rotation of second fastener 197 while first fastener 198 is threaded onto second fastener 197 as described herein. Fastener-engagement portion 411 may have any suitable configuration or geometry such as, for example, hex drive, clutch drive, Torx® drive, spline drive or any other drive configuration corresponding to receiving portion 197R of second fastener 197. Tool-change-engagement portion 412 is disposed between fastener-engagement portion 411 and second threaded portion 433 and includes any suitable configuration or geometry such as for example, hex drive, clutch drive, Torx® drive, spline drive or any other drive configuration suitable for causing rotation of tool 410 relative to tool retainer 430 for engaging or disengaging first threaded portion 413 of tool 410 and second threaded portion 433 of tool retainer 430. Tool-change-engagement portion 412 may have the same or different configuration or geometry than fastener-engagement portion 411. For example, in one aspect, tool-change-engagement portion 412 may have a Torx® configuration while fastener-engagement portion 411 has a hex configuration, and in other aspects, for example, both tool-change-engagement portion 412 and fastener-engagement portion 411 have hex configurations.

In one aspect, engagement between tool 410 and tool retainer 430 rotationally anchors tool 410 to tool retainer 430 so that tool 410 is not rotationally movable (in the direction of engagement) about axis of symmetry 493. For example, as tool 410 is threaded into tool retainer 430 (e.g. through engagement between first threaded portion 413 and second threaded portion 433 where tool 410 is rotated in a first direction relative to tool retainer 430) stop surface 410S of tool 410 contacts, e.g., stop surface 430S of tool retainer 430 to arrest rotation of tool 410 relative to tool retainer 430 so that stop surface 410S of tool 410 is seated against (e.g. in contact with) stop surface 430S of tool retainer 430. However, rotationally anchoring tool 410 to tool retainer 430 does not prevent a reverse rotation in a second direction (e.g. that is opposite the first direction) of tool 410 relative to tool retainer 430 to disengage first threaded portion 413 from second threaded portion 433 to allow removal of tool 410 from tool retainer 430. Likewise, tool 410 is translationally anchored relative to tool retainer 430 in that the contact between stop surface 410S and stop surface 430S (in addition to engagement of first threaded portion 413 and second threaded portion 433) prevents translation of tool 410 relative to tool retainer 430 along symmetry axis 493.

Fastener-engagement portion 411 is limited in size so that fastener-engagement portion 411 fits within a minor diameter of the threads of second fastener 197. However, a size of tool-change-engagement portion 412 is not limited by second fastener 197 and as such may be larger than fastener-engagement portion 412. For example, tool-change-engagement portion 412 may be sized so as to be larger than the minor diameter of second fastener 197 but smaller than a minor diameter of first fastener 198. The larger diameter of tool-change-engagement portion 412 may isolate wearing or damage to fastener-engagement portion 411 to an area of tool 410 delimited by fastener-engagement portion 411 while tool-change-engagement portion 412 remains intact and provides increased torque application to tool 410 to allow threadable fastening of tool 410 and tool retainer 430.

Referring generally to FIG. 8 and particularly to, e.g., FIG. 9A, first threaded portion 413 of tool 410 comprises first external thread 413E and second threaded portion 433 of tool retainer 430 comprises first internal thread 433I. The preceding subject matter of this paragraph characterizes example 24 of the present disclosure, wherein example 24 also includes the subject matter according to example 23, above.

Referring generally to FIG. 8 and particularly to, e.g., FIG. 9B, first threaded portion 413 of tool 410 comprises second internal thread 413I and second threaded portion 433 of tool retainer 430 comprises second external thread 433E. The preceding subject matter of this paragraph characterizes example 25 of the present disclosure, wherein example 25 also includes the subject matter according to example 23, above.

Providing variability in thread configurations, such as in examples 24 and 25 above, allows for ease of manufacturing first threaded portion 413 and second threaded portion 433.

Referring generally to FIG. 8 and particularly to, e.g., FIGS. 9A, 9B, and 10, first threaded portion 413 of tool 410 and second threaded portion 433 of tool retainer 430 comprise left-hand threads. The preceding subject matter of this paragraph characterizes example 26 of the present disclosure, wherein example 26 also includes the subject matter according to any one of examples 23-25, above.

The left-hand thread configuration of tool 410 as described in example 26 above allows for use of rotary-drive sub-assembly 400 in both right-hand fastener (e.g. fasteners with right-hand threads) applications.

Referring generally to FIG. 8 and particularly to, e.g., FIGS. 9A, 9B, and 10, first threaded portion 413 of tool 410 and second threaded portion 433 of tool retainer 430 comprise right-hand threads. The preceding subject matter of this paragraph characterizes example 27 of the present disclosure, wherein example 27 also includes the subject matter according to any one of examples 23-25, above.

The right-hand thread configuration of tool 410 as described in example 27 above allows for use of rotary-drive sub-assembly 400 in left-hand fastener (e.g. fasteners with left-hand threads) applications.

Referring generally to FIG. 8 and particularly to, e.g., FIGS. 9A, 9B, and 10, fastener-engagement portion 411 of tool 410 is co-axial with tool-change-engagement portion 412 of tool 410, first threaded portion 413 of tool 410, and second threaded portion 433 of tool retainer 430. The preceding subject matter of this paragraph characterizes example 28 of the present disclosure, wherein example 28 also includes the subject matter according to any one of examples 23-27, above.

The coaxial alignment of fastener-engagement portion 411 with tool-change-engagement portion 412, first threaded portion 413 and second threaded portion 433 provides for limited runout and positions fastener-engagement portion 411, when tool 410 is installed within rotary drive 199-2

(e.g. threadably fastened with tool retainer 430) so that fastener-engagement portion 411 is aligned with receiving portion 197R of second fastener 197. Alignment of fastener-engagement portion 411 with receiving portion 197R facilitates alignment of first fastener 198 with second fastener 197 when first fastener 198 is located within socket 120-2, as described herein.

For example, when first fastener 198 is held within socket 120-2, the co-axial arrangement of fastener-engagement portion 411 of tool 410, tool-change-engagement portion 412, first threaded portion 413 of tool 410, and second threaded portion 433 of tool retainer 430 positions fastener-engagement portion 411 substantially concentric with the minor diameter of first fastener 198. As such, fastener-engagement portion 411 engagement or mating with receiving portion 197R of second fastener 197 aligns the threads of first fastener 198 with threads of second fastener 197 to allow threadably fastening first fastener 198 with second fastener 197.

Referring generally to FIG. 8 and particularly to, e.g., FIG. 9C, second threaded portion 433 of tool retainer 430 defines through hole 433T in tool retainer 430. The preceding subject matter of this paragraph characterizes example 29 of the present disclosure, wherein example 29 also includes the subject matter according to any one of examples 23-28, above.

Through hole 433T defined by second threaded portion 433 provides ease of manufacture of tool retainer 430 and provides key 432 with width W1 greater than a diameter of through hole 433T.

Referring generally to FIG. 8 and particularly to, e.g., FIGS. 8A, 9A, 10, and 11, second threaded portion 433 of tool retainer 430 defines blind hole 433B in tool retainer 430. The preceding subject matter of this paragraph characterizes example 30 of the present disclosure, wherein example 30 also includes the subject matter according to any one of examples 23-28, above.

Blind hole 433B defined by second threaded portion 433 provides key 432 with width W2 that may be smaller, substantially equal to or greater than a diameter of blind hole 433B.

Referring generally to FIG. 8 and particularly to, e.g., FIGS. 9A, 9B, 10 and 11, body 431 of tool retainer 430 comprises retaining-member engagement portion 460. Retaining member 461 of tool retainer 430 engages retaining-member engagement portion 460 so that retaining member 461 is fixed relative to body 431 of tool retainer 430 along symmetry axis 493. The preceding subject matter of this paragraph characterizes example 31 of the present disclosure, wherein example 31 also includes the subject matter according to any one of examples 23-30, above.

Providing body 431 with retaining-member engagement portion 460 locates retaining member 461 on body 431 along symmetry axis 493 so that tool 410 extends in direction D1 past threads of first fastener 198 when retaining member 461 engages flange 143-2 of socket 120-2. Retaining member 461 also prevents movement of tool 410 in direction D2 past retaining member 150B.

In one aspect, retaining-member engagement portion 460 is a circumferential groove into which retaining member 461 is removably disposed. In other aspects retaining-member engagement portion 460 may include slots, protrusions, holes or any other suitable structure for capturing retaining member 461 on body 431 so that retaining member 461 does not translate along symmetry axis 493 in direction D1 and D2. In one aspect retaining member 461 is a clip or ring that is inserted into retaining-member engagement portion 460 that radially extends from body 431 to engage flange 143-2 of socket 120-2 and retaining member 150B for holding at least tool retainer 430 within rotary drive 199-2. In other aspects, retaining member 461 may be a pin or other member that is suitably shaped and sized to engage flange 143-2 of socket 120-2 and retaining member 150B for holding at least tool retainer 430 within rotary drive 199-2.

Referring generally to FIG. 8 and particularly to, e.g., FIGS. 8A, 9A, 10, and 11, rotary drive 199-2 comprises tool 410, tool retainer 430, retaining assembly 140-2, and socket 120-2. Tool 410 comprises fastener-engagement portion 411, first threaded portion 413, and tool-change-engagement portion 412 between fastener-engagement portion 411 and first threaded portion 413. Tool retainer 430 comprises body 431 and retaining member 461. Body 431 comprises symmetry axis 493, second threaded portion 433, and key 432 that is fixed relative to second threaded portion 433. Second threaded portion 433 is configured to be threadably fastened with first threaded portion 413 of tool 410 so that tool 410 is rotationally anchored relative to body 431 of tool retainer 430 about symmetry axis 493 and is translationally anchored relative to body 431 of tool retainer 430 along symmetry axis 493. Retaining member 461 is removably coupled to body 431 at fixed location. Retaining assembly 140-2 is configured to be coupled with key 432 of tool retainer 430 to limit rotation of tool retainer 430 about symmetry axis 493. Socket 120-2 is co-axially rotatable relative to tool retainer 430 when retaining assembly 140-2 is coupled with key 432 of tool retainer 430. The preceding subject matter of this paragraph characterizes example 32 of the present disclosure.

Use of rotary drive 199-2 including rotary-drive sub-assembly 400 allows for operator (e.g. without the need for a specialized mechanic or repair person) changing of worn or broken tools 410. For example, use of rotary-drive sub-assembly 400 as described herein allows for the installation and removal of a worn or broken tool 410 without disassembling rotary drive 199-2 in which rotary-drive sub-assembly 400 is installed. For example, the rotational anchoring of tool 410 relative to tool retainer 430 allows separation of tool 410 while tool retainer remains within rotary drive 199-2 enabling fast swapping of a worn or broken tool 410 with a new tool 410, where fast swapping indicates a rapid or quick succession tool change that facilitates the replacement of one tool 410 with another tool 410. Rotary drive 199-2 including rotary-drive sub-assembly 400 decreases the amount of time needed to change a worn or broken tool 410 which also decreases an amount of production downtime associated with the change of the worn or broken tool 410. Further, key 432 prevents rotation of rotary-drive sub-assembly 100 relative to rotary drive 199, within predetermined rotational limits as described herein, to allow first fastener 198 to be threadably engaged to second fastener 197, while retaining member 461 retains rotary-drive sub-assembly 400 within rotary drive 199-2 is described herein.

As described above, retaining assembly 140-2 is coupled to housing 100H-2 of rotary drive 199-2. Socket 120-2 is disposed at least partially within housing 100H-2 for engaging first fastener 198 that is threadably fastened to second fastener 197. Rotary-drive sub-assembly 400 is disposed substantially concentrically with socket 120-2 about axis of symmetry 193 where retaining member 461 of tool retainer 430 is captured within rotary drive 199-2, between socket 120-2 and retaining assembly 140-2 as described above. First threaded portion 413 of tool 410 engages second threaded portion 433 so that first threaded portion 413 and second threaded portion 433 are threadably fastened as described above to provide for the decoupling of tool 410 from tool retainer 430 to allow changing one tool 410 for another tool 410. First threaded portion 413 and second threaded portion 433 may include complementary internal and external threads as well as right or left handed threads as described above.

As also described above, fastener-engagement portion 411 of tool 410 may be configured to engage a geometrically complementary receiving portion 197R within second fastener 197 so that tool 410 prevents rotation of second fastener 197 while first fastener 198 is threaded onto second fastener 197. Again, fastener-engagement portion 411 may have any suitable configuration or geometry such as, for example, hex drive, clutch drive, Torx® drive, spline drive or any other drive configuration corresponding to receiving portion 197R of second fastener 197. Tool-change-engagement portion 412 is disposed between fastener-engagement portion 411 and second threaded portion 433 and includes any suitable configuration or geometry such as for example, hex drive, clutch drive, Torx® drive, spline drive or any other drive configuration suitable for causing rotation of tool 410 relative to tool retainer 430 for causing tool 410 to be threadably fastened with tool retainer 430. As also described above, tool-change-engagement portion 412 may have the same or different configuration or geometry than fastener-engagement portion 411.

Fastener-engagement portion 411 is limited in size so that fastener-engagement portion 411 fits within a minor diameter of the threads of second fastener 197. However, a size of tool-change-engagement portion 412 is not limited by second fastener 197 and as such may be larger than fastener-engagement portion 411. For example, tool-change-engagement portion 412 may be sized so as to be larger than the minor diameter of second fastener 197 but smaller than a minor diameter of first fastener 198. The larger diameter of tool-change-engagement portion 412 may isolate wearing or damage to fastener-engagement portion 411 to an area of tool 410 delimited by fastener-engagement portion 411 while tool-change-engagement portion 412 remains intact and provides increased torque application to tool 410 to allow reversible fastening of tool 410 and tool retainer 430.

Referring generally to FIG. 8 and particularly to, e.g., FIGS. 6B, 7, 9A, 9B, and 10, rotary-drive sub-assembly 400 is co-axially translatable relative to socket 120-2. The preceding subject matter of this paragraph characterizes example 33 of the present disclosure, wherein example 33 also includes the subject matter according to example 32, above.

Translation of rotary-drive sub-assembly 400 relative to socket 120-2 allows for socket 120-2 and first fastener 198 to move substantially along an axis of second fastener 197 in direction D2 so that first fastener 198 is tightened against workpiece WKP (e.g. where securing second fastener 197 and first fastener 198 secure workpiece WKP) while fastener-engagement portion 411 of tool 410 remains engaged with receiving portion 197R of second fastener 197 and prevents rotation of second fastener 197.

For example, in a manner similar to that described above, as first fastener 198 is threaded onto second fastener 197, rotary-drive sub-assembly 400 translates in direction D1 relative to socket 120-2 and housing 100H-2.

Referring generally to FIG. 8 and particularly to, e.g., FIGS. 9A, 9B, 10 and 11, body 431 of tool retainer 430 comprises a retaining-member engagement portion 460. Retaining member 461 of tool retainer 430 engages retaining-member engagement portion 460 of body 431 so that retaining member 461 is fixed relative to body 431 of tool retainer 430 along symmetry axis 493. The preceding subject matter of this paragraph characterizes example 34 of the present disclosure, wherein example 34 also includes the subject matter according to any one of examples 32 or 33, above.

As described above, providing body 431 with retaining-member engagement portion 460 locates retaining member 461 on body 431 along symmetry axis 493 so that tool 410 extends in direction D1 past threads of first fastener 198 when retaining member 461 engages flange 143-2 of socket 120-2. Retaining member 461 also prevents movement of tool 410 in direction D2 past retaining member 150B.

Again, in one aspect, retaining-member engagement portion 460 is a circumferential groove into which retaining member 461 is removably disposed. In other aspects retaining-member engagement portion 460 may include slots, protrusions, holes or any other suitable structure for capturing retaining member 461 on body 431 so that retaining member 461 does not translate along symmetry axis 493 in direction D1 and D2. In one aspect retaining member 461 is a clip or ring that is inserted into retaining-member engagement portion 460 that radially extends from body 431 to engage flange 143-2 of socket 120-2 and retaining member 150B for holding at least tool retainer 430 within rotary drive 199-2. In other aspects, retaining member 461 may be a pin or other member that is suitably shaped and sized to engage flange 143-2 of socket 120-2 and retaining member 150B for holding at least tool retainer 430 within rotary drive 199-2.

Referring generally to FIG. 8 and particularly to, e.g., FIGS. 10 and 11, socket 120-2 includes flange 143-2, supporting retaining member 161-2. Retaining member 161-2 is located between flange 143-2 and retaining assembly 140-2. The preceding subject matter of this paragraph characterizes example 35 of the present disclosure, wherein example 35 also includes the subject matter according to any one of examples 32-34, above.

Flange 143-2 supports retaining member 161-2 and prevents translation of tool 410 along symmetry axis 493 in direction D2 while retaining assembly 140-2 prevents translation of tool 410 along symmetry axis 493 in direction D1 so as to retain tool 410 (and rotary-drive sub-assembly 400) within rotary drive 199-2.

Referring generally to FIG. 8 and particularly to, e.g., FIG. 8A, rotary drive 199-2 further comprises housing 100H-2. Retaining assembly 140-2 comprises retaining member 150B and resilient member 155-2. Retaining member 150B is coupled to housing 100H-2 and comprises retaining opening 151A-2, which is configured to engage key 432 so as to rotationally constrain tool retainer 430 relative to housing 100H-2. Resilient member 155-2 is coupled to housing 100H and biases retaining member 150B toward housing 100H-2. Resilient member 155-2 is movable relative to retaining member 150B. The preceding subject matter of this paragraph characterizes example 36 of the present disclosure, wherein example 36 also includes the subject matter according to any one of examples 32-35, above.

Retaining member 150B and resilient member 155-2 provide for the translation of rotary-drive sub-assembly 400 relative to socket 120-2. Retaining member 150B also provides for non-rotatably holding rotary-drive sub-assembly 400 to allow for the threadable engagement between second fastener 197 and first fastener 198.

Referring generally to FIG. 8 and particularly to, e.g., FIGS. 6B, 7, and 8A, retaining member 150B is configured to pivot relative to housing 100H-2 and to translate relative to housing 100H-2. The preceding subject matter of this paragraph characterizes example 37 of the present disclosure, wherein example 37 also includes the subject matter according to example 36, above.

The pivoting and translating movement of retaining member 150B relative to housing 100H-2 provides retaining member 150B with a sufficient number of degrees of freedom to allow for the translation of rotary-drive sub-assembly 400 relative to socket 120-2 without binding or restriction of movement between, e.g., tool retainer 130 and retaining member 150B during translation of rotary-drive sub-assembly 400.

Referring generally to FIG. 8 and particularly to, e.g., FIG. 8A, retaining member 150B includes recess 177-2. At least a portion of resilient member 155-2 is received within recess 177-2. Recess 177-2 is sized to accommodate relative translational movement between retaining member 150B and resilient member 155-2. The preceding subject matter of this paragraph characterizes example 38 of the present disclosure, wherein example 38 also includes the subject matter according to example 37, above.

Resilient member 155-2 in combination with recess 177-2 may provide guided movement of retaining member 150B as retaining member 150B pivots and translates relative to housing 100H-2 during translation of rotary-drive sub-assembly 400 relative to socket 120-2. The guided movement of retaining member 150B may facilitate non-binding movement of retaining member 150B relative to rotary-drive sub-assembly 400 during translation of rotary-drive sub-assembly 400 relative to socket 120-2.

For example, retaining member 150B is mounted to housing 100H-2 by mounting member 156-2. Mounting member 156-2 is fastened to housing 100H-2 and retaining member 150B of retaining assembly 140-2 is pivotally and translationally coupled to mounting member 156-2 by coupling 157-2. In one aspect, coupling 157-2 may be a slot and pin coupling, where the pin is movable within the slot, or any other coupling that provides both pivotal and translational movement of retaining member 150B relative to mounting member 156-2 and housing 100H-2. Resilient member 155-2 is mounted to mounting member 156-2 so as to engage with and bias retaining member 150B toward housing 100H-2 (e.g. in direction D2). For example, resilient member 155-2 may be a leaf spring or other suitably configured spring or resilient member that extends along any suitable length of retaining member 150B for providing a biasing force on retaining member 150B. In one aspect, resilient member 155-2 biases retaining member 461 of tool retainer 430 against flange 143-2 of socket 120-2 so that fastener-engagement portion 411 extends past threads of first fastener 198 in direction D2 to allow mating of fastener-engagement portion 411 with receiving portion 197R of second fastener 197 prior to threadable engagement of first fastener 198 and second fastener 197.

As described above, key 432 of tool retainer 430 engages retaining assembly 140-2 to prevent or otherwise limit rotation of tool retainer 430 and hence, rotary-drive sub-assembly 400. For example, retaining member 150B of retaining assembly 140-2 comprises retaining opening 151A-2 in which key 432 is positioned. Retaining opening 151A-2 may be any suitable opening such as an open or closed slot or a circumferentially enclosed opening having any suitable shape, as described in greater detail herein.

Referring to FIG. 8 and particularly to, e.g., FIG. 8B, retaining opening 151A-2 of retaining member 150B is configured to engage key 432-2 of tool retainer 430 with an intrinsic rotational backlash. The preceding subject matter of this paragraph characterizes example 39 of the present disclosure, wherein example 39 also includes the subject matter according to any one of examples 36-38, above.

Referring generally to FIG. 8 and particularly to, e.g., FIG. 8B, the intrinsic rotational backlash between retaining opening 151A-2 of retaining member 150B and key 432 of tool retainer 430 is less than about 10 degrees. The preceding subject matter of this paragraph characterizes example 40 of the present disclosure, wherein example 40 also includes the subject matter according to example 39, above.

The intrinsic rotational backlash may be provided between key 432 and retaining opening 151A-2 to allow the pivotal and translational movement of retaining member 150B relative to mounting member 156-2 and housing 100H-2. The intrinsic rotational backlash between key 432 and retaining opening 151A-2 maintains a substantially fixed (non-rotating) relationship between tool 410 (rotationally anchored to tool retainer 430) of rotary-drive sub-assembly 400 and housing 100H-2.

For example, while less than 10 degrees of rotation may be provided between key 432 and retaining opening 151A-2, this intrinsic rotational backlash may be defined as a result of manufacturing tolerances that provide a slip or clearance fit between key 432 and retaining opening 151A-2, where the amount of rotation provided by the intrinsic rotational backlash is a total rotation in both clockwise and counterclockwise directions. The slip or clearance fit between key 432 and retaining opening 151A-2 allows for relative movement of retaining member 150A-2 and tool retainer 430. The slip or clearance fit between key 432 and retaining opening 151A-2 may also allow pivoting and translational movement of retaining member 150A-2 relative to housing 100H-2.

Referring generally to FIG. 8 and particularly to, e.g., FIG. 8B, retaining opening 151A-2 of retaining member 150B comprises pair of opposed parallel walls 151OP-2. The preceding subject matter of this paragraph characterizes example 41 of the present disclosure, wherein example 41 also includes the subject matter according to any one of examples 36-40, above.

Opposed parallel walls 151OP-2 engage key 432 to substantially prevent rotation of key 432.

For example, retaining opening 151A-2 may have an open slot or forked configuration which may be open on one end (similar to that shown in e.g. FIGS. 2 and 3) while in other aspects retaining opening 151A-2 may have a circumferentially enclosed opening or slot configuration (as shown in, e.g., FIGS. 8B and 8C) so that walls of retaining opening 151A-2 circumscribe key 432 when key 432 is disposed within retaining opening 151A-2. In either the open slot or circumferentially enclosed slot configurations, at least opposed parallel walls 151OP-2 of retaining opening 151A-2 engage and rotationally constrain key 432. End walls of retaining opening 151OE-2 may also rotationally constrain key 432.

Referring generally to FIG. 8 and particularly to, e.g., FIGS. 8A and 8C, retaining opening 151A-2 of retaining member 150B is configured to engage key 432 with an engineered rotational compliance. The preceding subject matter of this paragraph characterizes example 42 of the present disclosure, wherein example 42 also includes the subject matter according to any one of examples 36-38, above.

The engineered rotational compliance provides for a predetermined range of key 432 rotation relative to, e.g., housing 100H-2 that is greater than rotation resulting from manufacturing tolerances or slip/clearance fits.

Referring generally to FIG. 8 and particularly to, e.g., FIGS. 8A and 8C, the engineered rotational compliance between retaining opening 151A-2 of retaining member 150B and key 432 of tool retainer 430 is between about 30 degrees and about 270 degrees. The preceding subject matter of this paragraph characterizes example 43 of the present disclosure, wherein example 43 also includes the subject matter according to example 42, above.

The engineered rotational compliance between retaining opening 151A-2 and key 432 provides for rotation of tool 410 relative to receiving portion 197R of second fastener 197 so that fastener-engagement portion 411 of tool 410 can be geometrically rotationally aligned with receiving portion 197R, substantially without rotation of housing 100H-2.

For example, an initial rotational orientation of fastener-engagement portion 411 relative to receiving portion 197R of second fastener 197 may be such that the geometry of fastener-engagement portion 411 is not aligned with the geometry of receiving portion 197R. The engineered rotational compliance allows for predetermined limited rotation (e.g. rotational compliance which is a total amount of rotation in both clockwise and counterclockwise directions) of fastener-engagement portion 411 of tool 410 relative to receiving portion 197R to align their respective geometries to allow engagement between fastener-engagement portion 411 and receiving portion 197R. To provide the predetermined limited rotation of fastener-engagement portion 411 of tool 410, retaining opening 151A-2 may be in the form of a circumferentially enclosed butterfly slot.

Referring generally to FIG. 8 and particularly to, e.g., FIGS. 8A and 8C, retaining opening 151A-2 of retaining member 150B comprises first pair of parallel walls 151SP1-2 and second pair of parallel walls 151SP2-2. Walls of first pair of parallel walls 151SP1-2 are staggered relative to each other along first axis SPX1-2, parallel to first pair of parallel walls 151SP1-2. Walls of second pair of parallel walls 151SP2-2 are staggered relative to each other along second axis SPX2-2, parallel to second pair of parallel walls 151SP2-2. The preceding subject matter of this paragraph characterizes example 44 of the present disclosure, wherein example 44 also includes the subject matter according to any one of examples 36-38, 42, or 43, above.

First pair of parallel walls 151SP1-2 and second pair of parallel walls 151SP2-2 and the structural arrangement therebetween (as described above) provides for the predetermined limited rotation of fastener-engagement portion 411 of tool 410.

For example, the staggered configuration of first pair of parallel walls 151SP1-2 and second pair of parallel walls 151SP2-2 forms the circumferentially enclosed butterfly shape of retaining opening 151A-2, where central portion 151CP-2 of retaining opening 151A-2 is narrower than ends 151EP-2 of retaining opening 151A-2. First pair of parallel walls 151SP1-2 are staggered in that each wall in first pair of parallel walls 151SP1-2 are separated by distance G1-2. Similarly Second pair of parallel walls 151SP2-2 are staggered in that each wall in second pair of parallel walls 151SP2-2 are separated by distance G2-2. Distances G1-2, G2-2 may provide clearance for key 432 within central portion 151CP-3 of retaining opening 242A. In one aspect, retaining opening 151A-2 provides tool 410 with about 30 degrees and about 270 degrees of rotation but in other aspects retaining opening 151A-2 may provide tool 410 with more than about 270 degrees and less than about 30 degrees of rotation.

Referring generally to FIG. 8 and particularly to, e.g., FIGS. 3 and 8A, rotary drive 199-2 further comprises drive transmission 170-2 inside housing 100H-2. Socket 120-2 comprises drive member 171-2, coupled to drive transmission 170-2. The preceding subject matter of this paragraph characterizes example 45 of the present disclosure, wherein example 45 also includes the subject matter according to any one of examples 36-44, above.

Drive transmission 170-2 causes rotation of at least socket 120-2 relative to housing 100H-2.

Drive transmission 170-2 may be any suitable drive including one or more of gears, sprockets, chains, belts, pulleys or any other suitable drive mechanism that drivingly engage or mate drive member 171-2 of socket 120-2 for causing rotation of at least socket 120-2 relative to housing 100H-2. Drive transmission 170-2 may couple socket 120-2 to a drive motor so that motive force from the drive motor is transferred through drive transmission 170-2 to socket 120-2.

Referring generally to FIG. 8 and particularly to, e.g., FIG. 10, rotary drive 199-2 further comprises friction member 165-2 that is interposed between socket 120-2 and tool 410. Friction member 165-2 is configured to transfer rotation of socket 120-2, engaging first fastener 198, to tool 410 when fastener-engagement portion 411 of tool 410 is disengaged from second fastener 197, that is threadably couplable with first fastener 198. Friction member 165-2 is also configured to discontinue transferring the rotation of socket 120-2 to tool 410 when fastener-engagement portion 411 of tool 410 becomes engaged with second fastener 197. The preceding subject matter of this paragraph characterizes example 46 of the present disclosure, wherein example 46 also includes the subject matter according to any one of examples 32-38 or 42-45, above.

The rotation of tool 410 through the use of friction member 165-2 provides for the rotational alignment of fastener-engagement portion 411 of tool 410 with receiving portion 197R of second fastener 197 substantially without rotation of housing 100H-2 relative to second fastener 197.

For example, socket 120-2 may include groove 167-2, which may be an annular groove. Friction member 165-2, such as an O-ring or other suitable friction member, is disposed at least partially within groove 167-2 such that at least a portion of friction member 165-2 protrudes towards a centerline (which may be coincident with symmetry axis 493) of socket 120-2 to frictionally engage tool retainer 430 however, in other aspects friction member 165-2 may be positioned within socket 120-2 to engage tool 410. As noted above, initial rotational orientation of fastener-engagement portion 411 relative to receiving portion 197R of second fastener may 197 may be such that the geometry of fastener-engagement portion 411 is not aligned with the geometry of receiving portion 197R. Socket 120-2 may be driven (e.g. rotated clockwise or counterclockwise) such that friction member 165-2 transfers the rotational movement of socket 120-2 to tool retainer 430 so that tool retainer 430 rotates within and is rotationally constrained by retaining opening 151A-2. The rotational movement of tool 410 (induced by friction member 165-2) causes rotational alignment of fastener-engagement portion 411 of tool 410 with receiving portion 197R of second fastener 197. For example, as fastener-engagement portion 411 of tool 410 rotates, fastener-engagement portion 411 of tool 410 may fall, or otherwise move in direction D2, into receiving portion 197R of second fastener 197 when the geometries of receiving portion 197R and fastener-engagement portion 411 are aligned.

Rotation of fastener-engagement portion 411, which is induced by friction member 165-2 through tool retainer 430, may also provide for seating fastener-engagement portion 411 within receiving portion 197R of second fastener 197. For example, when fastener-engagement portion 411 is at least partially mated with receiving portion 197R of second fastener 197, tool 410 may be alternately rotated in clockwise and counterclockwise directions until movement of fastener-engagement portion 411 in direction D2 within receiving portion 197R ceases so that fastener-engagement portion 411 is completely or fully seated within receiving portion 197R of second fastener 197.

Referring generally to FIGS. 1 and 8 and particularly to, e.g., FIGS. 4B, 5, 6A, 6B, 7, 8A, 8B, 8C, 10, 11, and 12, method 850 of threadably coupling first fastener 198 with second fastener 197 using rotary drive 199, 199-2 comprising tool 110, 410 is provided. Method 850 comprises (block 851) rotationally anchoring second fastener 197 relative to tool 110, 410 by co-axially urging fastener-engagement portion 111, 411 of tool 110, 410 against second fastener 197 and rotating tool 110, 410 relative to second fastener 197 using socket 120, 120-2 of rotary drive 199, 199-2 until fastener-engagement portion 111, 411 of tool 110, 410 mates with receiving portion 197R of second fastener 197. Additionally, method 850 comprises (block 852) receiving first fastener 198 within socket 120, 120-2 of rotary drive 199, 199-2 co-axially with fastener-engagement portion 111, 411 of tool 110, 410. Method 850 also comprises (block 853) rotating first fastener 198 with socket 120, 120-2 of rotary drive 199, 199-2 relative to housing 100H, 100H-2 of rotary drive 199, 199-2 to cause first fastener 198 to threadably engage second fastener 197. The preceding subject matter of this paragraph characterizes example 47 of the present disclosure.

Rotating tool 110, 410 relative to second fastener 197 using socket 120, 120-2 of rotary drive 199, 199-2 provides for alignment of fastener-engagement portion 111, 411 of tool 110, 410 with receiving portion 197R of second fastener 197. This may allow for use of rotary drive 199, 199-2 in confined working areas.

In one aspect, first fastener 198 may be at least partially inserted within and be retained by socket 120, 120-2. Fastener-engagement portion 111, 411 of tool 110, 410 may be aligned with second fastener 197 and moved relative to second fastener 197 so that fastener-engagement portion 111, 411 of tool 110, 410 is mated with receiving portion 197R of second fastener 197. Rotary drive 199, 199-2 may be operated to rotate socket 120, 120-2, which in turn rotates first fastener 198 relative to second fastener 197 (while second fastener is held rotationally stationary, e.g. does not rotate) to threadably engage first fastener 198 with second fastener 197.

Referring generally to FIG. 1 and particularly to, e.g., FIGS. 4B, 5, 6A, 6B, 7 and 12, method 850 further comprises (block 854) frictionally retaining first fastener 198 within socket 120, 120-2. The preceding subject matter of this paragraph characterizes example 48 of the present disclosure, wherein example 48 also includes the subject matter according to example 47, above.

Frictionally retaining first fastener 198 within socket 120, 120-2 may provide for single hand use of rotary drive 199, 199-2. Frictionally retaining first fastener 198 within socket 120, 120-2 also enables use of rotary drive 199, 199-2 in confined work areas such that an operator does not have to hold first fastener 198 within socket 120, 120-2 prior to engagement of first fastener 198 with second fastener 197.

For example, socket 120, 120-2 includes groove 168, 168-2, which may be an annular groove, adjacent an end of socket 120, 120-2. Retaining member 166, 166-2, such as an O-ring or other suitable friction member, is disposed at least partially within groove 168, 168-2 such that at least a portion of retaining member 166, 166-2 protrudes towards a centerline (which may be coincident with symmetry axis 193, 493) of socket 120, 120-2 to engage first fastener 198 when first fastener 198 is located at least partially within socket 120, 120-2. For example, an inner diameter of retaining member 166, 166-2 may be smaller than an outer diameter of first fastener 198 to provide a friction fit between retaining member 166, 166-2 and first fastener 198 so that first fastener 198 is retained within socket 120, 120-2 by retaining member 166, 166-2.

Referring generally to FIG. 1 and particularly to, e.g., FIGS. 4B, 5, 6A, 6B, 7 and 12, according to method 850, (block 855) rotating tool 110, 410 of rotary drive 199, 199-2 relative to second fastener 197 using socket 120, 120-2 of rotary drive 199, 199-2 comprises rotating tool 110, 410 relative to housing 100H, 100H-2 of rotary drive 199, 199-2. The preceding subject matter of this paragraph characterizes example 49 of the present disclosure, wherein example 49 also includes the subject matter according to any one of examples 47 or 48, above.

Rotating tool 110, 410 relative to second fastener 197 using socket 120, 120-2 of rotary drive 199, 199-2 provides for alignment of fastener-engagement portion 111, 411 of tool 110, 410 with receiving portion 197R of second fastener 197 substantially without rotation of housing 100H, 100H-2. This may allow for use of rotary drive 199, 199-2 in confined working areas.

Referring generally to FIG. 1 and particularly to, e.g., FIGS. 4B, 5, 6A, 6B, 7 and 12, according to method 850, (block 856) when first fastener 198 is rotated with socket 120, 120-2 of rotary drive 199, 199-2 relative to housing 100H, 100H-2 in a first direction to cause first fastener 198 to threadably engage second fastener 197 while fastener-engagement portion 111, 411 of tool 110, 410 of rotary drive 199, 199-2 is mated with receiving portion 197R of second fastener 197 to rotationally anchor second fastener 197 relative to tool 110, 410 of rotary drive 199, 199-2, tool 110, 410 is co-axially translated relative to socket 120, 120-2 of rotary drive 199, 199-2. The preceding subject matter of this paragraph characterizes example 50 of the present disclosure, wherein example 50 also includes the subject matter according to any one of examples 47-49, above.

Translation of tool 110, 410 relative to socket 120, 120-2 allows for socket 120, 120-2 and first fastener 198 to move substantially along an axis of second fastener 197 so that first fastener 198 is tightened against workpiece WKP (e.g. where securing second fastener 197 and first fastener 198 secure workpiece WKP) while fastener-engagement portion 111, 411 of tool 110, 410 remains engaged with receiving portion 197R of second fastener 197 and prevents rotation of second fastener 197.

As described above, as first fastener 198 is threaded onto second fastener 197, rotary-drive sub-assembly 100, 400 translates in direction D1 relative to socket 120, 120-2 and housing 100H, 100H-2.

Referring generally to FIG. 1 and particularly to, e.g., FIGS. 4B, 5, 6A, 6B, 7, and 12, method 850 further comprises (block 857) enabling fastener-engagement portion 111, 411 of tool 110, 410 to be disengaged from receiving portion 197R of second fastener 197 by at least partially removing torque between fastener-engagement portion 111, 411 of tool 110, 410 of rotary drive 199, 199-2 and receiving portion 197R of second fastener 197, resulting from rotating first fastener 198 in the first direction to cause first fastener 198 to threadably engage second fastener 197 while fastener-engagement portion 111, 411 of tool 110, 410 is mated with receiving portion 197R of second fastener 197, by rotating socket 120, 120-2 of rotary drive 199, 199-2 in a second direction opposite to the first direction. The preceding subject matter of this paragraph characterizes example 51 of the present disclosure, wherein example 51 also includes the subject matter according to example 50, above.

At least partially removing torque between fastener-engagement portion 111, 411 of tool 110, 410 and receiving portion 197R of second fastener by reversing rotation of tool 110, 410 provides for removal of tool 110, 410 from receiving portion 197R of second fastener 197 such that binding between receiving portion 197R and fastener-engagement portion 111, 411 is alleviated.

Partially removing the torque between fastener-engagement portion 111, 411 of tool 110, 410 by reversing rotation of tool 110, 410 permits alleviation of binding between tool 110, 410 and receiving portion 197R of second fastener 197 in confined areas with little or no movement of housing 100H, 100H-2. In one aspect, a torque between tool 110, 410 and too retainer 130, 430 may be greater than a torque applied between first fastener 198 and second fastener 197 to allow for the reverse rotation of tool 110, 410 without disengagement between tool 110, 410 and tool retainer 130, 430.

Referring generally to FIG. 1 and particularly to, e.g., FIGS. 4B, 5, 6A, 6B, 7 and 12, according to method 850, (block 858) tool 110, 410 of rotary drive 199, 199-2 has a limited amount of rotation relative to housing 100H, 100H-2 of rotary drive 199, 199-2. The preceding subject matter of this paragraph characterizes example 52 of the present disclosure, wherein example 52 also includes the subject matter according to example 51, above.

As described herein, the limited amount of rotation of tool 110, 410 relative to housing 100H, 100H-2 provides movement between retaining member 150A, 150B 150A-2, 150B to allow for translation of tool 110, 410 in directions D1, D2. The limited amount of rotation of tool 110, 410 relative to housing 100H, 100H-2 also provides for alignment fastener-engagement portion 111, 411 of tool 110, 410 with receiving portion 197R of second fastener 197.

Referring generally to FIG. 1 and particularly to, e.g., FIGS. 4B, 5, 6A, 6B, 7 and 12, according to method 850, (block 859) the limited amount of rotation of tool 110, 410 of rotary drive 199, 199-2 relative to housing 100H, 100H-2 of rotary drive 199, 199-2 is between about 30 degrees and about 270 degrees. The preceding subject matter of this paragraph characterizes example 53 of the present disclosure, wherein example 53 also includes the subject matter according to example 52, above.

The limited amount of rotation of tool 110, 410 relative to housing 100H, 100H-2 between about 30 degrees and about 270 degrees provides for alignment fastener-engagement portion 111, 411 of tool 110, 410 with receiving portion 197R of second fastener 197.

The range of rotation provided to tool 110, 410 allows for geometrical alignment between fastener-engagement portion 111, 411 of tool 110, 410 and receiving portion 197R of second fastener 197.

Referring generally to FIG. 13 and particularly to, e.g., FIGS. 14A, 15A, 16, 17, and 18, rotary-drive sub-assembly 200 comprises tool 210 and tool retainer 230. Tool 210 comprises first body 217 and second body 214. First body 217 comprises tool-change-engagement portion 212 and first threaded portion 212T, fixed relative to tool-change-engagement portion 212. Second body 214 comprises fastener-engagement portion 211. Second body 214 is translatable relative to first body 217, co-axially with first body 217, and is co-axially rotationally fixed relative to first body 217. Tool 210 further comprises keeper 216, fixed within first body 217, and resilient member 215, captured between second body 214 and keeper 216. Tool retainer 230 comprises second threaded portion 233T, configured to be threadably fastened with first threaded portion 212T of first body 217, and key 232, fixed relative to second threaded portion 233T. The preceding subject matter of this paragraph characterizes example 54 of the present disclosure.

Use of rotary-drive sub-assembly 200 as set forth herein allows for the installation and removal of a worn or broken tool 210 without disassembling rotary drive 299 in which rotary-drive sub-assembly 200 is installed. For example, tool 210 is rotationally anchored relative to tool retainer 230 which allows for separation of tool 210 from tool retainer 230 while tool retainer 230 remains within rotary drive 299 enabling fast swapping of a worn or broken tool 210 with a new tool 210, where fast swapping indicates a rapid or quick succession tool change that facilitates the replacement of one tool 210 with another tool 210. Use of the rotary-drive sub-assembly decreases an amount of time needed to change a worn or broken tool 210 which also decreases an amount of production downtime associated with the change of the worn or broken tool 210. Further, key 132 prevents rotation of rotary-drive sub-assembly 100 relative to rotary drive 199, within predetermined rotational limits as described herein, to allow first fastener 198 to be threadably engaged to second fastener 197.

For example, rotary drive 299 includes housing 200H to which retainer 240 is coupled. Socket 220 is disposed at least partially within housing 200H for engaging first fastener 198 (such as a nut) that is threadably fastened to second fastener 197 (such as a threaded stud or other "blind" fastener which is a fastener accessible only from one side of workpiece WKP). Rotary-drive sub-assembly 200 is disposed substantially concentrically with socket 220 about axis of symmetry 293 where tool retainer 230 is captured within rotary drive 299, between socket 220 and retainer 240. For example, tool retainer 230 includes body 231 having at least one retaining surface 230S that may engage one or more of socket 220 and retainer 240 where engagement of retaining surface 230S with one or more of socket 220 and retainer 240 prevents translation of tool retainer 230 in first direction D2 through socket 220 and in second direction D1 past retainer 240. Body 231 includes key 232, formed monolithically with body 231 (while in other aspects, key 232 may be coupled to body 231 in any suitable manner) where key 232 engages retainer 240 to limit rotation of tool retainer 230 within a predetermined rotational compliance, as described in greater detail below. First threaded portion 212T of first body 217 of tool 210 engages second threaded portion 233T of tool retainer 230 (which is formed in body 231) so that engagement between first threaded portion 212T and second threaded portion 233T will be reversed when tool 210 is to be decoupled from tool retainer 230 to allow changing one tool 210 for another tool 210.

Second body 214 of tool 210 is located at least partially within first body 217 of tool 210 so that one end of second body 214, that includes fastener-engagement portion 211, extends through second aperture 250 of first body 217. In one aspect, fastener-engagement portion 211 of second body 214 extends through second aperture 250 where suitable clearance is provided between fastener-engagement portion 211 of second body 214 and second aperture 250 of first body 217 to allow second body 214 to translate in direction D1 and direction D2 relative to first body 217. Second aperture 250 has a geometry that is complementary to fastener-engagement portion 211 of second body 214 so as to rotationally anchor second body 214 to first body 217 (and hence to tool retainer 230).

Second body 214 of tool 210 may be at least partially contained within first body 217 of tool 210 so that second body 214 and first body 217 form a unitary member. For example, second body 214 includes shoulder 255. Fastener-engagement portion 211 extends from a first side of shoulder 255 to form first end 214E1 of second body 214, while fastener-engagement indicator 213 extends from a second side of shoulder 255 to form second end 214E2 of second body 214, where the second side of shoulder 255 is opposite the first side of shoulder 255. In one aspect, fastener-engagement portion 211, shoulder 255 and fastener-engagement indicator 213 are monolithically formed as a one piece member while in other aspects, fastener-engagement portion 211, shoulder 255 and fastener-engagement indicator 213 may have any suitable construction. In one aspect, shoulder portion 211 prevents second body 214 from completely passing through second aperture 250 of first body 217 in direction D2. For example, one end of first body 217 includes a wall forming stop surface 217S in which second aperture 250 is formed. Should portion 211 engages stop surface 217S to arrest movement of second body 214 in direction D2. Keeper 216 is disposed within first body 217, such as by a friction or press fit so that shoulder portion 211 is captured within first body 217 between stop surface 217S and keeper 216 so that fastener-engagement portion 211 extends through second aperture 250 and fastener-engagement indicator 213 extends through keeper 216 (noting that there is suitable clearance between keeper 216 and fastener engagement indicator 213 to allow fastener-engagement indicator 213 to freely move through keeper 216). Resilient member 215 is captured between shoulder 255 of second body 214 and keeper 216 so as to bias shoulder 255 of second body 214 against stop surface 217S of first body 217.

Fastener-engagement portion 211 of second body 214 of tool 210 may be configured to engage a geometrically complementary receiving portion 197R within second fastener 197 so that tool 210 prevents rotation of second fastener 197 while first fastener 198 is threaded onto second fastener 197 as described herein. Fastener-engagement portion 211 may have any suitable configuration or geometry such as, for example, hex drive, clutch drive, Torx® drive, spline drive or any other drive configuration corresponding to receiving portion 197R of second fastener 197. Tool-change-engagement portion 212 of first body 217 is disposed between at least a portion of fastener-engagement portion 211 that extends through second aperture 250 and first threaded portion 212T where tool-change engagement portion 212 includes any suitable configuration or geometry such as for example, hex drive, clutch drive, Torx® drive, spline drive or any other drive configuration suitable for causing rotation of tool 210 relative to tool retainer 230 for engaging or disengaging first threaded portion 212T of tool 210 and second threaded portion 233T of tool retainer 230. Tool-change-engagement portion 212 may have the same or different configuration or geometry than fastener-engagement portion 211. For example, in one aspect, tool-change-engagement portion 212 may have a Torx® configuration while fastener-engagement portion 211 has a hex configuration, and in other aspects, for example, both tool-change-engagement portion 212 and fastener-engagement portion 211 have hex configurations.

In one aspect, engagement between tool 210 and tool retainer 230 rotationally anchors tool 210 to tool retainer 230 so that tool 210 is not rotationally movable (in the direction of engagement) about axis of symmetry 293. For example, as tool 210 is threaded into tool retainer 230 (e.g. through engagement between first threaded portion 212T and second threaded portion 233T where tool 210 is rotated in a first direction relative to tool retainer 230) stop surface 210S of tool 210 contacts, e.g., retaining surface 230S of tool retainer 230 to arrest rotation of tool 210 relative to tool retainer 230 so that stop surface 210S of tool 210 is seated against (e.g. in contact with) retaining surface 230S of tool retainer 230. However, rotationally anchoring tool 210 to tool retainer 230 does not prevent a reverse rotation in a second direction (e.g. that is opposite the first direction) of tool 210 relative to tool retainer 230 to disengage first threaded portion 212T from second threaded portion 233T to allow removal of tool 210 from tool retainer 230. Likewise, tool 210 is translationally anchored relative to tool retainer 230 in that the contact between stop surface 210S and retaining surface 230S (in addition to engagement of first threaded portion 212T and second threaded portion 233T) prevents translation of tool 210 relative to tool retainer 230 along symmetry axis 293.

Fastener-engagement portion 211 is limited in size so that fastener-engagement portion 211 fits within a minor diameter of the threads of second fastener 197. However, a size of tool-change-engagement portion 212 is not limited by second fastener 197 and as such may be larger than fastener-engagement portion 111. For example, tool-change-engagement portion 212 may be sized so as to be larger than the minor diameter of second fastener 197 but smaller than a minor diameter of first fastener 198. The larger diameter of tool-change-engagement portion 212 may provide increased torque application to tool 210 to allow threadable fastening of tool 210 and tool retainer 230. Further, the two piece configuration of first body 217 and second body 214 may limit damage and/or wear of fastener-engagement portion 211 to second body 214 while tool-change-engagement portion 212 of first body remains intact and undamaged.

Referring generally to FIG. 13 and particularly to, e.g., FIGS. 14A, 15A, 16, 17 and 18, tool retainer 230 comprises first aperture 233. Second body 214 of tool 210 comprises fastener-engagement indicator 213 that extends into first aperture 233 of tool retainer 230. The preceding subject matter of this paragraph characterizes example 55 of the present disclosure, wherein example 55 also includes the subject matter according to example 54, above.

Fastener-engagement indicator 213 provides an operator of rotary drive 299 a tactile or visual indicator of when fastener-engagement portion 211 of second body 214 is engaged with receiving portion 197R of second fastener 197.

For example, when fastener-engagement portion 211 of second body 214 is engaged with and fully seated within receiving portion 197R, end of fastener-engagement indicator 213 may be substantially flush with or substantially even with surface 232S of key 232 (as illustrated in, e.g., FIGS. 14A and 17). When fastener-engagement portion 211 of second body 214 is misaligned (e.g. either rotationally misaligned or not coaxial aligned) with receiving portion 197R, end of fastener-engagement indicator 213 may protrude above surface 232S of key 232 (as illustrated in, e.g., FIGS. 14A and 17).

Referring generally to FIG. 13 and particularly to, e.g., FIGS. 14A, 15A, 16, 17, and 18, fastener-engagement indictor 213 and fastener-engagement portion 211 are located at opposite ends of second body 214. The preceding subject matter of this paragraph characterizes example 56 of the present disclosure, wherein example 56 also includes the subject matter according to example 55, above.

Locating fastener-engagement indictor 213 and fastener-engagement portion 211 on opposite ends of second body 214 allows for fastener-engagement indictor 213 to extend past surface 232S of key 232 to provide a tactile and/or visual indication of misalignment between fastener-engagement portion 211 and receiving portion 197R or first fastener 198.

Referring generally to FIG. 13 and particularly to, e.g., FIGS. 14A, 15A, 16, 17, and 18, at least a portion of resilient member 215 of first body 217 of tool 210 surrounds at least a portion of fastener-engagement indicator 213 of second body 214. The preceding subject matter of this paragraph characterizes example 57 of the present disclosure, wherein example 57 also includes the subject matter according to any one of examples 55 or 56, above.

Arranging resilient member 215 of first body 217 so that resilient member 215 surrounds at least a portion of fastener-engagement indicator 213 of second body provides for guided non-binding movement of resilient member 215.

For example, fastener-engagement indictor 213 passes through a center of resilient member 215 and forms a guide rod for compression and expansion of resilient member 215 so substantially prevent binding of resilient member 215 during translational movement of second body 214 relative to first body 217 in direction D1 and direction D2.

Referring generally to FIG. 13 and particularly to, e.g., FIGS. 14A, 15A, 16, 17, and 18, first threaded portion 212T of first body 217 of tool 210 comprises first external thread 212E and second threaded portion 233T of tool retainer 230 comprises first internal thread 233I. The preceding subject matter of this paragraph characterizes example 58 of the present disclosure, wherein example 58 also includes the subject matter according to any one of examples 54-57, above.

Referring generally to FIG. 13 and particularly to, e.g., FIG. 15B, first threaded portion 212T of first body 217 of tool 210 comprises second internal thread 212I and second threaded portion 233T of tool retainer 230 comprises second external thread 233E. The preceding subject matter of this paragraph characterizes example 59 of the present disclosure, wherein example 59 also includes the subject matter according to any one of examples 54-57, above.

Providing variability in thread configurations, such as in examples 58 and 59 above, allows for ease of manufacturing first threaded portion 212T and second threaded portion 233T.

Referring generally to FIG. 13 and particularly to, e.g., FIGS. 14A, 15A, 15B, 16, 17 and 18, first threaded portion 212T of first body 217 of tool 210 and second threaded portion 233T of tool retainer 230 comprise left-hand threads. The preceding subject matter of this paragraph characterizes example 60 of the present disclosure, wherein example 60 also includes the subject matter according to any one of examples 54-59, above.

The left-hand thread configuration of tool 210 as described in example 60 above allows for use of the rotary-drive sub-assembly 200 in right-hand fastener (e.g. fasteners with right-hand threads) applications.

Referring generally to FIG. 13 and particularly to, e.g., FIGS. 14A, 15A, 15B, 16, 17 and 18, first threaded portion 212T of first body 217 of tool 210 and second threaded portion 233T of tool retainer 230 comprise right-hand threads. The preceding subject matter of this paragraph characterizes example 61 of the present disclosure, wherein example 61 also includes the subject matter according to any one of examples 54-59, above.

The right-hand thread configuration of tool 210 as described in example 61 above allows for use of rotary-drive sub-assembly 200 in left-hand fastener (e.g. fasteners with left-hand threads) applications.

Referring generally to FIG. 13 and particularly to, e.g., FIGS. 14A, 15A, 16, 17 and 18, resilient member 215 of tool 210 is spring 215A. The preceding subject matter of this paragraph characterizes example 62 of the present disclosure, wherein example 62 also includes the subject matter according to any one of examples 54-61, above.

Spring 215A provides for biased translational movement of second body 214 within first body 217.

Spring 215A may be a coil spring where fastener-engagement indicator 213 passes through an inside diameter of the coil spring for guiding compression and expansion of the coil spring. In other aspects, spring 215A may be any suitable spring for providing biased movement of second body 214 relative to first body 217.

Referring generally to FIG. 13 and particularly to, e.g., FIGS. 14A, 15A, 16, 17 and 18, first body 217 of tool 210 comprises second aperture 250 that is geometrically complementary to fastener-engagement portion 211 of second body 214 of tool 210. Second body 214 extends through and engages second aperture 250 to rotationally fix second body 214 relative to first body 217. The preceding subject matter of this paragraph characterizes example 63 of the present disclosure, wherein example 63 also includes the subject matter according to any one of examples 54-62, above.

The geometrically complementary shapes of second aperture 250 of first body 217 and fastener-engagement portion 211 of second body 214 rotationally fixes fastener-engagement portion 211 relative to, for example, housing 200H of rotary drive 299 so that second fastener 197 is held rotationally fixed by fastener-engagement portion 211 during threadable engagement between first fastener 198 and second fastener 197.

For example, fastener-engagement portion 211 has a hex configuration. Second aperture 250 of first body 217 also has a hex configuration (or any other geometrical configuration corresponding to any suitable geometrical configuration of fastener-engagement portion 211). As described above, suitable clearance is provided between second aperture 250 of first body 217 and fastener-engagement portion 211 so that fastener-engagement portion 211 can move freely through second aperture 250 in direction D1 and direction D2. The mating interface between second aperture 250 and fastener-engagement portion 211 prevents rotation of fastener-engagement portion 211 of second body 214 relative to housing 200H. For example, as described above, first body 217 is rotationally anchored to tool retainer 230 where tool retainer 230 is rotationally fixed (within predefined limits as described herein) relative to housing 200H through the mating interaction between key 232 of tool retainer 230 and retaining opening 242A of retainer 240. As such, rotationally anchored first body 217 holds second body 214 rotationally fixed, relative to housing 200H, through the mating interface between second aperture 250 and fastener-engagement portion 211.

Referring generally to FIG. 13 and particularly to, e.g., FIGS. 14A, 15A, 16, 17, and 18, rotary drive 299 comprises tool 210 and tool retainer 230. Tool 210 comprises first body 217 and second body 214. First body 217 comprises tool-change-engagement portion 212 and first threaded portion 212T, fixed relative to tool-change-engagement portion 212. Second body 214 comprises fastener-engagement portion 211. Second body 214 is translatable relative to first body 217, co-axially with first body 217, and is co-axially rotationally fixed relative to first body 217. Tool 210 further comprises keeper 216, fixed within first body 217, and resilient member 215, captured between second body 214 and keeper 216. Tool retainer 230 comprises second threaded portion 233T, configured to be threadably engaged with first threaded portion 212T of first body 217, and key 232, fixed relative to second threaded portion 233T. Rotary drive 299 further comprises retainer 240, configured to be coupled with key 232 of tool retainer 230, and socket 220, co-axially rotatable relative to tool retainer 230 when retainer 240 is coupled with key 232 of tool retainer 230. The preceding subject matter of this paragraph characterizes example 64 of the present disclosure.

Use of rotary drive 299 including rotary-drive sub-assembly 200 allows for operator (e.g. without the need for a specialized mechanic or repair person) changing of worn or broken tools 210. For example, use of rotary-drive sub-assembly 200 as set forth herein allows for the installation and removal of a worn or broken tool 210 without disassembling rotary drive 299 in which rotary-drive sub-assembly 200 is installed. For example, tool 210 is rotationally anchored relative to tool retainer 230 which allows for separation of tool 210 from tool retainer 230 while tool retainer 230 remains within rotary drive 299 enabling fast swapping of a worn or broken tool 210 with a new tool 210, where fast swapping indicates a rapid or quick succession tool change that facilitates the replacement of one tool 210 with another tool 210. Use of the rotary-drive sub-assembly decreases an amount of time needed to change a worn or broken tool 210 which also decreases an amount of production downtime associated with the change of the worn or broken tool 210. Further, key 132 prevents rotation of rotary-drive sub-assembly 100 relative to rotary drive 199, within predetermined rotational limits as described herein, to allow first fastener 198 to be threadably engaged to second fastener 197.

In a manner similar to that described above, e.g., rotary drive 299 includes housing 200H to which retainer 240 is coupled. Socket 220 is disposed at least partially within housing 200H for engaging first fastener 198 (such as a nut) that is threadably fastened to second fastener 197. Rotary-drive sub-assembly 200 is disposed substantially concentrically with socket 220 about axis of symmetry 293 where tool retainer 230 is captured within rotary drive 299, between socket 220 and retainer 240. For example, tool retainer 230 includes body 231 having at least one retaining surface 230S that may engage one or more of socket 220 and retainer 240 where engagement of retaining surface 230S with one or more of socket 220 and retainer 240 prevents translation of tool retainer 230 in first direction D2 through socket 220 and in second direction D1 past retainer 240. Body 231 includes key 232, formed monolithically with body 231 (while in other aspects, key 232 may be coupled to body 231 in any suitable manner) where key 232 engages retainer 240 to limit rotation of tool retainer 230 within a predetermined rotational compliance, as described in greater detail below. First threaded portion 212T of first body 217 of tool 210 engages second threaded portion 233T of tool retainer 230 (which is formed in body 231) so that engagement between first threaded portion 212T and second threaded portion 233T will be reversed when tool 210 is to be decoupled from tool retainer 230 to allow changing one tool 210 for another tool 210.

Second body 214 of tool 210 is located at least partially within first body 217 of tool 210 so that one end of second body 214, that includes fastener-engagement portion 211, extends through second aperture 250 of first body 217. In one aspect, fastener-engagement portion 211 of second body 214 extends through second aperture 250 where suitable clearance is provided between fastener-engagement portion 211 of second body 214 and second aperture 250 of first body 217 to allow second body 214 to translate in direction D1 and direction D2 relative to first body 217.

Second body 214 of tool 210 may be at least partially contained within first body 217 of tool 210 so that second body 214 and first body 217 form a unitary member. For example, second body 214 includes shoulder 255. Fastener-engagement portion 211 extends from a first side of shoulder 255 while fastener-engagement indicator 213 extends from a second side of shoulder 255, where the second side of shoulder 255 is opposite the first side of shoulder 255. In one aspect, fastener-engagement portion 211, shoulder 255 and fastener-engagement indicator 213 are monolithically formed as a one piece member while in other aspects, fastener-engagement portion 211, shoulder 255 and fastener-engagement indicator 213 may have any suitable construction. In one aspect, shoulder portion 211 prevents second body 214 from completely passing through second aperture 250 of first body 217 in direction D2. For example, one end of first body 217 includes a wall forming stop surface 217S in which second aperture 250 is formed. Shoulder 255 engages stop surface 217S to arrest movement of second body 214 in direction D2. Keeper 216 is disposed within first body 217, such as by a friction or press fit so that shoulder 255 is captured within first body 217 between stop surface 217S and keeper 216 so that fastener-engagement portion 211 extends through second aperture 250 and fastener-engagement indicator 213 extends through keeper 216 (noting that there is suitable clearance between keeper 216 and fastener engagement indicator 213 to allow fastener-engagement indicator 213 to freely move through keeper 216). Resilient member 215 is captured between shoulder 255 of second body 214 and keeper 216 so as to bias shoulder 255 of second body 214 against stop surface 217S of first body 217.

Fastener-engagement portion 211 of second body 214 of tool 210 may be configured to engage a geometrically complementary receiving portion 197R within second fastener 197 so that tool 210 prevents rotation of second fastener 197 while first fastener 198 is threaded onto second fastener 197 as described herein. As noted above, fastener-engagement portion 211 may have any suitable configuration or geometry such as, for example, hex drive, clutch drive, Torx® drive, spline drive or any other drive configuration corresponding to receiving portion 197R of second fastener 197. Tool-change-engagement portion 212 of first body 217 is disposed between at least a portion of fastener-engagement portion 211 that extends through second aperture 250 and first threaded portion 212T where tool-change engagement portion 212 includes any suitable configuration or geometry such as for example, hex drive, clutch drive, Torx® drive, spline drive or any other drive configuration suitable for causing rotation of tool 210 relative to tool retainer 230 for engaging or disengaging first threaded portion 212T of tool 210 and second threaded portion 233T of tool retainer 230. Tool-change-engagement portion 212 may have the same or different configuration or geometry than fastener-engagement portion 211. For example, in one aspect, tool-change-engagement portion 212 may have a Torx® configuration while fastener-engagement portion 211 has a hex configuration, and in other aspects, for example, both tool-change-engagement portion 212 and fastener-engagement portion 211 have hex configurations.

In one aspect, engagement between tool 210 and tool retainer 230 rotationally anchors tool 210 to tool retainer 230 so that tool 210 is not rotationally movable (in the direction of engagement) about axis of symmetry 293. For example, as tool 210 is threaded into tool retainer 230 (e.g. through engagement between first threaded portion 212T and second threaded portion 233T where tool 210 is rotated in a first direction relative to tool retainer 230) stop surface 210S of tool 210 contacts, e.g., retaining surface 230S of tool retainer 230 to arrest rotation of tool 210 relative to tool retainer 230 so that stop surface 210S of tool 210 is seated against (e.g. in contact with) retaining surface 230S of tool retainer 230. However, rotationally anchoring tool 210 to tool retainer 230 does not prevent a reverse rotation in a second direction (e.g. that is opposite the first direction) of tool 210 relative to tool retainer 230 to disengage first threaded portion 212T from second threaded portion 233T to allow removal of tool 210 from tool retainer 230. Likewise, tool 210 is translationally anchored relative to tool retainer 230 in that the contact between stop surface 210S and retaining surface 230S (in addition to engagement of first threaded portion 212T and second threaded portion 233T) prevents translation of tool 210 relative to tool retainer 230 along symmetry axis 293.

Referring generally to FIG. 13 and particularly to, e.g., FIGS. 14A, 15A, 16, 17, and 18, tool retainer 230 comprises first aperture 233 and second body 214 of tool 210 comprises fastener-engagement indicator 213 that extends into first aperture 233 of tool retainer 230. The preceding subject matter of this paragraph characterizes example 65 of the present disclosure, wherein example 65 also includes the subject matter according to example 64, above.

Fastener-engagement indicator 213 provides an operator of rotary drive 299 a tactile or visual indicator of when fastener-engagement portion 211 of second body 214 is engaged with receiving portion 197R of second fastener 197.

For example, when fastener-engagement portion 211 of second body 214 is engaged with and fully seated within receiving portion 197R, end of fastener-engagement indicator 213 may be substantially flush with or substantially even with surface 232S of key 232 (as illustrated in, e.g., FIGS. 14A and 17). When fastener-engagement portion 211 of second body 214 is misaligned (e.g. either rotationally misaligned or not coaxial aligned) with receiving portion 197R, end of fastener-engagement indicator 213 may protrude above surface 232S of key 232 (as illustrated in, e.g., FIGS. 14A and 17).

Referring generally to FIG. 13 and particularly to, e.g., FIGS. 14A, 15A, 16, 17, and 18, fastener-engagement indicator 213 and fastener-engagement portion 211 are located at opposite ends of second body 214. The preceding subject matter of this paragraph characterizes example 66 of the present disclosure, wherein example 66 also includes the subject matter according to example 65, above.

Locating fastener-engagement indictor 213 and fastener-engagement portion 211 on opposite ends of second body 214 allows for fastener-engagement indictor 213 to extend past surface 232S of key 232 to provide a tactile and/or visual indication of misalignment between fastener-engagement portion 211 and receiving portion 197R or first fastener 198.

Referring generally to FIG. 13 and particularly to, e.g., FIGS. 14A, 15A, 16, 17, and 18, at least a portion of resilient member 215 of first body 217 of tool 210 surrounds at least a portion of fastener-engagement indicator 213 of second body 214. The preceding subject matter of this paragraph characterizes example 67 of the present disclosure, wherein example 67 also includes the subject matter according to any one of examples 65 or 66, above.

Arranging resilient member 215 of first body 217 so that resilient member 215 surrounds at least a portion of fastener-engagement indicator 213 of second body provides for guided non-binding movement of resilient member 215.

As described above, e.g., fastener-engagement indictor 213 passes through a center of resilient member 215 and forms a guide rod for compression and expansion of resilient member 215 so substantially prevent binding of resilient member 215 during translational movement of second body 214 relative to first body 217 in direction D1 and direction D2.

Referring generally to FIG. 13 and particularly to, e.g., FIG. 15A, resilient member 215 of tool 210 is spring 215A. The preceding subject matter of this paragraph characterizes example 68 of the present disclosure, wherein example 68 also includes the subject matter according to any one of examples 64-67, above.

Spring 215A provides for biased translational movement of second body 214 within first body 217.

As described above, spring 215A may be a coil spring where fastener-engagement indicator 213 passes through an inside diameter of the coil spring for guiding compression and expansion of the coil spring. In other aspects, spring 215A may be any suitable spring for providing biased movement of second body 214 relative to first body 217.

Referring generally to FIG. 13 and particularly to, e.g., FIGS. 15A and 16, first body 217 of tool 210 comprises second aperture 250 that is geometrically complementary to fastener-engagement portion 211 of second body 214 of tool 210. Second body 214 extends through and engages second aperture 250 to rotationally fix second body 214 relative to first body 217. The preceding subject matter of this paragraph characterizes example 69 of the present disclosure, wherein example 69 also includes the subject matter according to any one of examples 64-68, above.

The geometrically complementary shapes of second aperture 250 of first body 217 and fastener-engagement portion 211 of second body 214 rotationally fixes fastener-engagement portion 211 relative to, for example, housing 200H of rotary drive 299 so that second fastener 197 is held rotationally fixed by fastener-engagement portion 211 during threadable engagement between first fastener 198 and second fastener 197.

For example, fastener-engagement portion 211 has a hex configuration. Second aperture 250 of first body 217 also has a hex configuration (or any other geometrical configuration corresponding to any suitable geometrical configuration of fastener-engagement portion 211). As described above, suitable clearance is provided between second aperture 250 of first body 217 and fastener-engagement portion 211 so that fastener-engagement portion 211 can move freely through second aperture 250 in direction D1 and direction D2. The mating interface between second aperture 250 and fastener-engagement portion 211 prevents rotation of fastener-engagement portion 211 of second body 214 relative to housing 200H. For example, as described above, first body 217 is rotationally anchored to tool retainer 230 where tool retainer 230 is rotationally fixed (within predefined limits as described herein) relative to housing 200H through the mating interaction between key 232 of tool retainer 230 and retaining opening 242A of retainer 240. As such, rotationally anchored first body 217 holds second body 214 rotationally fixed, relative to housing 200H, through the mating interface between second aperture 250 and fastener-engagement portion 211.

Referring generally to FIG. 13 and particularly to, e.g., FIGS. 15A and 16, first body 217 of tool 210 further comprises first cavity 251 in communication with second aperture 250. The preceding subject matter of this paragraph characterizes example 70 of the present disclosure, wherein example 70 also includes the subject matter according to example 69, above.

First cavity 251 provides guided movement of shoulder 255 of second body 214 in direction D1 and D2. First cavity 251 also houses resilient member 215 and keeper so that first body 217, second body 214, resilient member 215 and keeper 216 form a unitized assembly that is installed and removed from rotary drive 299 as a one piece, self-contained, unitary member as described above.

For example, second body 214 is at least partially located within first cavity 251 of first body 217 so that fastener-engagement portion 211 of second body 214 extends through second aperture 250. As described above, mating geometries of fastener-engagement portion 211 and second aperture 250 prevent relative rotation between first body 217 and second body 214. Second aperture 250 may also define a bearing interface for at least partially guiding movement of second body 214 relative to first body 217 in direction D1 and direction D2. First cavity 251 may also define a bearing surface for shoulder 255 that is configured to guide movement of shoulder 255 in direction D1 and D2 and stop surface 217S that is configured to arrest movement so that first cavity 251 and second aperture 250 form a bearing system that is configured to provide co-axial movement of second body 214 relative to first body 217 in direction D1 and direction D2.

Referring generally to FIG. 13 and particularly to, e.g., FIGS. 15A and 16, first cavity 251 of first body 217 and second aperture 250 have perpendicular cross-sections that are different from each other. The preceding subject matter of this paragraph characterizes example 71 of the present disclosure, wherein example 71 also includes the subject matter according to example 70, above.

The different perpendicular cross-sections of first cavity 251 of first body 217 and second aperture 250 provide at least one retaining or stop surface 217S for stopping movement of second body 214 in direction D2 relative to first body 217.

Referring generally to FIG. 13 and particularly to, e.g., FIGS. 15A, 16, 17, and 18, second body 214 of tool 210 is translatable within first cavity 251 of first body 217 of tool 210, co-axially with first body 217. The preceding subject matter of this paragraph characterizes example 72 of the present disclosure, wherein example 72 also includes the subject matter according to any one of examples 70 or 71, above.

Translation of second body 214 of tool 210 within first cavity 251 of first body 217 of tool 210 provides for relative movement between first body 217 and second body 214 as first fastener 198 threadably engages second fastener 197.

For example, as first fastener 198 threadably engages second fastener 197, socket 220 and first fastener 198 move in direction D1 while second fastener 197 does not move in direction D1 or direction D1. As described above, first body 217 is held captive between tool retainer 230 and socket and also moves in direction D2 as first fastener 198 is threadably engaged with second fastener 197. Translation of second body 214 of tool 210 within first cavity 251 of first body 217 of tool 210 allows first body 217 and socket 220 to move in direction D2 while fastener-engagement portion 211 of second body 214 remains engaged with receiving portion 197R of second fastener 197.

Referring generally to FIG. 13 and particularly to, e.g., FIGS. 15A, 16, 17, and 18, second body 214 of tool 210 comprises shoulder 255, located between fastener-engagement portion 211 and fastener-engagement indicator 213. Keeper 216 is fixed at one end of first cavity 251, opposite from second aperture 250. A perpendicular cross-section of first cavity 251 of first body 217 is larger than a perpendicular cross-section of second aperture 250 of first body 217. Shoulder 255 of second body 214 is movably captured between keeper 216 and second aperture 250 of first body 217. The preceding subject matter of this paragraph characterizes example 73 of the present disclosure, wherein example 73 also includes the subject matter according to any one of examples 70-72, above.

First cavity 251 also houses resilient member 215 and keeper 216 so that first body 217, second body 214, resilient member 215 and keeper 216 form a unitized assembly that is installed and removed from rotary drive 299 as a one piece, self-contained, unitary member as described above For example, as described above, the different perpendicular cross-sections of first cavity 251 of first body 217 and second aperture of first body 217 form a wall at one end of first body 217 where second aperture 250 is formed within the wall. This wall forms stop surface 217S. Shoulder 255 engages stop surface 217S to arrest movement of second body 214 in direction D2. Keeper 216 is disposed within first body 217, such as by a friction or press fit so that shoulder 255 is captured within first body 217 between stop surface 217S and keeper 216 so that fastener-engagement portion 211 extends through second aperture 250 and fastener-engagement indicator 213 extends through keeper 216. Resilient member 215 is captured between shoulder 255 of second body 214 and keeper 216 so as to bias shoulder 255 of second body 214 against stop surface 217S of first body 217.

Referring generally to FIG. 13 and particularly to, e.g., FIGS. 15A, 16, 17, and 18, resilient member 215 is movably captured between shoulder 255 of second body 214 and keeper 216. The preceding subject matter of this paragraph characterizes example 74 of the present disclosure, wherein example 74 also includes the subject matter according to example 73, above.

Capturing resilient member 215 between shoulder 255 of second body 214 and keeper 216 biases second body 214 n direction D2 so that fastener-engagement portion 211 of second body 214 protrudes through second aperture 250.

Referring generally to FIG. 13 and particularly to, e.g., FIGS. 14A, 14D, 17, and 18, rotary drive 299 comprises housing 200H. Retainer 240 is coupled to housing 200H. Tool retainer 230 is captured between socket 220 and retainer 240. The preceding subject matter of this paragraph characterizes example 75 of the present disclosure, wherein example 75 also includes the subject matter according to example 74, above.

Retainer 240 rotationally constrains tool retainer 230 to that tool 210 can be installed to and uninstalled from tool retainer 230 as described herein. Retainer 240 also prevents tool retainer 230 from being removed from rotary drive 299.

Referring generally to FIG. 13 and particularly to, e.g., FIGS. 15A, 16, 17, and 18, retainer 240 comprises second cavity 241. Tool retainer 230 is disposed at least partially within second cavity 241. Retainer 240 comprises retaining opening 242A in communication with second cavity 241. The preceding subject matter of this paragraph characterizes example 76 of the present disclosure, wherein example 76 also includes the subject matter according to any one of examples 64-75, above.

Second cavity 241 of retainer 240 may co-axially align tool retainer 230 with socket 220. Retaining opening 242A interfaces with key 232 of tool retainer to constrain rotation of tool retainer 230 relative to, for example, housing 200H.

Referring generally to FIG. 13 and particularly to, e.g., FIGS. 14C, 15A, 16, 17, and 18, retaining opening 242A of retainer 240 is configured to engage key 232 of tool retainer 230 with an intrinsic rotational backlash. The preceding subject matter of this paragraph characterizes example 77 of the present disclosure, wherein example 77 also includes the subject matter according to example 76, above.

Referring generally to FIG. 13 and particularly to, e.g., FIGS. 14C, 15A, 16, 17, and 18, the intrinsic rotational backlash between retaining opening 242A of retainer 240 and key 232 of tool retainer 230 is less than about 10 degrees. The preceding subject matter of this paragraph characterizes example 78 of the present disclosure, wherein example 78 also includes the subject matter according to example 77, above.

The intrinsic rotational backlash between key 232 and retaining opening 242A maintains a substantially fixed (non-rotating) relationship between tool 210 (rotationally anchored to tool retainer 230) of rotary-drive sub-assembly 200 and housing 200H.

For example, while less than 10 degrees of rotation may be provided between key 232 and retaining opening 242A, this intrinsic rotational backlash may be defined as a result of manufacturing tolerances that provide a slip or clearance fit between key 232 and retaining opening 242A, where the amount of rotation provided by the intrinsic rotational backlash is a total rotation in both clockwise and counter-clockwise directions.

Referring generally to FIG. 13 and particularly to, e.g., FIGS. 14C, 15A, 16, 17, and 18, retaining opening 242A of retainer 240 comprises pair of opposed parallel walls 151OP-3. The preceding subject matter of this paragraph characterizes example 79 of the present disclosure, wherein example 79 also includes the subject matter according to any one of examples 77 or 78, above.

Opposed parallel walls 151OP-3 engage key 232 to substantially prevent rotation of key 232.

For example, retaining opening 242A may have a circumferentially enclosed opening or slot configuration (as shown in, e.g., FIGS. 14A and 14C) so that walls of retaining opening 242A circumscribe key 232 when key 232 is disposed within retaining opening 242A. At least opposed parallel walls 151OP-3 of retaining opening 242A engage and rotationally constrain key 232. End walls 151OE-3 of retaining opening 242A may also rotationally constrain key 232.

Referring generally to FIG. 13 and particularly to, e.g., FIG. 14B, retaining opening 242A of retainer 240 is configured to engage key 232 of tool retainer 230 with an engineered rotational compliance. The preceding subject matter of this paragraph characterizes example 80 of the present disclosure, wherein example 80 also includes the subject matter according to any one of examples 64-76, above.

The engineered rotational compliance provides for a predetermined range of key 232 rotation relative to, e.g., housing 200H that is greater than rotation resulting from manufacturing tolerances or slip/clearance fits.

Referring generally to FIG. 13 and particularly to, e.g., FIG. 14B, the engineered rotational compliance between retaining opening 242A of retainer 240 and key 232 of tool retainer 230 is between about 30 degrees and about 270 degrees. The preceding subject matter of this paragraph characterizes example 81 of the present disclosure, wherein example 81 also includes the subject matter according to example 80, above.

The engineered rotational compliance between retaining opening 242A and key 232 provides for rotation of tool 210 relative to receiving portion 197R of second fastener 197 so that fastener-engagement portion 211 of tool 210 can be geometrically rotationally aligned with receiving portion 197R, substantially without rotation of housing 200H.

For example, an initial rotational orientation of fastener-engagement portion 211 relative to receiving portion 197R of second fastener 197 may be such that the geometry of fastener-engagement portion 211 is not aligned with the geometry of receiving portion 197R. The engineered rotational compliance allows for predetermined limited rotation (e.g. rotational compliance which is a total amount of rotation in both clockwise and counterclockwise directions) of fastener-engagement portion 211 of tool 210 relative to receiving portion 197R to align their respective geometries to allow engagement between fastener-engagement portion 211 and receiving portion 197R. To provide the predetermined limited rotation of fastener-engagement portion 211 of tool 210, retaining opening 242A may be in the form of a circumferentially enclosed butterfly slot.

Referring generally to FIG. 13 and particularly to, e.g., FIG. 14B, retaining opening 242A of retainer 240 comprises first pair of parallel walls 151SP1-3 and second pair of parallel walls 151SP2-3. Walls of first pair of parallel walls 151SP1-3 are staggered relative to each other along first axis SPX1-3, parallel to first pair of parallel walls 151SP1-3. Walls of second pair of parallel walls 151SP2-3 are staggered relative to each other along second axis SPX2-3, parallel to second pair of parallel walls 151SP2-3. The preceding subject matter of this paragraph characterizes example 82 of the present disclosure, wherein example 82 also includes the subject matter according to any one of examples 80 or 81, above.

First pair of parallel walls 151SP1-3 and second pair of parallel walls 151SP2-3 and the structural arrangement therebetween (as described above) provides for the predetermined limited rotation of fastener-engagement portion 211 of tool 210.

For example, the staggered configuration of first pair of parallel walls 151SP1-3 and second pair of parallel walls 151SP2-3 forms the circumferentially enclosed butterfly shape of retaining opening 242A, where central portion 151CP-3 of retaining opening 242A is narrower than ends 151EP-3 of retaining opening 242A. First pair of parallel walls 151SP1-3 are staggered in that each wall in first pair of parallel walls 151SP1-3 are separated by distance G1-3. Similarly Second pair of parallel walls 151SP2-3 are staggered in that each wall in second pair of parallel walls 151SP2-3 are separated by distance G2-3. Distances G1-3, G2-3 may provide clearance for key 232 within central portion 151CP-3 of retaining opening 242A. In one aspect, retaining opening 242A provides tool 210 with about 30 degrees and about 270 degrees of rotation but in other aspects retaining opening 242A may provide tool 210 with more than about 270 degrees and less than about 30 degrees of rotation.

Referring generally to FIG. 13 and particularly to, e.g., FIG. 16, rotary drive 299 further comprises friction member 165-3, interposed between socket 220 and first body 217 of tool 210. Friction member 165-3 is configured to transfer rotation of socket 220, engaging first fastener 198, to tool 210 when fastener-engagement portion 211 of second body 214 of tool 210 is disengaged from second fastener 197 that is threadably couplable with first fastener 198. Friction member 165-3 is also configured to discontinue transferring the rotation of socket 220 to tool 210 when fastener-engagement portion 211 of tool 210 becomes engaged with second fastener 197. The preceding subject matter of this paragraph characterizes example 83 of the present disclosure, wherein example 83 also includes the subject matter according to any one of examples 64-76 or 80-82, above.

The rotation of tool 210 through the use of friction member 165-3 provides for the rotational alignment of fastener-engagement portion 211 of tool 210 with receiving portion 197R of second fastener 197 substantially without rotation of housing 200H relative to second fastener 197.

For example, socket 220 may include groove 167-3, which may be an annular groove. Friction member 165-3, such as an O-ring or other suitable friction member, is disposed at least partially within groove 167-3 such that at least a portion of friction member 167-3 protrudes towards a centerline (which may be coincident with symmetry axis 293) of socket 220 to frictionally engage tool 210. In a manner similar to that described above, initial rotational orientation of fastener-engagement portion 211 relative to receiving portion 197R of second fastener may 197 may be such that the geometry of fastener-engagement portion 211 is not aligned with the geometry of receiving portion 197R. Socket 220 may be driven (e.g. rotated clockwise or counterclockwise) such that friction member 165-3 transfers the rotational movement of socket 220 to tool 210 so that tool 210 rotates within and is rotationally constrained by retaining opening 242A. The rotational movement of tool 210 (induced by friction member 165-3) causes rotational alignment of fastener-engagement portion 211 of tool 210 with receiving portion 197R of second fastener 197. For example, as fastener-engagement portion 211 of tool 210 rotates, fastener-engagement portion 211 of tool 210 may fall, or otherwise move in direction D2, into receiving portion 197R of second fastener 197 when the geometries of receiving portion 197R and fastener-engagement portion 211 are aligned.

Rotation of fastener-engagement portion 211 induced by friction member 165-3 may also provide for seating fastener-engagement portion 211 within receiving portion 197R of second fastener 197. For example, when fastener-engagement portion 211 is at least partially mated with receiving portion 197R of second fastener 197, tool 210 may be alternately rotated in clockwise and counterclockwise directions until movement of fastener-engagement portion 211 in direction D2 within receiving portion 197R ceases so that fastener-engagement portion 211 is completely or fully seated within receiving portion 197R of second fastener 197.

Referring generally to FIG. 13 and particularly to, e.g., FIGS. 14D and 16, rotary drive 299 further comprises drive transmission 170-3. Socket 220 comprises drive member 171-3, coupled to drive transmission 170-3. The preceding subject matter of this paragraph characterizes example 84 of the present disclosure, wherein example 84 also includes the subject matter according to any one of examples 64-83, above.

Drive transmission 170-3 causes rotation of at least socket 120-3 relative to housing 200H.

Drive transmission 170-3 may be any suitable drive including one or more of gears, sprockets, chains, belts, pulleys or any other suitable drive mechanism that drivingly engage or mate drive member 171-3 of socket 220 for causing rotation of at least socket 220 relative to housing 200H. Drive transmission 170-3 may couple socket 220 to a drive motor so that motive force from the drive motor is transferred through drive transmission 170-3 to socket 220.

Referring generally to FIG. 13 and particularly to, e.g., FIGS. 15A and 15B, tool 210 comprises first body 217, second body 214, keeper 216, and resilient member 215. First body 217 comprises tool-change-engagement portion 212 and first threaded portion 212T, fixed relative to tool-change-engagement portion 212. Second body 214 comprises fastener-engagement portion 211. Second body 214 is translatable relative to first body 217, co-axially with first body 217, and is co-axially rotationally fixed relative to first body 217. Keeper 216 is fixed within first body 217 and resilient member 215 is captured between second body 214 and keeper 216. The preceding subject matter of this paragraph characterizes example 85 of the present disclosure.

Tool 210 has distinct portions, e.g. fastener-engagement portion 211 and tool-change-engagement portion 212, that allow for removal of tool 210 from rotary drive 299 even when fastener-engagement portion 211 is damaged or otherwise unusable. Further, providing translation of the second body relative to the first body allows for relative movement between socket 220 of rotary drive 299 and fastener-engagement portion 211 which simplifies the configuration of rotary drive 299 in that external springs and pivots are not needed to allow biased movement of fastener-engagement portion 211 relative to socket 220 and housing 200H of rotary drive 299. In addition, capturing second body 214 and resilient member 215 within first body 217 provides a unitary tool member that can be installed or uninstalled from rotary drive 299 as a unitary one piece member.

As described above, second body 214 of tool 210 is located at least partially within first body 217 of tool 210 so that one end of second body 214, that includes fastener-engagement portion 211, extends through second aperture 250 of first body 217. In one aspect, fastener-engagement portion 211 of second body 214 extends through second aperture 250 where suitable clearance is provided between fastener-engagement portion 211 of second body 214 and second aperture 250 of first body 217 to allow second body 214 to translate in direction D1 and direction D2 relative to first body 217. Second aperture 250 has a geometry that is complementary to fastener-engagement portion 211 of second body 214 so as to rotationally anchor second body 214 to first body 217 (and hence to tool retainer 230).

Second body 214 of tool 210 may be at least partially contained within first body 217 of tool 210 so that second body 214 and first body 217 form a unitary member. For example, second body 214 includes shoulder 255. Fastener-engagement portion 211 extends from a first side of shoulder 255 while fastener-engagement indicator 213 extends from a second side of shoulder 255, where the second side of shoulder 255 is opposite the first side of shoulder 255. In one aspect, fastener-engagement portion 211, shoulder 255 and fastener-engagement indicator 213 are monolithically formed as a one piece member while in other aspects, fastener-engagement portion 211, shoulder 255 and fastener-engagement indicator 213 may have any suitable construction. In one aspect, shoulder portion 211 prevents second body 214 from completely passing through second aperture 250 of first body 217 in direction D2. For example, one end of first body 217 includes a wall forming stop surface 217S in which second aperture 250 is formed. Should portion 211 engages stop surface 217S to arrest movement of second body 214 in direction D2. Keeper 216 is disposed within first body 217, such as by a friction or press fit so that shoulder portion 211 is captured within first body 217 between stop surface 217S and keeper 216 so that fastener-engagement portion 211 extends through second aperture 250 and fastener-engagement indicator 213 extends through keeper 216 (noting that there is suitable clearance between keeper 216 and fastener engagement indicator 213 to allow fastener-engagement indicator 213 to freely move through keeper 216). Resilient member 215 is captured between shoulder 255 of second body 214 and keeper 216 so as to bias shoulder 255 of second body 214 against stop surface 217S of first body 217.

Fastener-engagement portion 211 of second body 214 of tool 210 may be configured to engage a geometrically complementary receiving portion 197R within second fastener 197 so that tool 210 prevents rotation of second fastener 197 while first fastener 198 is threaded onto second fastener 197 as described herein. Fastener-engagement portion 211 may have any suitable configuration or geometry such as, for example, hex drive, clutch drive, Torx® drive, spline drive or any other drive configuration corresponding to receiving portion 197R of second fastener 197. Tool-change-engagement portion 212 of first body 217 is disposed between at least a portion of fastener-engagement portion 211 that extends through second aperture 250 and first threaded portion 212T where tool-change engagement portion 212 includes any suitable configuration or geometry such as for example, hex drive, clutch drive, Torx® drive, spline drive or any other drive configuration suitable for causing rotation of tool 210 relative to tool retainer 230 for engaging or disengaging first threaded portion 212T of tool 210 and second threaded portion 233T of tool retainer 230. Tool-change-engagement portion 212 may have the same or different configuration or geometry than fastener-engagement portion 211. For example, in one aspect, tool-change-engagement portion 212 may have a Torx® configuration while fastener-engagement portion 211 has a hex configuration, and in other aspects, for example, both tool-change-engagement portion 212 and fastener-engagement portion 211 have hex configurations.

Also, as described above, fastener-engagement portion 211 is limited in size so that fastener-engagement portion 211 fits within a minor diameter of the threads of second fastener 197. However, a size of tool-change-engagement portion 212 is not limited by second fastener 197 and as such may be larger than fastener-engagement portion 111. For example, tool-change-engagement portion 212 may be sized so as to be larger than the minor diameter of second fastener 197 but smaller than a minor diameter of first fastener 198. The larger diameter of tool-change-engagement portion 212 may provide increased torque application to tool 210 to allow threadable fastening of tool 210 and tool retainer 230. Further, the two piece configuration of first body 217 and second body 214 may limit damage and/or wear of fastener-engagement portion 211 to second body 214 while tool-change-engagement portion 212 of first body remains intact and undamaged.

Referring generally to FIG. 13 and particularly to, e.g., FIGS. 15A, 16, 17, and 18, first body 217 of tool 210 comprises second aperture 250 that is geometrically complementary to fastener-engagement portion 211 of second body 214 of tool 210. Second body 214 extends through and engages second aperture 250 to rotationally fix second body 214 of tool 210 relative to first body 217 of tool 210. The preceding subject matter of this paragraph characterizes example 86 of the present disclosure, wherein example 86 also includes the subject matter according to example 85, above.

The geometrically complementary shapes of second aperture 250 of first body 217 and fastener-engagement portion 211 of second body 214 rotationally fixes fastener-engagement portion 211 relative to, for example, housing 200H of rotary drive 299 so that second fastener 197 is held rotationally fixed by fastener-engagement portion 211 during threadable engagement between first fastener 198 and second fastener 197.

For example, as described above, fastener-engagement portion 211 has a hex configuration. Second aperture 250 of first body 217 also has a hex configuration (or any other geometrical configuration corresponding to any suitable geometrical configuration of fastener-engagement portion 211). As described above, suitable clearance is provided between second aperture 250 of first body 217 and fastener-engagement portion 211 so that fastener-engagement portion 211 can move freely through second aperture 250 in direction D1 and direction D2. The mating interface between second aperture 250 and fastener-engagement portion 211 prevents rotation of fastener-engagement portion 211 of second body 214 relative to housing 200H. For example, as described above, first body 217 is rotationally anchored to tool retainer 230 where tool retainer 230 is rotationally fixed (within predefined limits as described herein) relative to housing 200H through the mating interaction between key 232 of tool retainer 230 and retaining opening 242A of retainer 240. As such, rotationally anchored first body 217 holds second body 214 rotationally fixed, relative to housing 200H, through the mating interface between second aperture 250 and fastener-engagement portion 211.

Referring generally to FIG. 13 and particularly to, e.g., FIGS. 15A, 16, 17, and 18, first body 217 of tool 210 further comprises first cavity 251 in communication with second aperture 250. The preceding subject matter of this paragraph characterizes example 87 of the present disclosure, wherein example 87 also includes the subject matter according to example 86, above.

First cavity 251 provides guided movement of shoulder 255 of second body 214 in direction D1 and D2. First cavity 251 also houses resilient member 215 and keeper so that first body 217, second body 214, resilient member 215 and keeper 216 form a unitized assembly that is installed and removed from rotary drive 299 as a one piece, self-contained, unitary member as described above.

For example, second body 214 is at least partially located within first cavity 251 of first body 217 so that fastener-engagement portion 211 of second body 214 extends through second aperture 250. As described above, mating geometries of fastener-engagement portion 211 and second aperture 250 prevent relative rotation between first body 217 and second body 214. Second aperture 250 may also define a bearing interface for at least partially guiding movement of second body 214 relative to first body 217 in direction D1 and direction D2. As described above, first cavity 251 may also define a bearing surface for shoulder 255 that is configured to guide movement of shoulder 255 in direction D1 and D2 so that first cavity 251 and second aperture 250 form a bearing system that is configured to provide co-axial movement of second body 214 relative to first body 217 in direction D1 and direction D2.

Referring generally to FIG. 13 and particularly to, e.g., FIGS. 15A, 16, 17, and 18, first cavity 251 of first body 217 and second aperture 250 have perpendicular cross-sections that are different from each other. The preceding subject matter of this paragraph characterizes example 88 of the present disclosure, wherein example 88 also includes the subject matter according to example 87, above.

The different perpendicular cross-sections of first cavity 251 of first body 217 and second aperture 250 provide at least one retaining or stop surface 217S for stopping movement of second body 214 in direction D2 relative to first body 217.

Referring generally to FIG. 13 and particularly to, e.g., FIGS. 15A, 16, 17, and 18, second body 214 of tool 210 is translatable within first cavity 251 of first body 217 of tool 210, co-axially with first body 217 of tool 210. The preceding subject matter of this paragraph characterizes example 89 of the present disclosure, wherein example 89 also includes the subject matter according to any one of examples 87 or 88, above.

Translation of second body 214 of tool 210 within first cavity 251 of first body 217 of tool 210 provides for relative movement between first body 217 and second body 214 as first fastener 198 threadably engages second fastener 197.

For example, as first fastener 198 threadably engages second fastener 197, socket 220 and first fastener 198 move in direction D1 while second fastener 197 does not move in direction D1 or direction D1. As described above, first body 217 is held captive between tool retainer 230 and socket and also moves in direction D2 as first fastener 198 is threadably engaged with second fastener 197. Translation of second body 214 of tool 210 within first cavity 251 of first body 217 of tool 210 allows first body 217 and socket 220 to move in direction D2 while fastener-engagement portion 211 of second body 214 remains engaged with receiving portion 197R of second fastener 197.

Referring generally to FIG. 13 and particularly to, e.g., FIGS. 15A, 16, 17, and 18, second body 214 of tool 210 comprises shoulder 255, located between fastener-engagement portion 211 and fastener-engagement indicator 213. Keeper 216 is fixed at one end of first cavity 251, opposite from second aperture 250. A perpendicular cross-section of first cavity 251 of first body 217 is larger than a perpendicular cross-section of second aperture 250 of first body 217. Shoulder 255 of second body 214 is movably captured between keeper 216 and second aperture 250 of first body 217. The preceding subject matter of this paragraph characterizes example 90 of the present disclosure, wherein example 90 also includes the subject matter according to any one of examples 87-89, above.

First cavity 251 also houses resilient member 215 and keeper 216 so that first body 217, second body 214, resilient member 215 and keeper 216 form a unitized assembly that is installed and removed from rotary drive 299 as a one piece, self-contained, unitary member as described above For example, as described above, the different perpendicular cross-sections of first cavity 251 of first body 217 and second aperture of first body 217 form a wall at one end of first body 217 where second aperture 250 is formed within the wall. This wall forms stop surface 217S. Shoulder 255 engages stop surface 217S to arrest movement of second body 214 in direction D2. Keeper 216 is disposed within first body 217, such as by a friction or press fit so that shoulder 255 is captured within first body 217 between stop surface 217S and keeper 216 so that fastener-engagement portion 211 extends through second aperture 250 and fastener-engagement indicator 213 extends through keeper 216. Resilient member 215 is captured between shoulder 255 of second body 214 and keeper 216 so as to bias shoulder 255 of second body 214 against stop surface 217S of first body 217.

Referring generally to FIG. 13 and particularly to, e.g., FIGS. 15A, 16, 17 and 18, resilient member 215 is movably captured between shoulder 255 of second body 214 and keeper 216. The preceding subject matter of this paragraph characterizes example 91 of the present disclosure, wherein example 91 also includes the subject matter according to example 90, above.

Capturing resilient member 215 between shoulder 255 of second body 214 and keeper 216 biases second body 214 n direction D2 so that fastener-engagement portion 211 of second body 214 protrudes through second aperture 250.

Referring generally to FIG. 13 and particularly to, e.g., FIGS. 15A, 16, 17, 18, 19A and 19B, method 950 of threadably coupling first fastener 198 with second fastener 197 using rotary drive 299 comprising tool 210 is provided. Method 950 comprises (block 951), rotationally anchoring second fastener 197 relative to tool 210 by co-axially urging fastener-engagement portion 211 of tool 210 against second fastener 197 and rotating tool 210 relative to second fastener 197 until fastener-engagement portion 211 of tool 210 mates with receiving portion 197R of second fastener 197. Method 950 further comprises (block 952), receiving first fastener 198 within socket 220 of rotary drive 299 co-axially with fastener-engagement portion 211 of tool 210. Method 950 also comprises (block 953), rotating first fastener 198 with socket 220 of rotary drive 299 relative to housing 200H of rotary drive 299 to cause first fastener 198 to threadably engage second fastener 197. When first fastener 198 is rotated with socket 220 of rotary drive 299 relative to housing 200H in a first direction to cause first fastener 198 to threadably engage second fastener 197 while fastener-engagement portion 211 of tool 210 is mated with receiving portion 197R of second fastener 197 to rotationally anchor second fastener 197 relative to tool 210 of rotary drive 299, fastener-engagement portion 211 of tool 210 is co-axially translated relative to tool-change-engagement portion 212 of tool 210 and relative to socket 220 of rotary drive 299. The preceding subject matter of this paragraph characterizes example 92 of the present disclosure.

Allowing relative movement between fastener-engagement portion 211 both of tool-change-engagement portion 212 of tool 210 and socket 220 of rotary drive 299 allows for threadable engagement between first fastener 198 and second fastener 197 while simplifying the configuration of rotary drive 299.

For example, tool-change-engagement portion 212 is anchored to tool retainer 230 so as to move as a unit with housing 200H of rotary drive 299 (e.g. there is no relative movement of tool-change-engagement portion 212 relative to socket 220 or housing in direction D1 and direction D2. As first fastener 198 and second fastener 197 are threadably engaged, socket 220 (and housing 200H) moves in direction D2 with first fastener 198 so that socket 220 maintains driving contact with first fastener 198. As there is no relative movement between tool-change-engagement portion 212 and socket in direction D1 and direction D2, tool-change-engagement portion 212 also moves in direction D2 as first fastener 198 is threadably engaged to second fastener 197. Movement of fastener-engagement portion 211 in direction D1 allows movement of housing 200H in direction D2 while fastener-engagement portion 211 remains engaged with receiving portion 197R of second fastener 197. Further, because resilient member 215 (which biases fastener engagement portion 211 towards receiving portion 197R of second fastener 197) is self-contained within tool 210, rotary drive 299 does not include external springs and pivoting members, such as described above with respect to rotary drive 199 and rotary drive 199-2.

Referring generally to FIG. 13 and particularly to, e.g., FIGS. 15A, 16, 17, 18, 19A and 19B, according to method 950, (block 954) when first fastener 198 is rotated with socket 220 of rotary drive 299 relative to housing 200H in the first direction, fastener-engagement portion 211 of tool 210 becomes rotationally fixed relative to housing 200H. The preceding subject matter of this paragraph characterizes example 93 of the present disclosure, wherein example 93 also includes the subject matter according to example 92, above.

Rotationally fixing fastener-engagement portion 211 of tool relative to housing 200H allows further rotation of socket while rotationally fixing second fastener 197 as first fastener 198 is threadably engaged with second fastener 197 through rotation of socket 220.

For example, as described above, rotary drive 299 includes retainer 240 having retaining opening 242A. Retaining opening 242A may, in one aspect, provide rotary-drive sub-assembly 200 with an engineered rotational compliance. Also, as described above, socket 220 may be provided with friction member 165 that transfers rotation of socket 220 to rotary-drive sub-assembly 200. Rotation of socket 220 causes rotation of rotary-drive sub-assembly 200, and fastener-engagement portion 211 of tool 210, so that key 232 of tool retainer 230 of rotary-drive sub-assembly engages at least one wall of retaining opening 242A to rotationally fix fastener-engagement portion 211 of tool 210 relative to housing 200H.

Referring generally to FIG. 13 and particularly to, e.g., FIGS. 15A, 16, 17, 18, 19A and 19B, method 950 further comprises (block 955) frictionally retaining first fastener 198 within socket 220. The preceding subject matter of this paragraph characterizes example 94 of the present disclosure, wherein example 94 also includes the subject matter according to any one of examples 92 or 93, above.

Frictionally retaining first fastener 198 within socket 220 may provide for single hand use of rotary drive 299. Frictionally retaining first fastener 198 within socket 220 also enables use of rotary drive 299 in confined work areas such that an operator does not have to hold first fastener 198 within socket 220 prior to engagement of first fastener 198 with second fastener 197.

For example, socket 220 includes groove 168-3, which may be an annular groove, adjacent an end of socket 220. Retaining member 166-3, such as an O-ring or other suitable friction member, is disposed at least partially within groove 168-3 such that at least a portion of retaining member 166-3 protrudes towards a centerline (which may be coincident with symmetry axis 293) of socket 220 to engage first fastener 198 when first fastener 198 is located at least partially within socket 220. For example, an inner diameter of retaining member 166-3 may be smaller than an outer diameter of first fastener 198 to provide a friction fit between retaining member 166-3 and first fastener 198 so that first fastener 198 is retained within socket 220 by retaining member 166-3.

Referring generally to FIG. 13 and particularly to, e.g., FIGS. 15A, 16, 17, 18, 19A and 19B, according to method 950, (block 956) rotating fastener-engagement portion 211 of tool 210 relative to receiving portion 197R of second fastener 197 comprises rotating tool 210 relative to second fastener 197 using housing 200H of rotary drive 299. The preceding subject matter of this paragraph characterizes example 95 of the present disclosure, wherein example 95 also includes the subject matter according to any one of examples 92-94, above.

Rotating fastener-engagement portion 211 of tool 210 relative to receiving portion 197R of second fastener 197 by rotating tool 210 using housing 200H of rotary drive 299 provides for alignment of fastener-engagement portion 211 of tool 210 with receiving portion 197R of second fastener 197.

Referring generally to FIG. 13 and particularly to, e.g., FIGS. 15A, 16, 17, 18, 19A and 19B, according to method 950, (block 957) rotating fastener-engagement portion 211 of tool 210 relative to receiving portion 197R of second fastener 197 comprises rotating tool 210 relative to second fastener 197 using socket 220. The preceding subject matter of this paragraph characterizes example 96 of the present disclosure, wherein example 96 also includes the subject matter according to any one of examples 92-94, above.

Rotating fastener-engagement portion 211 of tool 210 relative to receiving portion 197R of second fastener 197 using socket 220 of rotary drive 299 provides for alignment of fastener-engagement portion 211 of tool 210 with receiving portion 197R of second fastener 197 substantially without rotation of housing 200H. This may allow for use of rotary drive 299 in confined working areas.

Referring generally to FIG. 13 and particularly to, e.g., FIGS. 15A, 16, 17, 18, 19A and 19B, according to method 950, (block 958) rotating tool 210 of rotary drive 299 relative to second fastener 197 using socket 220 comprises rotating tool 210 relative to housing 200H of rotary drive 299. The preceding subject matter of this paragraph characterizes example 97 of the present disclosure, wherein example 97 also includes the subject matter according to example 96, above.

Rotating fastener-engagement portion 211 of tool 210 relative to receiving portion 197R of second fastener 197 using socket 220 of rotary drive 299 provides for alignment of fastener-engagement portion 211 of tool 210 with receiving portion 197R of second fastener 197 substantially without rotation of housing 200H, again allowing for use of rotary drive 299 in confined working areas.

Referring generally to FIG. 13 and particularly to, e.g., FIGS. 15A, 16, 17, 18, 19A and 19B, method 950 further comprises (block 959) visually indicating a presence or an absence of rotational anchoring of second fastener 197 relative to tool 210 using fastener-engagement indicator 213 of tool 210. The preceding subject matter of this paragraph characterizes example 98 of the present disclosure, wherein example 98 also includes the subject matter according to any one of examples 92-97, above.

Fastener-engagement indicator 213 provides an operator of rotary drive 299 a visual indicator of when fastener-engagement portion 211 of second body 214 is engaged with receiving portion 197R of second fastener 197, such as when an operator of rotary drive 299 is unable to see fastener-engagement portion 211 and/or second fastener 197.

Fastener-engagement indicator 213 may also provide a tactile indicator of when fastener-engagement portion 211 of second body 214 is engaged with receiving portion 197R of second fastener 197. As described above, when fastener-engagement portion 211 of second body 214 is engaged with and fully seated within receiving portion 197R, end of fastener-engagement indicator 213 may be substantially flush with or substantially even with surface 232S of key 232

(as illustrated in, e.g., FIGS. 14A and 17). When fastener-engagement portion 211 of second body 214 is misaligned (e.g. either rotationally misaligned or not coaxial aligned) with receiving portion 197R, end of fastener-engagement indicator 213 may protrude above surface 232S of key 232 (as illustrated in, e.g., FIGS. 14A and 17)

Referring generally to FIG. 13 and particularly to, e.g., FIGS. 15A, 16, 17, 18, 19A and 19B, method 950 further comprises (block 960) enabling fastener-engagement portion 211 of tool 210 to be disengaged from receiving portion 197R of second fastener 197 by at least partially removing torque between fastener-engagement portion 211 of tool 210 and receiving portion 197R of second fastener 197, resulting from rotating first fastener 198 in the first direction to cause first fastener 198 to threadably engage second fastener 197 while fastener-engagement portion 211 of tool 210 is mated with receiving portion 197R of second fastener 197, by rotating socket 220 of rotary drive 299 in a second direction opposite to the first direction. The preceding subject matter of this paragraph characterizes example 99 of the present disclosure, wherein example 99 also includes the subject matter according to any one of examples 92-94 or 96-98, above.

At least partially removing the torque between fastener-engagement portion 211 of tool 210 and receiving portion 197R of second fastener 197 allows for the removal of tool 210 from second fastener 197.

For example, as tool 210 is used fastener-engagement portion 211 of tool 210 may wear and engagement surfaces of fastener-engagement portion 211 may be come rounded, e.g. such as rounded corners of a hex drive or other suitable drive. As torque is applied when rotationally engaging first fastener 198 with second fastener 197, fastener-engagement portion 211 of tool 210 may become bound to receiving portion 197R of second fastener 197 such as when the rounded corners of fastener-engagement portion 211 allow some rotation of fastener-engagement portion 211 within receiving portion 197R of second fastener 197. The rotation of fastener-engagement portion 211 of tool 210 within receiving portion 197R of second fastener 197 may bind tool 210 to second fastener 197 and prevent removal of tool 210 from second fastener 197. At least partially removing the torque between fastener-engagement portion 211 of tool 210 and receiving portion 197R of second fastener 197 may reverse the binding rotation between fastener-engagement portion 211 of tool 210 and receiving portion 197R of second fastener 197 so that tool 210 may be removed from second fastener 197.

Referring generally to FIG. 13 and particularly to, e.g., FIGS. 14B, 15A, 16, 17, 18, 19A and 19B, according to method 950, (block 961) tool 210 of rotary drive 299 has a limited amount of rotation between about 30 degrees and about 270 degrees relative to housing 200H of rotary drive 299. The preceding subject matter of this paragraph characterizes example 100 of the present disclosure, wherein example 100 also includes the subject matter according to any one of examples 92-94 or 96-99, above.

The limited amount of rotation of tool 210 relative to housing 200H of rotary drive 299 provides rotation of tool 210 relative to receiving portion 197R of second fastener 197 so that fastener-engagement portion 211 of tool 210 can be geometrically rotationally aligned with receiving portion 197R, substantially without rotation of housing 200H.

For example, similar to that described above, an initial rotational orientation of fastener-engagement portion 211 relative to receiving portion 197R of second fastener 197 may be such that the geometry of fastener-engagement portion 211 is not aligned with the geometry of receiving portion 197R. The limited amount of rotation of tool 210 allows for predetermined limited rotation (e.g. a rotational compliance which is a total amount of rotation in both clockwise and counterclockwise directions) of fastener-engagement portion 211 of tool 210 relative to receiving portion 197R to align their respective geometries to allow engagement between fastener-engagement portion 211 and receiving portion 197R. To provide the predetermined limited rotation of fastener-engagement portion 211 of tool 210, retaining opening 242A may be in the form of a circumferentially enclosed butterfly slot as illustrated in FIG. 14B.

Referring generally to FIG. 13 and particularly to, e.g., FIGS. 15A, 16, 17, 18, 19A and 19B, according to method 950, (block 962) tool 210 of rotary drive 299 has a limited amount of rotation less than about 10 degrees relative to housing 200H of rotary drive 299. The preceding subject matter of this paragraph characterizes example 101 of the present disclosure, wherein example 101 also includes the subject matter according to any one of examples 92-95, above.

The limited amount of rotation of tool 210 relative to housing 200H of rotary drive 299 maintains a substantially fixed (non-rotating) relationship between tool 210 (rotationally anchored to tool retainer 230) of rotary-drive sub-assembly 200 and housing 200H.

As described above, this limited amount of rotation (e.g. intrinsic rotational backlash) may be defined as a result of manufacturing tolerances that provide a slip or clearance fit between key 232 and retaining opening 242A, where the amount of rotation provided by the intrinsic rotational backlash is a total rotation in both clockwise and counterclockwise directions.

Referring generally to FIG. 20 and particularly to, e.g., FIGS. 21, 22, 23, and 24, tool-change station 300 comprises base 310 and first tool-change member 320, rotatably coupled to base 310. First tool-change member 320 comprises first tool-engagement portion 326, geometrically complementary with tool-change-engagement portion 112, 212, 412 of tool 110, 210, 410 of rotary drive 199, 199-2, 299. The preceding subject matter of this paragraph characterizes example 102 of the present disclosure.

Tool-change station 300 allows for the installation and removal of tools 110, 210, 410 to and from rotary drive 199, 199-2, 299. Rotatably coupling first tool-change member 320 to base 310 allows for the installation and removal of tools 110, 210, 410 from rotary-drive sub-assembly 100, 200, 400 without removing rotary-drive sub-assembly 100, 200, 400 from rotary drive 199, 199-2, 299.

For example, tool 110, 210, 410 may be engaged to first tool-change member 320 as described herein so that tool-change-engagement portion 112, 212, 412 of tool 110, 210, 410 interfaces with first tool-engagement portion 326 located at first end 321E1 of first tool-change member 320. First tool-change member 320 may be rotated as described herein to cause relative rotation between tool 110, 210, 410 and tool retainer 130, 230, 430 so that tool 110, 210, 410 is rotationally disengaged from rotary-drive sub-assembly 100, 200, 400.

Referring generally to FIG. 20 and particularly to, e.g., FIGS. 21, 22, 23, and 24, first tool-change member 320 further comprises first socket-engagement portion 325, having an external shape complementary with an internal shape of socket 120, 120-2, 220 of rotary drive 199, 199-2, 299. The preceding subject matter of this paragraph characterizes example 103 of the present disclosure, wherein example 103 also includes the subject matter according to example 102, above.

Providing first tool-change member 320 with first socket-engagement portion 325 allows for rotation of first tool-change member with rotary drive 199, 19-2, 299.

For example, while tool-change-engagement portion 112, 212, 412 of tool 110, 210, 410 interfaces with first tool-engagement portion 326 of first tool-change member 320, socket 120, 120-2, 220 of rotary drive 199, 199-2, 299 engages socket-engagement portion 325 of tool-change member 320. Socket 120, 120-2, 220 may be driven by rotary drive 199, 199-2, 299 to rotate first tool-change member 320 which causes rotation of tool 110, 210, 410 (which is engaged to first tool-engagement portion 326) relative to tool retainer 130, 230, 430 for removing or installing tool 110, 210, 410 from or to rotary-drive sub-assembly 100, 200, 400.

Referring generally to FIG. 20 and particularly to, e.g., FIGS. 21, 22, 23, and 24, base 310 comprises first aperture 329. First tool-change member 320 further comprises first base-engagement portion 327, rotatably received within first aperture 329. The preceding subject matter of this paragraph characterizes example 104 of the present disclosure, wherein example 104 also includes the subject matter according to example 103, above.

Locating first tool-change member 320 in base 310 provides a stable platform for installing and removing tool 110, 210, 410 to and from rotary-drive sub-assembly 100, 200, 400.

First base-engagement portion 327 is located at second end 321E2 of first tool-change member 320, which is opposite first end 321E1 so that when first tool-change member 320 is located in base 310 first tool-engagement portion 326 extends away from first side 311 of base 310.

Referring generally to FIG. 20 and particularly to, e.g., FIGS. 21, 22, 23, and 24, tool-change station 300 further comprises first bushing 328, fixed within first aperture 329 of base 310. First base-engagement portion 327 of first tool-change member 320 is rotatable within first bushing 328. The preceding subject matter of this paragraph characterizes example 105 of the present disclosure, wherein example 105 also includes the subject matter according to example 104, above.

Providing base 310 with first bushing 328 prevents wearing of base 310 and allows for rotation of first tool-change member 320 relative to base 310.

Referring generally to FIG. 20 and particularly to, e.g., FIGS. 23 and 24, tool-change station 300 further comprises first retainer 330. First tool-change member 320 further comprises first shoulder 331 between first socket-engagement portion 325 and first base-engagement portion 327. First base-engagement portion 327 of first tool-change member 320 comprises first groove 332. First bushing 328 is captured between first shoulder 331 of first tool-change member 320 and first retainer 330, which is received within first groove 332 of first base-engagement portion 327 of first tool-change member 320. The preceding subject matter of this paragraph characterizes example 106 of the present disclosure, wherein example 106 also includes the subject matter according to example 105, above.

Providing first retainer 330 within first groove 332 of first tool-change member 320 captures first tool-change member 320 and first bushing 328 to base 310 so that first tool-change member 320 cannot be removed from base 310 while tool 110, 210, 410 is installed to and removed from rotary-drive sub-assembly 100, 200, 400.

Referring generally to FIG. 20 and particularly to, e.g., FIGS. 23 and 24, tool-change station 300 further comprises first retainer 330. First tool-change member 320 further comprises first shoulder 331 between first socket-engagement portion 325 and first base-engagement portion 327. First base-engagement portion 327 of first tool-change member 320 comprises first groove 332. Base 310 is captured between first shoulder 331 of first tool-change member 320 and first retainer 330, which is received within first groove 332 of first base-engagement portion 327 of first tool-change member 320. The preceding subject matter of this paragraph characterizes example 107 of the present disclosure, wherein example 107 also includes the subject matter according to example 104, above.

Providing first retainer 330 within first groove 332 of first tool-change member 320 captures first tool-change member 320 and first bushing 328 to base 310 so that first tool-change member 320 cannot be removed from base 310 while tool 110, 210, 410 is installed to and removed from rotary-drive sub-assembly 100, 200, 400.

Referring generally to FIG. 20 and particularly to, e.g., FIG. 25, tool-change station 300 further comprises first drive 700, coupled to first tool-change member 320. First drive 700 is configured to selectively cause relative rotation between first tool-change member 320 and base 310. The preceding subject matter of this paragraph characterizes example 108 of the present disclosure, wherein example 108 also includes the subject matter according to any one of examples 102-107, above.

Providing first drive 700 to selectively cause relative rotation between first tool-change member 320 and base 310 allows for the installation and removal of tool 110, 210, 410 from rotary-drive sub-assembly 100, 200, 400 of rotary drive 199, 199-2, 299 without actuation of rotary drive 199, 199-2, 299.

Referring generally to FIG. 20 and particularly to, e.g., FIGS. 21, 22, 23, 24 and 25, tool-change station 300 further comprises second tool-change member 320A, rotatably coupled to base 310. Second tool-change member 320A comprises second tool-engagement portion 326A. The preceding subject matter of this paragraph characterizes example 109 of the present disclosure, wherein example 109 also includes the subject matter according to any one of examples 102-108, above.

Having more than one tool-change member (e.g. first tool-change member 320 and second tool-change member 320A) may allow for a fast swapping of one tool 110, 210, 410 with another tool 110, 210, 410, where fast swapping indicates a rapid or quick succession tool change that facilitates the replacement of one tool 110 with another tool 110.

Second tool-change member 320A may be substantially similar to first tool-change member 320 in that second tool-change member 320A includes second tool-engagement portion 326A, second socket engagement portion 325A, second shoulder 331A, second base-engagement portion 327A as described herein with respect to first tool-change member 320. Similar to that described above, second base-engagement portion 327A is located at second end 321E2A of second tool-change member 320A, which is opposite first end 321E1A so that when second tool-change member 320A is located in base 310 second tool-engagement portion 326 extends away from first side 311 of base 310. In one aspect, second base-engagement portion 327A includes second groove 332A in which second retainer 330A is disposed so that second tool-change member 320A is retained in second bushing 328A in second aperture 329A of base 310 in a manner substantially similar to that described herein with respect to first tool-change member 320A.

Base 310 may include array 600 of tool-change members, where the tool-change members in array 600 include at least first tool-change member 320 and second tool-change member 320A. First tool-change member 320 may be empty (e.g. does not support tool 110, 210, 410) while second tool-change member 320A holds a replacement tool 110, 210, 410. An operator may align a worn or broken tool 110, 210, 410 with first tool-change member 320 and remove the worn or broken tool 110, 220, 410 with first tool-change member 326 where the worn or broken tool is retained within first tool-change member 326 after removal of the worn or broken tool 110, 210, 410 from rotary drive 199, 19-2, 299. The operator may align rotary drive 199, 199-2, 299 with second tool-change member 320A, so that the replacement tool 110, 210, 410 is aligned with tool retainer 130, 230, 430 of rotary drive 199, 199-2, 299, and install the replacement tool 110, 210, 410 in rotary drive 199, 199-2, 299.

In one aspect, second tool-change member 320A is driven by second drive 700A in a manner substantially similar to that described herein with respect to first tool-change member 320 and first drive 700.

Referring generally to FIG. 20 and particularly to, e.g., FIGS. 21, 22, 23 and 24, second tool-engagement portion 326A of second tool-change member 320A is different from first tool-engagement portion 326 of first tool-change member 320. The preceding subject matter of this paragraph characterizes example 110 of the present disclosure, wherein example 110 also includes the subject matter according to example 109, above.

Second tool-engagement portion 326A of second tool-change member 320A being different than first tool-engagement portion 326 of first tool-change member 320 allows for installation and removal of differently sized and/or shaped tools 110, 210, 410 with a common tool-change station 300.

For example, second tool-engagement portion 326A of second tool-change member 320A may be configured (e.g. shaped and sized) to interface with tool 110, 210, 410 having a larger or smaller fastener-engagement portion 111, 211, 411 than another tool 110, 210, 410 that interfaces with first tool-engagement portion 326 of first tool-change member 320 (e.g. second tool-engagement portion 326A may be configured to interface with tool 110, 210, 410 that corresponds to a 15 mm fastener while first tool-engagement portion 326 may be configured to interface with another tool 110, 210, 410 that corresponds to an 8 mm fastener). Similarly, a geometry of second tool-engagement portion 326A may be different than a geometry of first tool-engagement portion 326. For example, second tool-engagement portion 326A may have a hex configuration while first tool-engagement portion 326 has a spline configuration.

Referring generally to FIGS. 1, 8, 13 and 20 and particularly to, e.g., FIGS. 21, 22, 24 and 26, method 1000 of coupling or decoupling tool 110, 210, 410 of rotary-drive sub-assembly 100, 200, 400 and tool retainer 130, 230, 430 of rotary-drive sub-assembly 100, 200, 400 is provided. Method comprises, in Block 1001, rotationally anchoring tool 110, 210, 410 to first tool-change member 320, rotatably coupled to base 310, by engaging tool-change-engagement portion 112, 212, 412 of tool 110, 210, 410 with first tool-engagement portion 326 of first tool-change member 320, wherein base 310 has first side 311 and second side 312, opposite first side 311. Method 1000 further comprises, in Block 1002, causing relative rotation between tool 110, 210, 410 and tool retainer 130, 230, 430. The preceding subject matter of this paragraph characterizes example 111 of the present disclosure.

Engaging first tool-change-engagement portion 112, 212, 412 of tool 110, 210, 410 with first tool-engagement portion 326 of first tool-change member 320 allows for removal of tool 110, 210, 410 from rotary-drive sub-assembly 100, 200, 400 independent of a structural condition (e.g. fracture, wear, breakage, etc.) of fastener-engagement portion 111, 211, 411 of tool 110, 210, 410.

Referring generally to FIGS. 1, 8, 13 and 20 and particularly to, e.g., FIGS. 21, 22, 24 and 26, according to method 1000, (block 1003) rotationally anchoring tool 110, 210, 410 relative to first tool-change member 320 comprises co-axially urging tool 110, 210 410 against first tool-change member 320 and rotating first tool-change member 320 relative to tool 110, 210, 410 until tool-change-engagement portion 112, 212, 412 of tool 110, 210, 410 mates with first tool-engagement portion 326 of first tool-change member 320. The preceding subject matter of this paragraph characterizes example 112 the present disclosure, wherein example 112 also includes the subject matter according to example 111, above.

Co-axially urging tool 110, 210, 410 against first tool-change member 320 and rotating first tool-change member 320 relative to tool 110, 210, 410 causes alignment of tool-change-engagement portion 112, 212, 412 of tool 110, 210, 410 with first tool-engagement portion 326 of first tool-change member 320 and causes one of tool-change-engagement portion 112, 212, 412 of tool 110, 210, 410 and first tool-engagement portion 326 of first tool-change member 320 to be inserted into the other one of tool-change-engagement portion 112, 212, 412 of tool 110, 210, 410 and first tool-engagement portion 326 of first tool-change member 320.

For example, as described above, tool-change-engagement portion 112, 212, 412 of tool 110, 210, 410 has a predetermined geometric shape (e.g. hex drive, clutch drive, Torx® drive, spline, etc.). First tool-engagement portion 326 of first tool-change member 320 has a geometric configuration that mates with the geometric configuration of tool-change-engagement portion 112, 212, 412 of tool 110, 210, 410. Relative rotation between tool-change-engagement portion 112, 212, 412 of tool 110, 210, 410 and first tool-engagement portion 326 of first tool-change member 320 aligns the mating respective geometric configurations and the co-axial urging of tool 110, 210, 410 against first tool-change member 320 causes one of tool-change-engagement portion 112, 212, 412 of tool 110, 210, 410 and first tool-engagement portion 326 of first tool-change member 320 to be inserted into the other one of tool-change-engagement portion 112, 212, 412 of tool 110, 210, 410 and first tool-engagement portion 326 of first tool-change member 320.

Referring generally to FIGS. 1, 8, 13 and 20 and particularly to, e.g., FIGS. 21, 22, 24 and 26, according to method 1000, (block 1004) first tool-change member 320 is rotated from first side 311 of base 310 using socket 120, 120-2, 220 of rotary drive 199, 199-2, 299. Rotary drive 199, 199-2, 299 comprises rotary-drive sub-assembly 100, 200, 400. The preceding subject matter of this paragraph characterizes example 113 of the present disclosure, wherein example 113 also includes the subject matter according to example 112, above.

Rotating first tool-change member 320 with socket 120, 120-2, 220 of rotary drive 199, 199-2, 299 allows for a compact and unpowered tool change station 300 that is easily manufactured. Rotating first tool-change member 320 with socket 120, 120-2, 220 of rotary drive 199, 199-2, 299 may also allow for one handed changing of tool 110, 210, 410 of rotary-drive sub-assembly 100, 200, 400.

Referring generally to FIGS. 1, 8, 13 and 20 and particularly to, e.g., FIGS. 21, 22, 24 and 26, according to method 1000, (block 1005) first tool-change member 320 is rotated using socket 120, 120-2, 220 of rotary drive 199, 199-2, 299 in one of a first direction or a second direction, opposite to the first direction, to mate tool-change-engagement portion 112, 212, 412 of tool 110, 210, 410 with first tool-engagement portion 326 of first tool-change member 320. The preceding subject matter of this paragraph characterizes example 114 of the present disclosure, wherein example 114 also includes the subject matter according to example 113, above.

Rotating first tool-change member 320 in one of with the first direction or second direction with socket 120, 120-2, 220 causes alignment of tool-change-engagement portion 112, 212, 412 of tool 110, 210, 410 with first tool-engagement portion 326 of first tool-change member 320.

Referring generally to FIGS. 1, 8, 13 and 20 and particularly to, e.g., FIGS. 21, 22, 24 and 26, according to method 1000, (block 1006) first tool-change member 320 is rotated from second side 312 of base 310 using first drive 700. The preceding subject matter of this paragraph characterizes example 115 of the present disclosure, wherein example 115 also includes the subject matter according to example 112, above.

Rotating first tool-change member 320 using first drive 700 allows for changing of tool 110, 210, 410 when, for example, rotary drive 199, 199-2, 299 is unpowered.

Referring generally to FIGS. 1, 8, 13 and 20 and particularly to, e.g., FIGS. 21, 22, 24 and 26, according to method 1000, (block 1007) first tool-change member 320 is rotated using first drive 700 in one of first direction or second direction, opposite to the first direction, to mate tool-change-engagement portion 112, 212, 412 of tool 110, 210, 410 with first tool-engagement portion 326 of first tool-change member 320. The preceding subject matter of this paragraph characterizes example 116 of the present disclosure, wherein example 116 also includes the subject matter according to example 115, above.

Rotating first tool-change member 320 in one of with the first direction or second direction with first drive 700 causes alignment of tool-change-engagement portion 112, 212, 412 of tool 110, 210, 410 with first tool-engagement portion 326 of first tool-change member 320.

Referring generally to FIGS. 1, 8, 13 and 20 and particularly to, e.g., FIGS. 21, 22, 24 and 26, according to method 1000, (block 1008) rotary-drive sub-assembly 100, 200, 400 is at least partially rotationally fixed relative to housing 100H, 100H-2, 200H of rotary drive 199, 199-2, 299 by rotationally coupling tool retainer 130, 230, 430 of rotary-drive sub-assembly 100, 200, 400 with housing 100H, 100H-2, 200H. The preceding subject matter of this paragraph characterizes example 117 of the present disclosure, wherein example 117 also includes the subject matter according to any one of examples 111-114, above.

At least partially rotationally fixing rotary-drive sub-assembly 100, 200, 400 to housing 100H, 100H-2, 200H of rotary drive 199, 199-2, 299 provides for the relative rotation between tool 110, 210, 410 and tool retainer 130, 230, 430.

For example, as described above, tool retainer 130, 230, 430 is captured within rotary drive 199, 199-2, 299 between socket 120, 120-2, 220 and retaining assembly 140, 140-2 or retainer 240. Tool retainer 130, 230, 430 includes key 132, 232, 432 that engages retaining opening 151A, 151A-2, 242A for rotationally constraining tool retainer 130, 230, 430.

Referring generally to FIGS. 1, 8, 13 and 20 and particularly to, e.g., FIGS. 21, 22, 24 and 26, according to method 1000, (block 1009) relative rotation between tool 110, 210, 410 and tool retainer 130, 230, 430 in the first direction causes tool 110, 210, 410 to rotatably engage tool retainer 130, 230, 430. Relative rotation between tool 110, 210, 410 and tool retainer 130, 230, 430 in second direction, opposite the first direction, causes tool 110, 210, 410 to rotatably disengage from tool retainer 130, 230, 430. The preceding subject matter of this paragraph characterizes example 118 of the present disclosure, wherein example 118 also includes the subject matter according to any one of examples 111 or 112, above.

The rotational engagement and disengagement of tool 110, 210, 410 and tool retainer 130, 230, 430 allows for threadably coupling or decoupling tool 110, 210, 410 and tool retainer 130, 230, 430.

For example, relative rotation between tool 110, 210, 410 and tool retainer 130, 230, 430 in the first direction may rotationally couple tool 110, 210, 410 and tool retainer 130, 230, 430. Relative rotation between tool 110, 210, 410 and tool retainer 130, 230, 430 in the second direction may rotationally decouple tool 110, 210, 410 and tool retainer 130, 230, 430. As described above, tool 110, 210, 410 and tool retainer 130, 230, 430 may be configured with either right hand or left and threads.

Referring generally to FIGS. 1, 8, 13 and 20 and particularly to, e.g., FIGS. 5, 9A, 15B, 18, 21, 22, 24 and 26, according to method 1000, (block 1010) relative rotation between tool 110, 210, 410 and tool retainer 130, 230, 430 in first direction causes tool 110, 210, 410 to threadably engage tool retainer 130, 230, 430. The preceding subject matter of this paragraph characterizes example 119 of the present disclosure, wherein example 119 also includes the subject matter according to example 118, above.

Threadable engagement between tool 110, 210, 410 and tool retainer 130, 230, 430 mates tool 110, 210, 410 and tool retainer 130, 230, 430 so that when stop surface 110S, 210S, 410S of tool 110, 210, 410 contacts, e.g., retaining surface 130S, 230S, 461S of tool retainer 130, 230, 430 tool 110, 210, 410 does not further rotate relative to tool retainer 130, 230, 430 in the first direction.

Referring generally to FIGS. 1, 8, 13 and 20 and particularly to, e.g., FIGS. 21, 22, 24 and 26, according to method 1000, (block 1011) relative rotation between tool 110, 210, 410 and tool retainer 130, 230, 430 in the second direction, opposite the first direction, causes tool 110, 210, 410 to threadably disengage from tool retainer 130, 230, 430. The preceding subject matter of this paragraph characterizes example 120 of the present disclosure, wherein example 120 also includes the subject matter according to any one of examples 118 or 119, above.

Threadable disengagement of tool 110, 210, 410 from tool retainer 130, 230, 430 allows for the removal of tool 110, 210, 410 from rotary-drive sub-assembly 199, 199-2, 299.

Referring generally to FIGS. 1, 8, 13 and 20 and particularly to, e.g., FIGS. 21, 22, 24 and 26, method 1000 further comprises (block 1012) rotationally anchoring first tool-change member 320 and socket 120, 120-2, 220 of rotary drive 199, 199-2, 299 on first side of base 310. Relative rotation between tool 110, 210, 410 and tool retainer 130, 230, 430 in one of the first direction or the second direction is caused by rotating socket 120, 120-2, 220 of rotary drive 199, 199-2, 299. The preceding subject matter of this paragraph characterizes example 121 of the present disclosure, wherein example 121 also includes the subject matter according to any one of examples 118-120, above.

Rotating first tool-change member 320 with socket 120, 120-2, 220 of rotary drive 199, 199-2, 299 allows for a compact and unpowered tool change station 300 that is easily manufactured. Rotating first tool-change member 320 with socket 120, 120-2, 220 of rotary drive 199, 199-2, 299 may also allow for one handed changing of tool 110, 210, 410 of rotary-drive sub-assembly 100, 200, 400.

Rotationally anchoring first-tool change member 320 and socket 120, 120-2, 220 comprises inserting first tool-change member 320 into socket 120, 120-2, 220 so that the geometrical shape of first tool-change member 320 is mated with the geometrical shape of socket 120, 120-2, 220.

Referring generally to FIGS. 1, 8, 13 and 20 and particularly to, e.g., FIGS. 21, 22, 24 and 26, according to method 1000, (block 1013) causing relative rotation between tool 110, 210, 410 and tool retainer 130, 230, 430 comprises rotating first tool-change member 320 relative to base 310 with first drive 700 that is rotationally anchored with first tool-change member 320 on second side 312 of base 310. The preceding subject matter of this paragraph characterizes example 122 of the present disclosure, wherein example 122 also includes the subject matter according to any one of examples 118-120, above.

Rotating first tool-change member 320 using first drive 700 allows for changing of tool 110, 210, 410 when, for example, rotary drive 199, 199-2, 299 is unpowered.

In this aspect, first drive 700 is located on an opposite side of base 310 than first tool-change member 320. However, in other aspects, first drive 700 may be located on a common side of base 310, such as first side 311 of base 310.

Examples of the present disclosure may be described in the context of aircraft manufacturing and service method 1100 as shown in FIG. 27 and aircraft 1102 as shown in FIG. 28. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 28, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of threadably coupling a first fastener with a second fastener using a rotary drive comprising a tool, the method comprising:
    rotationally anchoring the second fastener relative to the tool by co-axially urging a fastener-engagement portion of the tool against the second fastener and rotating the tool relative to the second fastener using a socket of the rotary drive until the fastener-engagement portion of the tool mates with a receiving portion of the second fastener;
    receiving the first fastener within the socket of the rotary drive co-axially with the fastener-engagement portion of the tool; and
    rotating the first fastener with the socket of the rotary drive relative to a housing of the rotary drive to cause the first fastener to threadably engage the second fastener.

2. The method according to claim 1, further comprising frictionally retaining the first fastener within the socket.

3. The method according to claim 2, wherein rotating the tool, of the rotary drive relative to the second fastener using the socket of the rotary drive comprises rotating the tool relative to the housing of the rotary drive.

4. The method according to claim 2, wherein, rotating the first fastener with the socket of the rotary drive relative to the housing in a first direction causes the first fastener to threadably engage the second fastener while the fastener-engagement portion of the tool, of the rotary drive is mated with the receiving portion of the second fastener to rotationally anchor the second fastener relative to the tool of the rotary drive, the tool, co-axially translated relative to the socket of the rotary drive.

5. The method according to claim 4, further comprising enabling the fastener-engagement portion of the tool, to be disengaged from the receiving portion of the second fastener by at least partially removing torque between the fastener-engagement portion of the tool, of the rotary drive and the receiving portion of the second fastener, resulting from rotating the first fastener in the first direction to cause the first fastener to threadably engage the second fastener while the fastener-engagement portion of the tool, is mated with the receiving portion of the second fastener, by rotating the socket of the rotary drive in a second direction, opposite to the first direction.

6. The method according to claim 5, wherein the tool of the rotary drive has a limited amount of rotation relative to the housing of the rotary drive.

7. The method according to claim 6, wherein the limited amount of rotation of the tool, of the rotary drive relative to the housing of the rotary drive is between about 30 degrees and about 270 degrees.

8. The method according to claim 1, wherein rotating the tool of the rotary drive relative to the second fastener of the rotary drive comprises rotating the tool relative to the housing of the rotary drive.

9. The method according to claim 8, wherein, rotating the first fastener with the socket of the rotary drive relative to the housing in a first direction causes the first fastener to threadably engage the second fastener while the fastener-engagement portion of the tool, of the rotary drive is mated with the receiving portion of the second fastener to rotationally anchor the second fastener relative to the tool, of the rotary drive, the tool, is co-axially translated relative to the socket of the rotary drive.

10. The method according to claim 9, further comprising enabling the fastener-engagement portion of the tool to be disengaged from the receiving portion of the second fastener by at least partially removing torque between the fastener-engagement portion of the tool, of the rotary drive and the receiving portion of the second fastener, resulting from rotating the first fastener in the first direction to cause the first fastener to threadably engage the second fastener while the fastener-engagement portion of the tool, is mated with the receiving portion of the second fastener, by rotating the socket of the rotary drive in a second direction, opposite to the first direction.

11. The method according to claim 10, wherein the tool of the rotary drive has a limited amount of rotation relative to the housing of the rotary drive.

12. The method according to claim 11, wherein the limited amount of rotation of the tool of the rotary drive relative to the housing of the rotary drive is between about 30 degrees and about 270 degrees.

13. The method according to claim 1, wherein, rotating the first fastener with the socket of the rotary drive relative to the housing in a first direction causes the first fastener to threadably engage the second fastener while the fastener-engagement portion of the tool of the rotary drive is mated with the receiving portion of the second fastener to rotationally anchor the second fastener relative to the tool of the rotary drive, the tool, is co-axially translated relative to the socket of the rotary drive.

14. The method according to claim 13, further comprising enabling the fastener-engagement portion, of the tool to be disengaged from the receiving portion of the second fastener by at least partially removing torque between the fastener-engagement portion of the tool of the rotary drive and the receiving portion of the second fastener, resulting from rotating the first fastener in the first direction to cause the first fastener to threadably engage the second fastener while the fastener-engagement portion of the tool, is mated with the receiving portion of the second fastener, by rotating the socket of the rotary drive in a second direction opposite to the first direction.

15. The method according to claim 14, wherein the tool of the rotary drive has a limited amount of rotation relative to the housing of the rotary drive.

16. The method according to claim 15, wherein the limited amount of rotation of the tool, of the rotary drive relative to the housing of the rotary drive is between about 30 degrees and about 270 degrees.

17. The method according to claim 1, further comprising a step of transferring rotation of a socket of the rotary drive, engaging the first fastener, to the tool when the fastener-engagement portion of the tool is disengaged from the second fastener, that is threadably coupled with the first fastener.

18. The method according to claim 17, further comprising discontinuing the step of transferring rotation of the socket to the tool when the fastener-engagement portion of the tool becomes engaged with the second fastener.

19. The method according to claim 1, further comprising rotationally constraining a tool retainer of the rotary drive relative to the housing of the of the rotary drive with a retaining member, coupled to the housing.

20. The method according to claim 19, further comprising biasing the retaining member toward the housing with a resilient member, and wherein the retaining member is movable relative to the resilient member.

* * * * *